United States Patent [19]
Laczko, Sr. et al.

[11] Patent Number: 5,631,848
[45] Date of Patent: May 20, 1997

[54] SYSTEM DECODER CIRCUIT AND METHOD OF OPERATION

[75] Inventors: Frank L. Laczko, Sr., Allen, Tex.; Gerard Benbassat, St. Paul de Vence, France; Stephen H. Li, Garland, Tex.

[73] Assignee: Texas Instruments, Dallas, Tex.

[21] Appl. No.: 486,487

[22] Filed: Jun. 7, 1995

Related U.S. Application Data

[63] Continuation of Ser. No. 54,126, Apr. 26, 1993, which is a continuation-in-part of Ser. No. 21,007, Feb. 22, 1992.

[51] Int. Cl.$^6$ ................................................ G06F 19/00
[52] U.S. Cl. ........................................................ 364/514 R
[58] Field of Search .......................... 364/514 R, 514 A, 364/715.02, 725; 341/59, 68, 69, 51; 348/423; 370/100.1; 375/342, 371

[56] References Cited

U.S. PATENT DOCUMENTS

| | | | |
|---|---|---|---|
| 3,691,553 | 9/1972 | McIntosh | 341/69 |
| 4,217,660 | 8/1980 | En | 364/715.02 |
| 5,425,061 | 6/1995 | Laczko, Sr. et al. | 375/371 |
| 5,432,512 | 7/1995 | Park | 341/69 |
| 5,473,566 | 12/1995 | Rao | 364/514 R |

*Primary Examiner*—Ellis B. Ramirez
*Attorney, Agent, or Firm*—Gerald E. Laws; C. Alan McClure; James C. Kesterson

[57] ABSTRACT

A data processing system (10) is disclosed which comprises a microprocessor host (12) coupled to a decoding system (14). A host interface block (18) receives a bit stream and passes bit stream on to a system decoder block (20). The system decoder block (20) extracts the appropriate data from the bit stream and loads an input buffer (24) or an optional external buffer (26). An audio decoder block (28) retrieves the data from the input buffer (24) and generates scale factor indices, bit per code word values and subband samples which are stored in an arithmetic unit buffer (30). A hardware filter arithmetic unit block (32) retrieves the information from the arithmetic unit buffer (30) and dequantizes, transforms and filters the data to generate PCM output data which is loaded into a PCM buffer (34). The data within the PCM buffer (34) is output by a PCM output block (36) to a digital-to-analog converter (16).

20 Claims, 35 Drawing Sheets

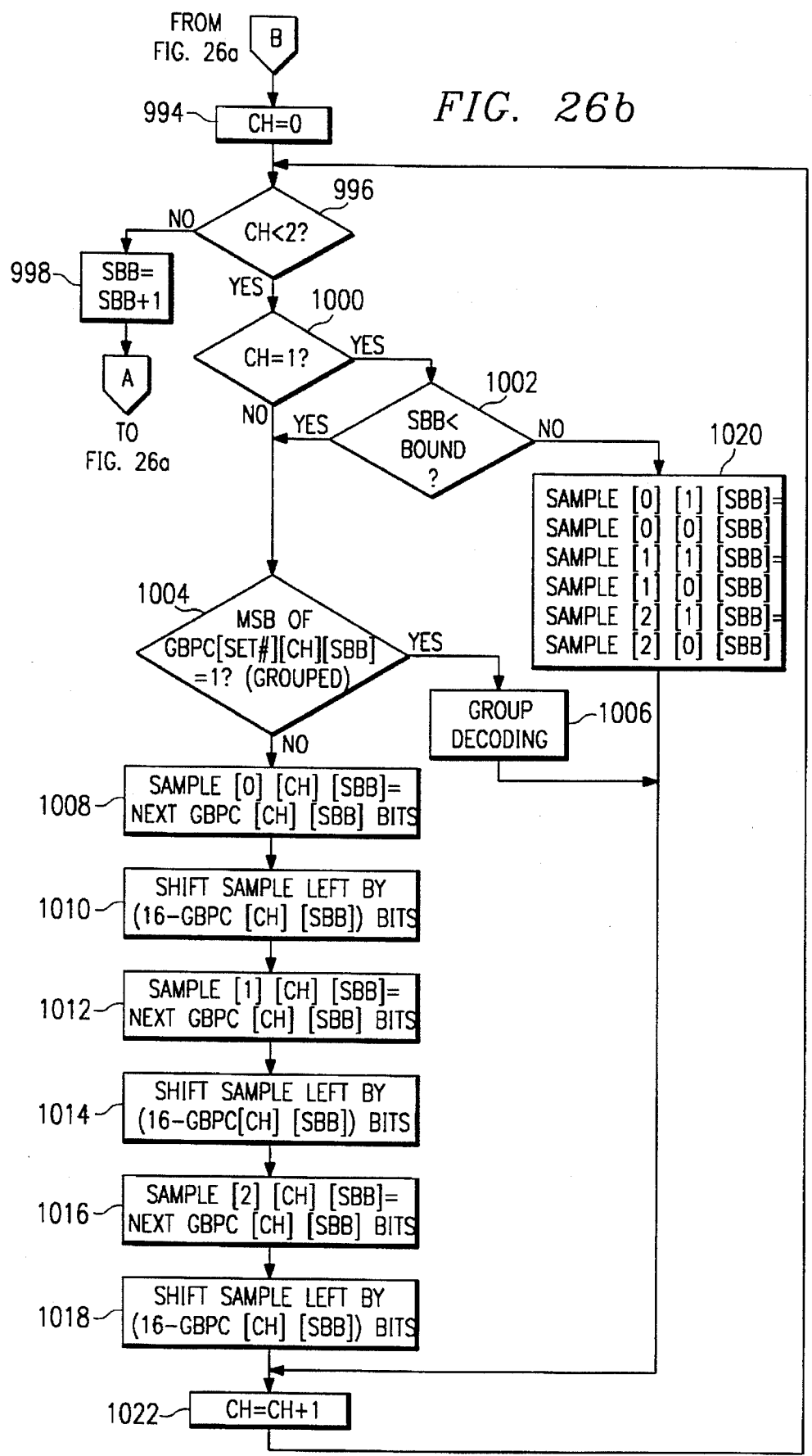

SYSTEM DECODER CIRCUIT AND METHOD OF OPERATION

This is a continuation of application Ser. No. 08/054,126, filed Apr. 26, 1993, which application is a continuation-in-part application of co-pending application for United States patent Ser. No. 08/021,007, filed Feb. 22, 1992, and entitled "INTEGRATED AUDIO DECODER SYSTEM" (Attorney Docket No. TI-17424).

TECHNICAL FIELD OF THE INVENTION

This invention relates in general to the field of electronic systems and more particularly to an improved system decoder circuit and method of operation.

BACKGROUND OF THE INVENTION

The Motion Picture Experts Group (MPEG) has promulgated the MPEG audio and video standards for compression and decompression algorithms to be used in the digital transmission and receipt of audio and video broadcasts in ISO-11172 (hereinafter the "MPEG standard"). The MPEG standard provides for the efficient compression of data according to an established psychoacoustic model to enable real time transmission, decompression and broadcast of CD quality sound and video images. The MPEG standard provides for three possible modes of data transfer. The first mode is audio and visual data plus information to be used to synchronize the broadcast of the audio and video portions. The second mode of possible data transmission involves audio information and information that can be used to synchronize the audio information with a parallel operating video system. The third and final mode of possible data transmission comprises only audio data.

The MPEG compression/decompression standard provides for a data stream that must be received and processed at rates up to 15 megabits per second. Prior systems that have been used to implement the MPEG decompression operation have required expensive digital signal processors and extensive support memory. The MPEG audio and video standards will soon be used in large scale transmission systems for television and radio broadcast.

SUMMARY OF THE INVENTION

Accordingly, a need has arisen to implement a system that can perform the defined MPEG audio decompression operation at a lower cost than the cost associated with a system centered around a programmable digital signal processor.

In accordance with the teachings of the present invention, an integrated audio decoder system is described which substantially reduces or eliminates disadvantages associated with prior systems and methods of implementing the MPEG audio decompression operation.

According to one embodiment of the present invention, a data processing system is provided that comprises a microprocessor host system, an audio decoder system and a digital to analog converter. The audio decoder is operable to receive an encoded data stream, extract selected encoded audio data and decode and filter the data to provide input data for the digital to analog converter.

According to an alternate embodiment of the present invention, an audio decoder system is provided that comprises a system decoder, an audio decoder and an arithmetic unit implemented on a single semiconductor substrate. The system decoder is operable to receive the encoded and compressed bit stream and extract information indicating to the remainder of the system the compression algorithm that was used to form the bit stream. The audio decoder comprises a microcoded engine which is operable to transform the bit stream into discreet samples and subband filter coefficients. The arithmetic unit is operable to receive the samples and the subband filter coefficients and to generate PCM data which can be output from the system to a digital to analog converter.

BRIEF DESCRIPTION OF THE DRAWINGS

A more complete understanding of the technical advantages of the present invention may be acquired by referring to the attached FIGUREs wherein like reference numbers indicate like features and wherein.

DETAILED DESCRIPTION OF THE INVENTION

Introduction

The present invention comprises a system that is operable to efficiently decode a stream of data that has been encoded and compressed using the MPEG syntax. In order to accomplish the real time processing of the data stream, the system of the present invention must be able to receive a bit stream that can be transmitted at variable bit rates up to 15 megabits per second and to identify and retrieve a particular audio data set that is time multiplexed with other data within the bit stream. The system must then decode the retrieved data and present conventional pulse code modulated (PCM) data to a digital to analog converter which will, in turn, produce conventional analog audio signals with fidelity comparable to other digital audio technologies. The system of the present invention must also monitor synchronization within the bit stream and synchronization between the decoded audio data and other data streams, for example, digitally encoded video images associated with the audio which must be presented simultaneously with decoded audio data. In addition, MPEG data streams can also contain ancillary data which may be used as system control information or to transmit associated data such as song titles or the like. The system of the present invention must recognize ancillary data and alert other systems to its presence.

General Architecture

Figure 1:
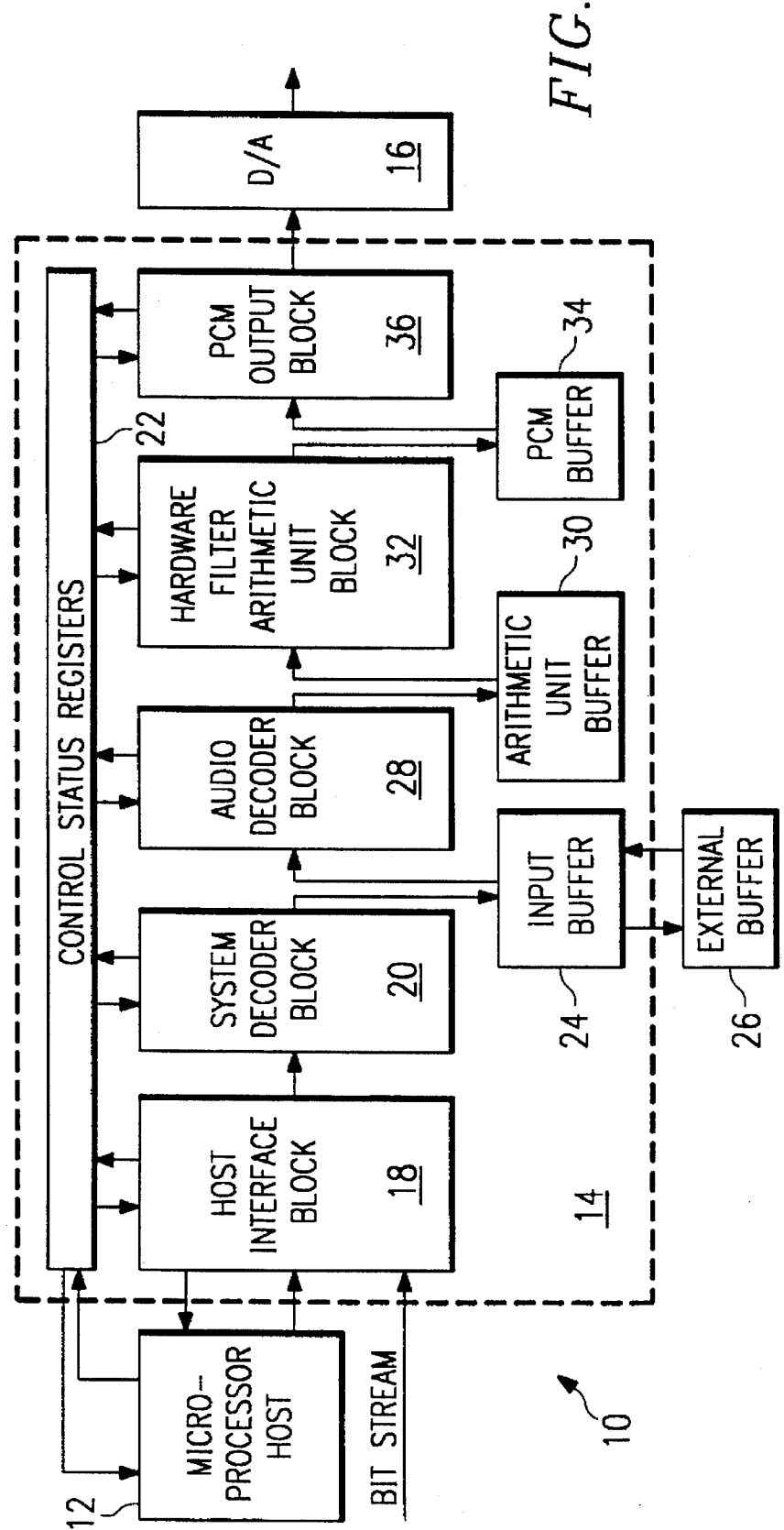
FIG. 1 is a schematic block diagram of an audio decoding system including the integrated audio decoder system of the present invention.

Referring to FIG. 1, an audio decoding system 10 is shown that comprises a microprocessor host 12 that is coupled to an integrated audio decoder system 14. The audio decoder system 14 receives a bit stream which comprises either a serial bit stream or parallel data from the microprocessor host 12 after the host 12 has converted the serial data to a parallel format. In either case, the data received by the audio decoder system 14 comprises audio and visual data that has been encoded using the MPEG audio visual compression algorithm. The audio decoder system 14 retrieves the appropriate information indicating the format of the audio portion of the bit stream and uses this information to decode the audio data and produce pulse code modulated (PCM) data which is output to a digital to analog converter 16 shown in FIG. 1.

According to one embodiment of the present invention, the audio decoder system 14 is formed as a monolithic structure on a single semiconductor substrate. Audio decoder system 14 comprises a host interface block 18 which receives control signals from the microprocessor host 12 and the encoded bit stream. The host interface 18 passes the encoded bit stream to a system decoder block 20. The host interface block 18 routes all communication to and from the microprocessor host 12 for both compressed audio data and for control information. The host interface block 18 may comprise, for example, a conventional 8-bit microprocessor interface, a direct memory access (DMA) interface, a serial data input interface and a plurality of control lines. The host interface block 18 also communicates interrupt signals to the microprocessor host 12 which will be described more completely herein. The compressed audio stream may be input using one of three modes. The input can be as a serial bit stream through the serial data input of the host interface block 18. In addition, the data may be input in byte parallel format on 8 data pins coupled to the host interface block. The parallel data may either be clocked using a $\overline{DSTRB}$ line or the data may be written into a DATA_IN register within a control status register block 22 shown in FIG. 1. If the $\overline{DSTRB}$ line is used, the operation resembles a conventional DMA access by microprocessor host 12 with no register addressing involved. If the parallel data is written to the DATA_IN register, the data must be addressed before each byte is accessed using conventional register addressing.

The compressed data received by the host interface block 18 can be in one of three formats. The format is controlled by the host 12 by altering the contents of a 2-bit STR_SEL register within the control status registers 22. The compressed data stream may comprise only MPEG audio information, MPEG audio packets, or a fully multiplexed MPEG system stream which may contain one or more audio and video streams.

In the case of a fully multiplexed MPEG system stream, additional control registers enable or disable the decoding of the audio identification field. If this feature is enabled, the identification field within the MPEG system stream is compared with the contents of an AUD_ID register and the audio is only decoded if the identification fields match. In general, the registers within control status register block 22 are written to by microprocessor host 12 to control the operation of the audio decoder system 14. The enabling or disabling of the audio identification feature is one example of this control.

Microprocessor host 12 accesses the registers within control status register block 22 using a chip select signal $\overline{DCS}$ and a 7-bit address SADDR. Read/write designations are indicated with a RD/$\overline{WR}$ signal. There are no default settings of the control and status registers within control status register block 22. The integrated audio decoder system 14 relies on the microprocessor host 12 to control the register settings using register access. The integrated audio decoder system 14 can be reset using either a $\overline{RESET}$ pin or by the host writing to a RESET register within the control status register block 22. In either case, the interrupt buffer and all data buffers within the integrated audio decoder system 14 are cleared.

The system decoder block 20 identifies and retrieves the appropriate encoded data from the bit stream and loads this information into an input buffer 24 shown in FIG. 1. The input buffer 24 resides on the same semiconductor substrate with the remaining structures in audio decoder system 14 and, as such, is relatively small. An important advantage of the present invention inheres in the fact that the storage capability of the system can be enhanced by adding an external buffer 26 which may comprise, for example, dynamic random access memory. The addition of external buffer 26 enables the integrated system 14 to work in conjunction with a video decoding system. When the audio decoding system 10 and a video decoding system are working together, the audio system 10 must be able to insert delays in the decoding process as the decoding of the video information takes much more time than the decoding of the audio information. The external buffer 26 enables the audio system 14 to stall the decoding of the audio stream to allow the video decoding to progress. In addition, the external buffer 26 enables the system 14 to perform extremely sophisticated error concealment strategies which depend on the ability to store the last frame of audio information that did not contain any errors. If the external buffer 26 is available, the system 14 can replay the last good frame (LGF) of audio information to conceal the fact that intermediate frames have been corrupted during the transmission process. The methods used by the integrated system 14 automatically detect whether or not an external buffer 26 is present and adjust the error concealment strategy accordingly. In other words, if the storage capability is present to store the last uncorrupted frame, the system 14 will take advantage of that capability to implement the more sophisticated error concealment strategies.

The encoded audio data is retrieved from the input buffer 24 and the external buffer 26 by the audio decoder block 28. The audio decoder block 28 comprises a programmable arithmetic logic unit which retrieves the bit stream from the buffers 24 and 26 and breaks the bit stream up into coded samples associated with the subbands used in the encoding and compression process. The audio decoder also retrieves the subband filter coefficient indices which will be used to generate the final PCM output data.

During the encoding and compression format, the audio information is transformed from PCM audio to subband data in a unit that is referred to as a frame. A frame comprises a set interval of real time audio information which may, for example, fill on the order of 24 milliseconds of audio playback. Frames are divided into 12 blocks. According to one form of data transmission, a single block is divided into three sets. Each set comprises 32 stereo samples. Each sample is either 16 or 18 bits of information and corresponds to approximately a 750 Hz subband slice of a frequency domain ranging from 0 kHz to 20 kHz. This roughly corresponds to the audible range of frequencies. The MPEG compression algorithm provides that the samples are first transformed into subband samples and then are normalized or "scaled" such that the range of the scaled samples is from +1 to −1. In addition, each of the samples can use a varying number of bits to encode the particular sample. For example, some frequency bands do not require the full 16 bits of precision because the quantization noise in that frequency band is not audible to the human ear. In these cases, a smaller number of bits can be used to encode the sample. The audio decoder block 28 expands the samples to 16-bit values and stores the samples and scale factor index values associated with the samples in an arithmetic unit buffer 30 shown in FIG. 1. The scale factor index values can be used to retrieve the scale factors such that the subband data can be "denormalized" or dequantized. The arithmetic unit buffer 30 functions to desynchronize the stream of audio information. The arithmetic unit buffer 30 outputs the samples and scale factor indexes to a hardware filter arithmetic unit block 32 shown in FIG. 1. The hardware filter arithmetic unit block 32 functions to complete the decoding of the audio information from the 16-bit samples and scale factor indexes by dequantizing, transforming, and filtering the subband samples to form conventional PCM audio information which is output to a PCM buffer 34 shown in FIG. 1. The PCM buffer 34 is accessed by a PCM output block 36 which functions to retrieve the data from the PCM buffer 34 and output the data to a conventional digital-to-analog converter 16.

The components of the system 14 that are downstream from the arithmetic unit buffer 30 comprise hardwired systems. Everything upstream from arithmetic unit buffer 30 must be able to handle an unknown instantaneous bit rate received by the host interface block 18 due to the time multiplexed nature of MPEG data streams. The arithmetic unit buffer 30 functions to buffer the data stream so that a constant supply of PCM audio information can be output to the digital-to-analog converter 16. The digital-to-analog converter 16 requires on the order of 1.5 megabits per second of PCM audio data. In contrast, the instantaneous bit rate of the bit stream received by host interface block 18 can be as high as 15 megabits per second under the MPEG standard. In order to insure that the digital to analog converter 16 receives a constant supply of PCM audio data, the system 14 will decode enough data to fill four blocks of data in the PCM buffer 34 before any PCM data is output to the digital analog converter 16. This four block cushion insures that the PCM buffer 34 will never empty and that there will always be PCM audio data to output to the digital analog converter 16.

Control and Status Registers

Control status register block 22 contains the DATA_IN register as described previously. The DATA_IN register can be used by the host to input data in memory mapped mode to the system 14. Block 22 also contains the CRC Error Concealment Mode or CRC_ECM register which specifies the Error Concealment Mode the system 14 uses for CRC error handling. The system 14 may be programmed by the host 12 to disable CRC detection, to mute the output when a CRC error is detected, to repeat the last valid frame of audio data when a CRC error is detected, or to skip any frames where CRC errors are detected. Similarly, the Synchronization Error Concealment Mode or SYNC_ECM register within block 22 is used by the host to specify the Error Concealment Mode the system 14 uses to handle synchronization errors. The system 14 may be instructed to either ignore synchronization errors, mute the output when a synchronization error is detected, repeat the last valid frame of audio data when a synchronization error is detected, or skip any frames where synchronization errors are detected. The PLAY register within block 22 enables the output of decoded audio data. The output from system 14 is only enabled if both the PLAY register and an $\overline{\text{PLAY}}$ input line are asserted by the host 12. The value of the PLAY register does not affect the output of muted audio data. In contrast, the MUTE register within block 22 forces the output of muted PCM data. The output from system 14 will be muted if either the MUTE register or the $\overline{\text{MUTE}}$ input line to system 14 is asserted. The muting of output does not affect the decoding process occurring within system 14. The SKIP register may be used by the microprocessor host 12 to instruct the system 14 to skip the next audio frame. After skipping the next audio frame, the system 14 will reset the SKIP register. Similarly, the REPEAT register instructs the decoder system 14 to repeat the current audio frame. After repeating the frame, the decoder system 14 resets the REPEAT register. The REPEAT register is only active if sufficient internal or external buffer memory 26 is present. As discussed previously, the RESET register within control status register block 22 causes the decoder system 14 to reset. The decoder 14 will reset if either this register is asserted or the $\overline{\text{RESET}}$ input line is asserted. Reset causes the resetting of the interrupt (INTR) register and the flushing of all of the data buffers. In addition, at RESET, the decoder system 14 will locate and size the external memory buffer 26 if present.

The RESTART register within control status register block 22 causes the system 14 to flush all of the data buffers without affecting the control registers. The String Select or STR_SEL register within block 22 is used by the microprocessor host 12 to identify the MPEG format of the bit stream at any one time. An important technical advantage of the integrated system of the present invention is its capability to switch between different bit stream formats without having to reset. The MPEG audio compression/decompression standard allows a system to reset when the format of the bit stream is changed. Even though the format allows such a reset, the system of the present invention enjoys the unique capability of changing the decoding process in real time on a frame-by-frame basis. The Audio Identification Enable or AUD_ID_EN register within block 22 enables or disables the audio stream identification feature discussed previously. The Audio Identification or AUD_ID register is a 5-bit register which specifies 1 of 32 possible audio streams in the MPEG system layer to be decoded. This register is ignored if the audio stream identification feature has not been enabled.

The PCM Order or PCM_ORD register is used by the microprocessor host 12 to specify the order of the PCM output data. This register specifies whether the most or least significant bit of each PCM sample is output first.

The Synchronization Status or SYNC_ST register is a continually updated register that communicates the synchronization status of the system 14. The system can either be locked in synchronization, unlocked, or unlocked and attempting to recover synchronization. The Synchronization Lock or SYNC_LCK register within block 22 specifies the number of good synchronization words Which must be found before the system 14 can consider itself in a locked state. The compressed input bit stream must be synchronized before the decoding process can accurately occur. Synchronization is accomplished by looking for synchronization words which were inserted into the data stream at encoding. Synchronization must be performed both at the audio frame and at the system layer level if such a layer is present. The decoding system 14 performs synchronization acquisition on initial start-up and anytime synchronization is lost due to errors in the data stream. The processes used to locate the data used for synchronization acquisition will be described more fully with reference to FIG. 2 and the details of the system decoder block 20.

The HEADER register is a 20-bit register within control status register block 22 that is used to store the frame header currently being decoded. The PTS register is also contained in block 22 and is a 33-bit register which contains the presentation time stamp associated with the frame currently being decoded. The Buffer or BUFF register in block 22 is a 15-bit register which contains the amount of data being held in the input buffer in 32-bit word increments. The value within this register is updated after every 32-bit data write to the input buffer 24. The BALF_LIM register within block 22 is a 15-bit register which is used by the microprocessor host 12 to set the "almost full" limit for the input buffer 24. Similarly, the BALE_LIM register is used by the microprocessor host 12 to set the "almost empty" limit for the input buffer 24.

The Ancillary Data or ANC register within block 22 is a 32-bit register which functions as a FIFO that holds the last 32 bits of ancillary data in the data stream. The MPEG standard allows for the transmission of ancillary data within the same data stream as audio and video data. The ancillary data register can be used to monitor and control system activity and as such, must be carefully handled by the decoding system 14. The ancillary data buffer can either be replaced by new data on a bit-by-bit basis when full or can generate a full interrupt to the microprocessor host 12 to halt further processing of the audio data until the ancillary data is read from the ANC register or the interrupt is masked. The ANC_AV register holds the number of bits of ancillary data available in the ANC register. The ANC_AV register must be read by the host before reading the ANC register.

The decoder system 14 uses a clock input (PCM_CLK) that is externally synchronized to the compressed audio bit stream. This clock signal may be at the actual PCM output bit rate, or it may be an integer multiple of the bit rate. The system 14 derives the PCM bit clock from the PCM_CLK input by dividing it with the contents of the PCM_DIV register stored in block 22. The PCM_DIV register is an 11-bit register that stores an integer value from 1–1,024. The derivation of the PCM bit clock from the PCM_CLK input allows for the use of oversampling digital-to-analog converters.

The LATENCY register is used to select the decoder latency which has the effect of enabling synchronization look-ahead feature of the present invention. When the synchronization look-ahead feature is enabled, the decoder system 14 will detect a plurality of synchronization words prior to decoding any frames of data.

The FREE_FORM register in block 22 is an 11-bit register which is used by the microprocessor host 12 to specify the frame length, if known, when free format decoding is in process. The SIN_EN register is used by the microprocessor host 12 to specify whether parallel or serial data is being input into the decoder system 14.

The ATTEN_L register and the ATTEN_R register within block 22 are each 6-bit registers which function to hold integer values between 0 and 63 for attenuation of either the left or right channels, respectively. These registers are used during the decoding and decompression processes to allow for programmable balance between the left and right channels of stereo audio data.

The PCM_18 register in block 22 is used to specify the output precision of the PCM output block 36. The output precision is selectable to either 16 bit PCM output or 18 bit PCM output. The PCM_FS register is a 2-bit register which specifies the sampling rate of either 32 kHz, 44.1 kHz or 48 kHz. The DMPH register is a 2-bit register which specifies the mode of deemphasis used during encoding of the audio stream. The SRC and IRC registers are both 33-bit registers which are used to store the system reference clock value and the internal reference clock value, respectively. The IRC_LOAD register causes the IRC register to be loaded with the decoded system reference clock value.

The DRAM_EXT register is used to specify whether or not the external buffer 26 is present. If the external buffer 26 is not present, only the 256 byte internal input buffer 24 is used. As discussed previously, the value in this register will change the error concealment strategy used by the audio decoder block 28, especially with reference to whether or not the audio decoder block 28 has the ability to replay the last frame decoded . without errors.

The EOS register indicates whether or not an end of stream code has been detected. The Interrupt or INTR register is a 16-bit register which communicates a variety of interrupts to the microprocessor host 12. Bit 0 of the INTR register is set when a change has occurred in the synchronization status of the system 14. Bit 1 of the INTR register is set when a valid header has been registered by the decoder system 14. Bit 2 of the INTR register is set when a valid presentation time stamp has been registered by the system 14. Bit 3 of the INTR register is set when the input buffer is below the almost empty limit stored in the BALE_LIM register discussed previously. Bit 4 of the INTR register is set when the input buffer is over the almost full limit stored in the BALF_LIM register discussed previously. Bit 5 of the INTR register is set when a CRC error has been detected. Bit 6 of the INTR register is set when ancillary data has been registered by the system 14. Bit 7 of the INTR register is set when the ancillary register is full. The setting of INTR bit 7 of the INTR register inhibits further placement of the ancillary data into the ancillary data FIFO until the ancillary data is read by the microprocessor host 12 or until interrupt bit 7 is masked. Bit 8 of the INTR register is set when the PCM buffer 34 is in an underflow condition. Bit 9 of the INTR register is set when the sampling frequency of the bit stream is changed. Similarly, bit 10 of the INTR register is set when the deemphasis mode of the bit stream is changed. Bit 11 of the INTR register is set when a system reference clock is detected. Bit 12 of the INTR register is set when an end of stream character is detected. The INTR_EN register is a 16-bit register corresponding to the INTR register. A 1 in any bit position of the INTR_EN register enables the corresponding bit in the INTR register.

System Decoder Block

Figure 2:
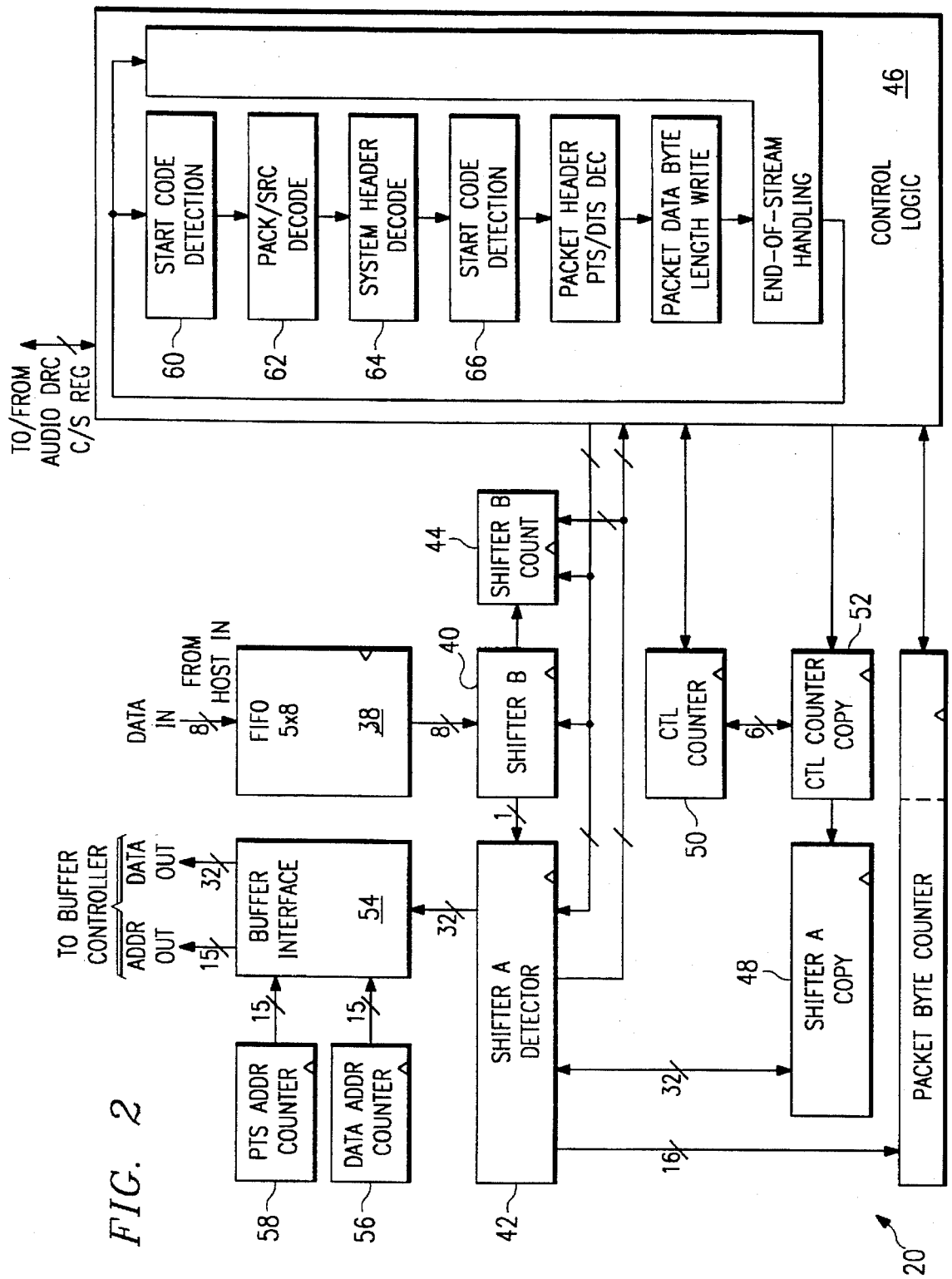
FIG. 2 is a schematic block diagram of the system decoder used in the integrated audio decoder of the present invention.

FIG. 2 is a more detailed schematic illustration of system decoder block 20. System decoder block 20 receives the data from the host interface 18 into a FIFO 38 shown in FIG. 2. The FIFO can store five 8-bit words. The bottom word of the FIFO 38 is loaded into a shifter 40. The data is then shifted out of shifter 40 one bit at a time into a shifter detector 42. The data received in the system decoder 20 contains a variety of data sequences that must be detected. These data sequences are of variable length and hence the data must be examined one bit at a time in shifter detector 42. The shifter 40 is controlled by the control counter 50 through control logic 46. The shifter counter 44 is used to keep track of how many bits remain in shifter 40. The shifter counter 44, the shifter 40 and the shifter detector 42 are all controlled by control logic block 46 shown in FIG. 2.

In operation, the length in bits of the next expected data field is loaded into control counter 50 and shifter 40 shifts the bits one at a time into shifter detector 42 until control counter 50 is decremented to 0. Shifter detector 42 is 33 bits in width. A shifter copy register 48 is used to hold a copy of the number of bits that have been shifted into shifter detector 42. Shifter copy register 48 is used at the end of a stream of bits to temporarily store an incomplete data sequence until more data can be received to complete the loading of shifter detector 42. For example, an end of the data stream may occur when only 16 bits of a 32-bit data structure have been shifted into shifter detector 42. These 16 bits are then loaded into shifter copy register 48 until the remaining bits of the 32-bit data structure are located. At that time, the contents of the shifter copy register 48 is reloaded into shifter detector 42 and the remaining bits of the data structure are shifted in from shifter 40. The shifter 48 is controlled using a CTL counter 50 and a CTL counter copy register 52.

When the shifter detector 42 has 32 bits of information, the data is loaded in parallel to the buffer interface block 54 from which the data can be loaded into the input buffer 24 or external buffer 26. The address that points to where the data is to be written in the buffer 24 is retrieved from the data address counter 56 or the PTS address counter 58. Normal audio data is loaded using the data address counter 56 which is incremented after each 32-bit portion of data is written into the buffer 24. A Presentation Time Stamp is stored in a different portion of the input buffer 24 which is pointed to by the value in the PTS address counter 58.

The control logic block 46 comprises a state machine controller which controls the overall execution of the system decoder 20. The first function of the control logic block 46 is to perform a start code detection indicated at block 60 in FIG. 2. The shifter detector 42 detects, for example, 23 zeroes followed by a specific code as the syntax for the start code. When a start code is detected, the shifter detector 42 communicates this fact to the control logic 46.

The system decoder 20 is capable of decoding three different modes of data. The data stream can either be an audio stream, a packet stream or a full system stream. System decoder 20 is configured for the appropriate mode by reading the STR_SEL register set by the microprocessor host 12. In the case of the audio-only stream, the system decoder merely receives the data in the FIFO 38 and passes it directly into the buffer 24 through the shifter 40 and shifter detector 42. In the case of the audio-only stream, no detection is performed by the system decoder 20. The flow diagram within control logic block 46 in FIG. 2 illustrates the operation of the system decoder 20 in either of the remaining two modes, namely an MPEG packet stream or an MPEG full system stream.

In the case of the full MPEG system stream, the control logic 46 looks for a pack header and a system reference clock in block 62 shown in FIG. 2. According to the MPEG standard, a pack contains a plurality of audio and video packets as well as synchronization information including presentation time stamps and system reference clocks. Each packet within the pack contains only audio data or only video data as well as presentation time stamps. In the full system mode, the system decoder 20 of the present invention proceeds after decoding the pack and SRC to step 64 where the system header information is decoded. System 20 of the present invention then starts to look for a packet start code at step 66.

In the case of an MPEG packet stream, namely the second mode of operation, the control logic 46 would proceed directly to step 66 and search for a packet start code. The system of the present invention is flexible enough to work with the microprocessor host 12 to divide the decoding task in whatever manner the user desires. If the microprocessor host 12 performs all of the decoding tasks and only feeds the desired audio stream to the system decoder, the microprocessor host 12 can instruct the system decoder 20 to merely pass the data along using the STR_SEL register. In contrast, the microprocessor host 12 can perform no system decoding functions and pass the entire MPEG system stream to the system decoder 20. In this circumstance, the control logic 46 detects the beginning of the pack of data and once the beginning of a pack is detected, begins looking for the packet header of the desired audio stream that the microprocessor host 12 has instructed it to decode. The packet header is decoded in step 68 shown in FIG. 2. Step 68 also decodes the presentation time stamps and decode time stamps within the packet header. The packet header is used in the MPEG standard to identify one set of audio data that may be multiplexed among ancillary data, video data and other audio data. In step 68, the control logic 46 compares the audio identification to the value stored in the AUD_ID register to determine whether the packet located is a portion of the audio stream to be decoded. If the packet is to be decoded, the control logic 46 proceeds to step 70 in FIG. 2 where the data within the packet is written into the input buffer 24 or external buffer 26 if present. At step 70, the packet data byte count is extracted from the packet header and loaded into packet byte counter 72 shown in FIG. 2.

The system reference clock is retrieved from the pack header in step 62 and loaded into the CRC register and incremented at a 90 kHz rate. As such, the decoding system 14 maintains copy of the external system reference clock which is updated with each new pack that is decoded. In a similar manner, the PTS is extracted from the packet header in step 68 and loaded into the input buffer 24 at the address indicated by the PTS address counter 58. The presentation time stamp indicates when the particular frame of audio information is to be played with respect to the system reference clock. The system decoder 20 must receive a pack header with a system reference clock at least every 0.07 seconds to maintain an accurate synchronization with the remainder of the system.

The system of the present invention also enjoys an optional mode of operation where the value of the STR_SEL register can indicate that every packet sent to the system decoder 20 is the correct audio stream to be decoded. In this case, the packet header is identified in step 68 but there is no need to compare the audio stream identification within the packet header to the value stored in the AUD_ID register. Under these circumstances, the microprocessor host 12 or other external systems have already decoded the bit stream and extracted the packets for a particular audio stream and transmitted these packets with their packet headers to the decoding system 14.

At step 70, the number of bytes in the packet is loaded from the shifter detector 42 into the packet byte counter 72. The packet byte counter includes a 3-bit extension at the least significant end of the counter such that the packet byte counter 72 can decrement as each bit is shifted by shifter 40. The 3-bit extension has the effect of changing the packet byte count into a packet bit count. Packet byte counter 72 includes the capability to detect all zeroes in the bit count. When all zeroes are present in the packet byte counter 72, the control logic 46 returns to step 60 to search for a start code.

Control logic 46 also includes an end-of-stream handler 74. At the end of a packet, the control logic 46 looks for an end-of-stream code in the data stream. The end-of-stream code indicates the end of a pack. If such a code is found, the control logic 46 returns to step 60 and looks for the start code detection for a new pack. If the end of the packet is reached and there is no end-of-stream code present, the control logic 46 returns to step 66 and looks for the next appropriate start code for the next packet to be decoded. Block 74 is also drawn in parallel with step 60 through 70 because the end-of-stream may also be an asynchronous condition presented in the middle of an audio stream. For example, the microprocessor host 12 can transmit an end-of-stream condition to instruct the decoder system 14 that the data that follows is unrelated to the data prior to the end of stream. In this case, the control logic 46 will load the data within the shifter detector 42 into the buffer 24 and will then save the value of the data address in the data address counter 56. When the audio decoder block 28 attempts to address the data located at the address of the end-of-stream code, the audio decoder block performs a restart which has the effect of zeroing out the hardware filter arithmetic unit block 32. This insures that the data prior to the end-of-stream does not affect the data following the end-of stream. If an end-of-stream character is received from the host, the system 20 will clear the FIFO 38 before performing the end-of-stream handling. The shifter A copy register 48 is used to store the data bits in shifter A when less than 32 bits have been received in a data stream and intermediate control information is in the bit stream. For example, the end of a frame could contain only 16 bits of a 32-bit group prior to the frame header for the next frame. These 16 bits are stored in the shifter A copy register 48. The control counter register 50 is used by the control logic 46 to determine whether or not the information in shifter detector 42 is a complete 32-bit value. This is accomplished by loading the number 32 into control counter 50 and then decrementing the value in control counter 50 each time a bit is shifted into shifter detector 42. When the control counter 50 reaches 0, the contents of shifter detector 42 are loaded in parallel to the buffer interface 54. The contents of the control counter 50 are copied into control counter copy register 52 when an incomplete value is present in shifter detector 42. The control counter 50 is also used to retrieve specified bit length fields from headers. For example, if a 6-bit field was needed from a system packet, pack or frame header, the value 6 would be loaded into the control counter 50 and decremented each time the shifter 40 shifted a new bit into shifter detector 42. When the control counter 50 had counted from 6 to 0, the contents of the shifter detector 42 would contain the desired 6-bit value from the bit stream.

Audio Decoder Block

Figure 3:
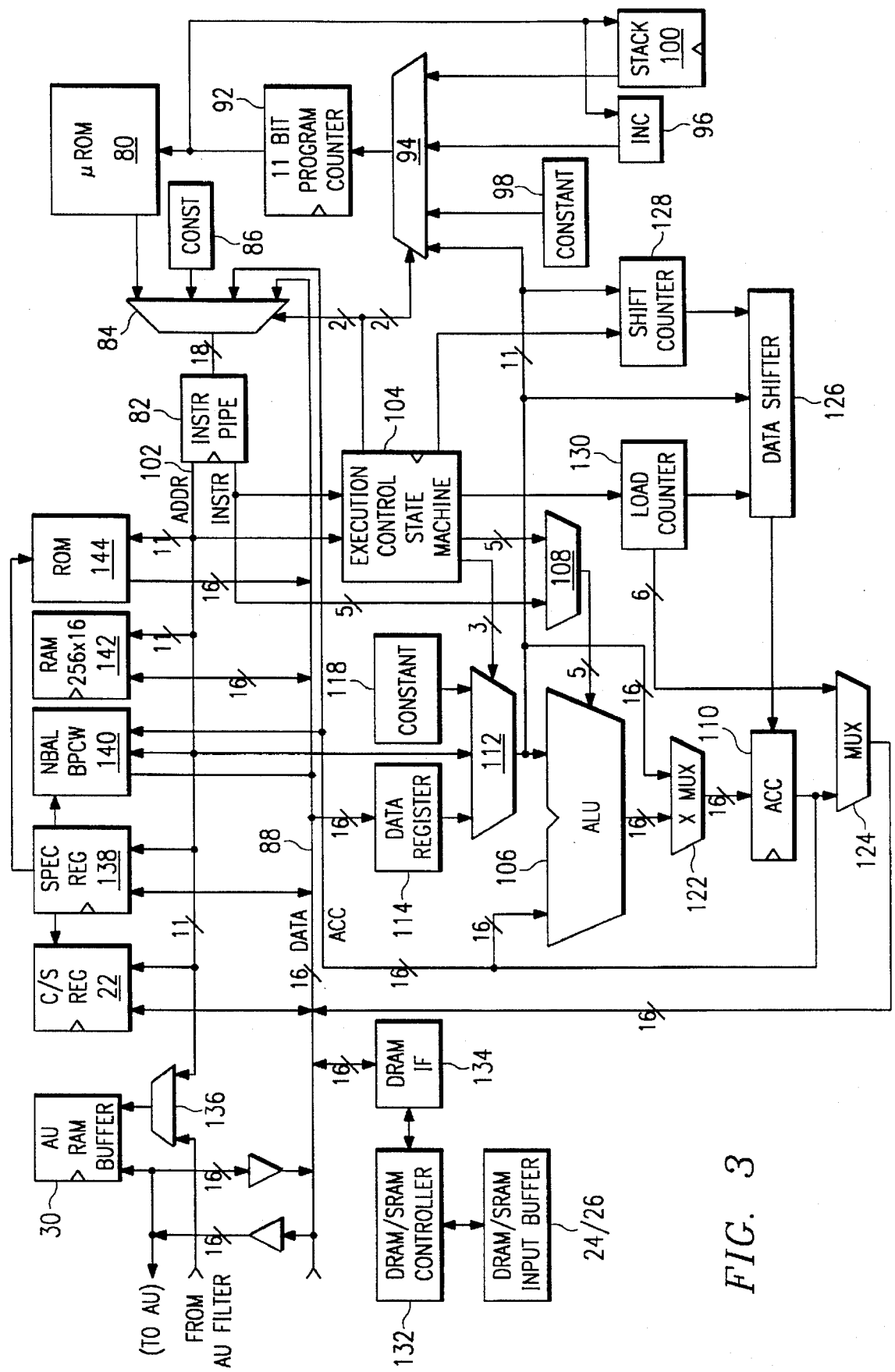
FIG. 3 is a schematic block diagram of the audio decoder block used in the integrated audio decoder system of the present invention.

FIG. 3 is a schematic block diagram of one possible embodiment of audio decoder block 28. Audio decoder block 28 comprises a microprogram read-only memory 80 which supplies 18-bit instructions to an instruction pipe register 82 through an instruction multiplexer 84. Instruction multiplexer 84 also receives input from a constant store 86 and from a data bus 88 and an accumulator bus 90. Microprogram read-only memory 80 is accessed using a value stored in a program counter 92. Program counter 92 stores an 11-bit pointer into microprogram read-only memory 80. Program counter 92 is loaded through a program counter multiplexer 94 which receives inputs from an incrementer 96, a constant store 98, a sub-routine stack 100 and a branching bus 102. The output of program counter 92 can be optionally loaded into incrementer 96 and sub-routine stack 100. Constant store 98 stores addresses for reset and restart operations and stores a plurality of programmable break points which can be used to set branch points during the operation of audio decoder block 28. Instruction multiplexer 84 and program counter multiplexer 94 are controlled by an execution control state machine 104.

The 18-bit instruction format used by decoder block 28 includes a 5-bit instruction which is used to control an arithmetic logic unit 106 by feeding the 5-bit instruction through a control multiplexer 108. Multiplexer 108 receives a 5-bit instruction from either instruction pipe register 82 or execution control state machine 104.

Arithmetic logic unit 106 is a 16-bit full function arithmetic logic unit which receives one operand from the accumulator bus 90 coupled to accumulator 110. The remaining input to arithmetic logic unit 106 is received from a multiplexer 112 which receives one input from a data register 114 coupled to data bus 88. The remaining inputs to multiplexer 112 are received from a constant register 118 and an address bus 120. Multiplexer 112 is also capable of performing concatenation of values received from the constant register 118 and the address bus 120. Multiplexer 112 is controlled by execution control state machine 104. The output of multiplexer 112 is coupled to the input of program counter multiplexer 94 through branching bus 102. In addition, the output of multiplexer 112 is passed to the accumulator 110 through a bypass multiplexer 122 to provide a way to bypass arithmetic logic unit 106. The contents of accumulator 110 can be transferred to the data bus 88 through a multiplexer 124. Accumulator 110 is also operable to receive bits from a data shifter 126 which is 32 bits long. Data shifter 126 can be loaded in 16-bit increments from data register 114 through multiplexer 112. Data shifter 126 is controlled by a shift controller 128 which is in turn controlled by execution control state machine 104. A 6-bit load shift counter 130 is used to keep track of how many bits have been shifted out of data shifter 126. Shift counter 130 is controlled by execution control state machine 104. The value within shift counter 130 may be transferred to the data bus through multiplexer 124.

In operation, the audio decoder block 28 receives 32-bit data fields from the input buffer 24 through a DRAM/SRAM controller 132 and a DRAM interface 134. The 32-bit data fields are accessed in sequential 16-bit read operations. Process data is loaded into arithmetic unit buffer 30. In addition, the arithmetic unit buffer 30 can be used as a scratch pad memory and values retrieved through the data bus 88. The arithmetic unit buffer 30 is addressed from address bus 120 through an address multiplexer 136. Address multiplexer 136 determines whether the arithmetic unit buffer 30 is accessed by the audio decoder block 28 or the hardware filter arithmetic unit block 32. Data bus 88 and address bus 120 are respectively coupled to the control and status register block 22. In addition, data bus 88 and address bus 120 are coupled to special register block 138 which comprises CRC registers, subband counters, end-of-stream registers and the like. In general, special register block 138 contains registers used internally by system 14 and control and status register block 22 contains registers accessed by both system 14 and microprocessor host 12. For example, special register 138 includes a register which stores the current header for the frame being decoded. Information from this header is used to access the nBAL and BPCW read-only memory table 140 and the read-only memory table 144. In addition, the special register 138 includes a register which stores the subband counter. This counter is incremented as each subband is operated on. The subband number is also used to access the memories 140 and 144. In addition, the data register 88 and the address register 120 and the accumulator bus 90 are coupled to a nBAL and BPCW read-only memory table 146 which is used to store values for the number of bits allocated per sample and bits per code word used in the decoding of the audio bit stream.

The data bus 88 and the address bus 120 are also coupled to a random access memory scratch pad 142 which comprises memory to store 256 16-bit words. The data bus 88 and the address bus 120 are also coupled to a read-only memory table 144 which is used to store values used to calculate the frame length and other constants used in the decoding of the audio bit stream.

In operation, the audio decoder block 28 executes 18-bit microcode instructions having a 5-bit instruction field, a 2-bit field specifying the operand type and an 11-bit field which can contain an immediate operand or a regular or indirect address reference. The audio decoder block 28 executes the following instruction set to perform the routines necessary to decode the bit stream received from the input buffer 24.

| Instruction Mnemonic | Instr. Bits | Op. (00) Reg. | Type (01) Imm. | (10) Indir. | Operation Description |
|---|---|---|---|---|---|
| ADD | 00000 | y | y | y | Acc + Op -> Acc |
| SUB | 00001 | y | y | y | Acc - Op -> Acc |
| AND | 00010 | y | y | y | Acc AND Op -> Acc |
| OR | 00011 | y | y | y | Acc OR Op -> Acc |
| XOR | 00100 | y | y | y | Acc XOR Op -> Acc |
| GSYN | 00101 | y | y | y | Search for Syn. Word |
| SRL | 01000 | y | y | y | Logical right shift Acc |
| SLL | 01001 | y | y | y | Logical left shift Acc |
| SRC | 01010 | y | y | y | Circular right shift Acc |
| SRA | 01011 | y | y | y | Arithmetic right shift Acc |
| GBT | 01100 | y | y | y | Get bits from input buffer or external buffer |
| GBTC | 01101 | y | y | y | Get & CRC check bits from input buffer or external buffer |
| GBTF | 01110 | y | y | y | Flush shifter/Get bits from input buffer or external buffer |
| GANC | 01111 | y | y | y | Get bits & write to ANC buffer |
| BZ | 10000 | y | y | y | Branch on zero |
| BNZ | 10001 | y | y | y | Branch on not zero |
| BO | 10010 | y | y | y | Branch on overflow |
| BNEG | 10011 | y | y | y | Branch on negative |
| BC | 10100 | y | y | y | Branch on carry-out |
| ADD | 00000 | y | y | y | Acc + Op -> Acc |
| SUB | 00001 | y | y | y | Acc - Op -> Acc |
| BPOS | 10101 | y | y | y | Branch on greater than zero |
| B | 10110 | y | y | y | Unconditional branch |
| CALL | 10111 | y | y | y | Branch and push PC to stack |
| READ | 11000 | y | n | y | Buffer read |
| WRT | 11001 | y | n | y | Buffer write |
| RET | 11010 | n | n | n | Pop PC stack |
| GTBL (Get Table) | 11101 | n | n | n | ROM Table -> Acc |
| LDA | 11110 | y | y | y | Op -> Acc |
| STA | 11111 | y | n | y | Acc -> Mem |

Each time the input buffer 24 is accessed, the DRAM controller 132 and the DRAM interface 134 will return 32 bits which are loaded in successive 16-bit load operations to the data shifter 126 through the data register 114 and the multiplexer 112. For example, in a Get Bit or GBT instruction, the number of bits to be retrieved are loaded by the execution control state machine 104 into the load counter 130. The data shifter 126 would then be filled with the next 32 bits from the input buffer. The specified number of bits would then be shifted out of the data shifter 126 into the accumulator 110 as the low counter 130 would be decremented to 0. Once the required number of bits are in the accumulator 110, the bits may be operated on by the ALU 106 or routed as desired. In this manner, any specified number of bits can be retrieved from the input buffer 24 using a single instruction. The audio decoder block 28 always reads 32 bits from the DRAM input buffer 24 to reduce the system traffic. This is due to the fact that the system decoder block 20 also must access the input buffer 24. In fact, the system decoder block 20 must have priority to access the input buffer 24 over the audio decoder block 28 to insure that the system decoder block 20 can handle bursts of input data up to 15 megabits per second. The data shifter 126 therefore acts as a 32-bit buffer to allow for operations to continue within the audio decoder block 28 without requiring as many accesses to the input buffer 24.

The GBT instruction extracts the next N bits from the incoming bit stream stored in the input buffer 24. The instruction first returns a 16-bit word and stores it in the accumulator 110. The instruction first clears the accumulator 110 and then shifts the requisite number of data bits into the accumulator from the data shifter 126. If there are not enough bits already in the data shifter 126, a read of the input buffer 24 will automatically be initiated. The value in the load counter 130 is saved at the conclusion of the instruction execution. This value is saved in the memory 142 and is used to calculate the bit offset of the data stream. The number 32 is loaded into the load counter 130 whenever a new 32-bit data is read from the input buffer 24.

The GBTC instruction is identical to the GBT instruction except that the bits retrieved from the input buffer 24 are automatically checked for CRC errors. The GBTF instruction is also the same as the GBT instruction except that the data bits present in the data shifter 126 are first flushed and the instruction begins with a new 32-bit read of the input buffer 24.

The GSYN instruction is used to search for a synchronization word in the input bit stream. This instruction operates in the same manner as the GBT instruction except that it stops when a synchronization word is detected or the value in the shift counter 128 is 0. The synchronization word detection is performed by the accumulator 110. The GANC instruction is used to retrieve ancillary data. This instruction operates in the same manner as the GBT instruction, except that the bits are also stored in the ancillary buffer register within control status register block 22. The instruction can also halt in the middle of execution if the ancillary buffer overflows. The GANC instruction will also set the appropriate interrupts if the ancillary buffer overflows or every time 16 bits of ancillary data is available as will be described herein.

The GTBL instruction is used to return a variety of MPEG audio-related constants from the tables within read-only memories 140 and 144. The GTBL instruction can return a value for nBAL, BPCW, bound or frame length. The needed information for this instruction is taken from the value stored in the header register within special register block 138. Additionally, when the BPCW value is to be retrieved, the number for the BAL must be present in the accumulator 110. The remaining instructions within the instruction set operate in conventional manners.

The GANC instruction causes the audio decoder block 28 to retrieve a specified number of ancillary data bits and place them in an ancillary data buffer within control and status register block 22. This buffer register is 32 bits in length and functions as a FIFO. When a predetermined number of bits have been loaded into the buffer, an interrupt will inform the host that ancillary data is present. When the host attempts to read the ancillary data, the buffer will be transferred into the ancillary data register. This process allows more ancillary data to be loaded into the buffer. In one optional mode of operation, if the ancillary buffer is filled, an interrupt will be generated that will stop all processing until the microprocessor host 12 reads the ancillary data. This mode insures that no ancillary data will be lost due to the operation of the FIFO nature of the ancillary data buffer. An additional register keeps a count of how many ancillary data bits are within the ancillary data buffer. When the host 12 reads the count, the ancillary data buffer is transferred into the ancillary data register within control status register block 22.

The operation of the audio decoder block 28 in the decoding of the data stream, the acquisition of synchronization with the data stream, the concealment of errors within the data stream and the buffer management and other control functions will be discussed specifically with reference to the flow charts shown in detail in FIGS. 11 through Block 31.

Hardware Filter Arithmetic Unit

Figure 4:
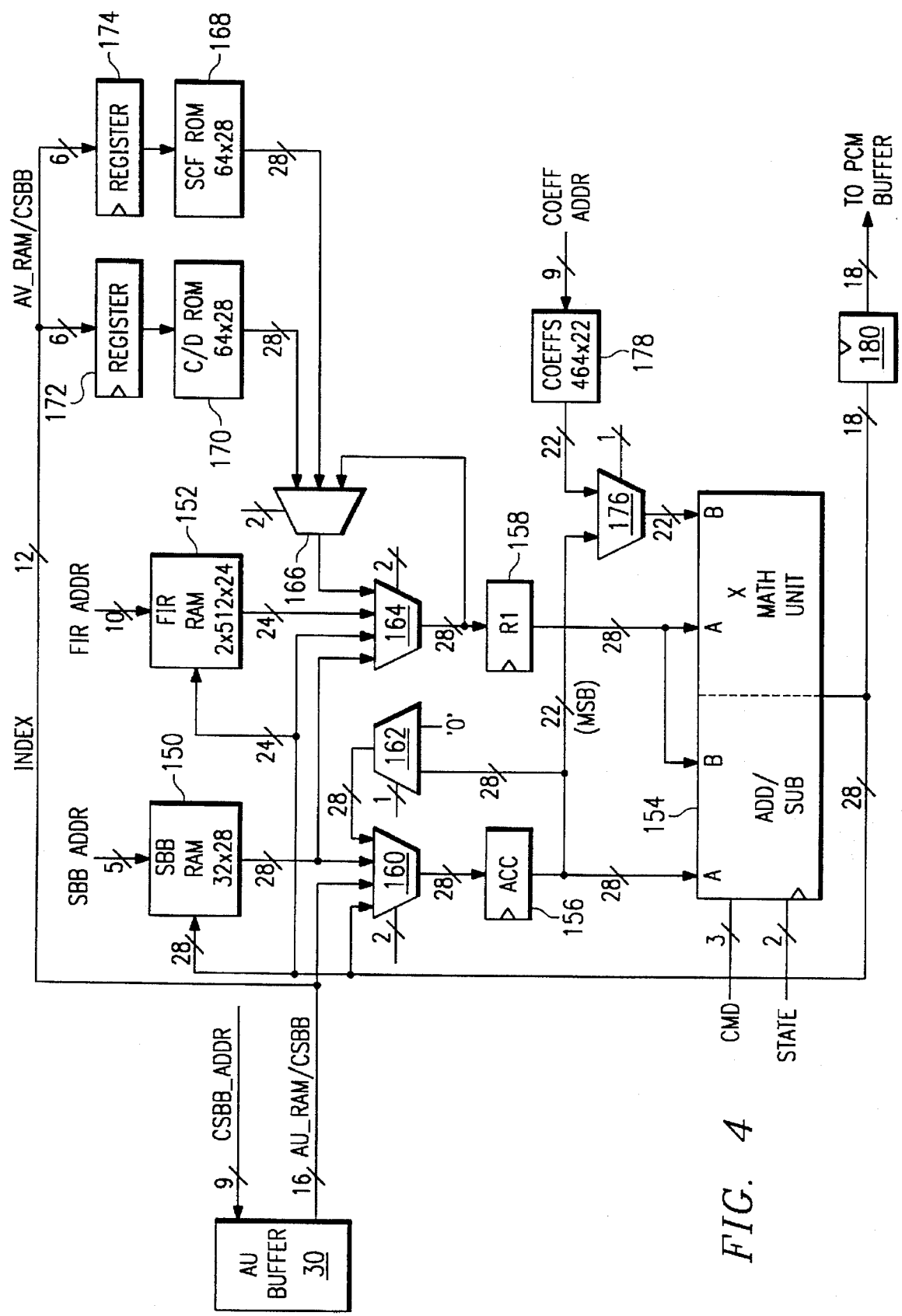
FIG. 4 is a schematic block diagram of the hardware filter arithmetic unit used in the integrated audio decoder system of the present invention.

FIG. 4 is a schematic illustration of one embodiment of the hardware filter arithmetic unit block 32. In general, the arithmetic unit block 32 functions to dequantize the samples retrieved from the arithmetic unit buffer 30 and store the results in a sample memory 150 shown in FIG. 4. The arithmetic unit 32 then retrieves the samples from memory 150 and performs a fast cosine transform on the data and writes the results of the transform to a finite impulse response (FIR) memory 152 shown in FIG. 4. The arithmetic unit 32 then retrieves the data from the FIR memory 152 and performs a FIR filter operation on the data and writes the results to the PCM buffer 34. The dequantization process is set out in the MPEG specification to be a large 32×32 matrix operation. According to the teachings of the present invention, the large matrix operation is replaced by a fast Fourier-like transform operation which is implemented with the system shown in FIG. 4.

Hardware Description of the Hardware Filter Arithmetic Unit

Arithmetic unit block 32 comprises a math unit 154 which receives one operand from an accumulator 156 and a second operand from a register 158. Accumulator 156 is loaded through a multiplexer 160. Multiplexer 160 has one input coupled to the output of math unit 154. A second input of multiplexer 160 is coupled to a 16-bit bus connecting arithmetic unit block 32 to the arithmetic unit buffer 30. A third input of multiplexer 160 receives values from the SBB RAM 150. A fourth input to multiplexer 160 is retrieved from a multiplexer 162 which functions either to input the constant zero or to provide a feedback path from the output of accumulator 156.

Register 158 is loaded through a multiplexer 164. Multiplexer 164 has a first input coupled to the output of the FIR RAM 152. The second input of multiplexer 164 is coupled to the output of the SBB RAM 150. A third input of multiplexer 164 is coupled to the output of math unit 154. The fourth and final input of multiplexer 164 is coupled to the output of the multiplexer 166. Multiplexer 166 has a first input coupled to the output of multiplexer 164. A second input of multiplexer 166 is coupled to the output of a scale factor read-only memory 168. Scale factor read-only memory 168 contains 64 28-bit values and is a table of the scale factors used in the synthesis of the subband values. Scale factor read-only memory 168 is accessed using the scale factor index values generated by audio decoder block 28 and placed in arithmetic unit buffer 30. A third and final input of multiplexer 166 is coupled to the output of a C/D coefficient read-only memory 170. Read-only memory 170 stores the C and D coefficients also used in the synthesis of the subband data. Read-only memory 170 is addressed using a value stored in an address register 172. Scale factor read-only memory 168 is addressed using a value stored in an address register 174. Values input into registers 172 and 174 are retrieved from 12 bits of the value output from the arithmetic unit buffer 30. The arithmetic unit buffer 30 is accessed using a CSBB-ADDR address value which comprises 9 bits.

Math unit 144 comprises an adder/subtractor portion in parallel with a multiplier portion. The multiplier portion of math unit 154 receives a first input directly from register 158 and receives a second input from a multiplexer 176. Multiplexer 176 has first input coupled to the output of accumulator 156 and a second input coupled to the output of a coefficient memory 178. Coefficient memory 178 stores 464 22-bit coefficients and is addressed using a 9-bit coefficient COEFF-ADDR value. Math unit 154 is configured using a 3-bit CMD field and a 2-bit STATE field. The output of math unit 154 is also fed to a buffer register 180 from which the values are transferred into the PCM buffer 34.

Figure 5:
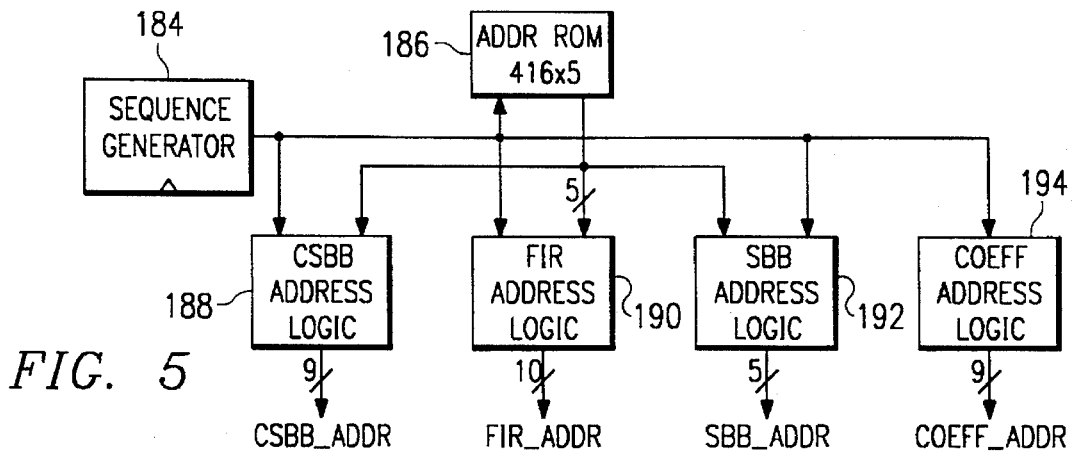
FIG. 5 is a schematic block diagram that illustrates the address generation system used by the hardware filter arithmetic unit of the present invention.

FIG. 5 is a schematic block diagram illustrating the systems used to generate the addresses used by the arithmetic unit 32 shown in FIG. 4. FIG. 5 illustrates an address generator indicated generally at 182 which comprises a sequence generator 184. Sequence generator 184 comprises a state machine which is operable to generate a state value which is output to an address read-only memory 186. Address read-only memory 186 contains 416 5-bit index values which are output to three sets of address logic. The first such address logic is the CSBB address logic block 188 which generates the 9-bit CSBB-ADDR value from the STATE value output by sequence generator 184 and the index output by address read-only memory 186. Similarly, the FIR address logic 190 generates the 10-bit FIR-ADDR value and the SBB address logic block 192 generates the 5-bit SBB-ADDR value. The coefficient address logic 194 generates the 9-bit COEFF-ADDR value directly from the STATE value output by sequence generator 184.

Figure 6:
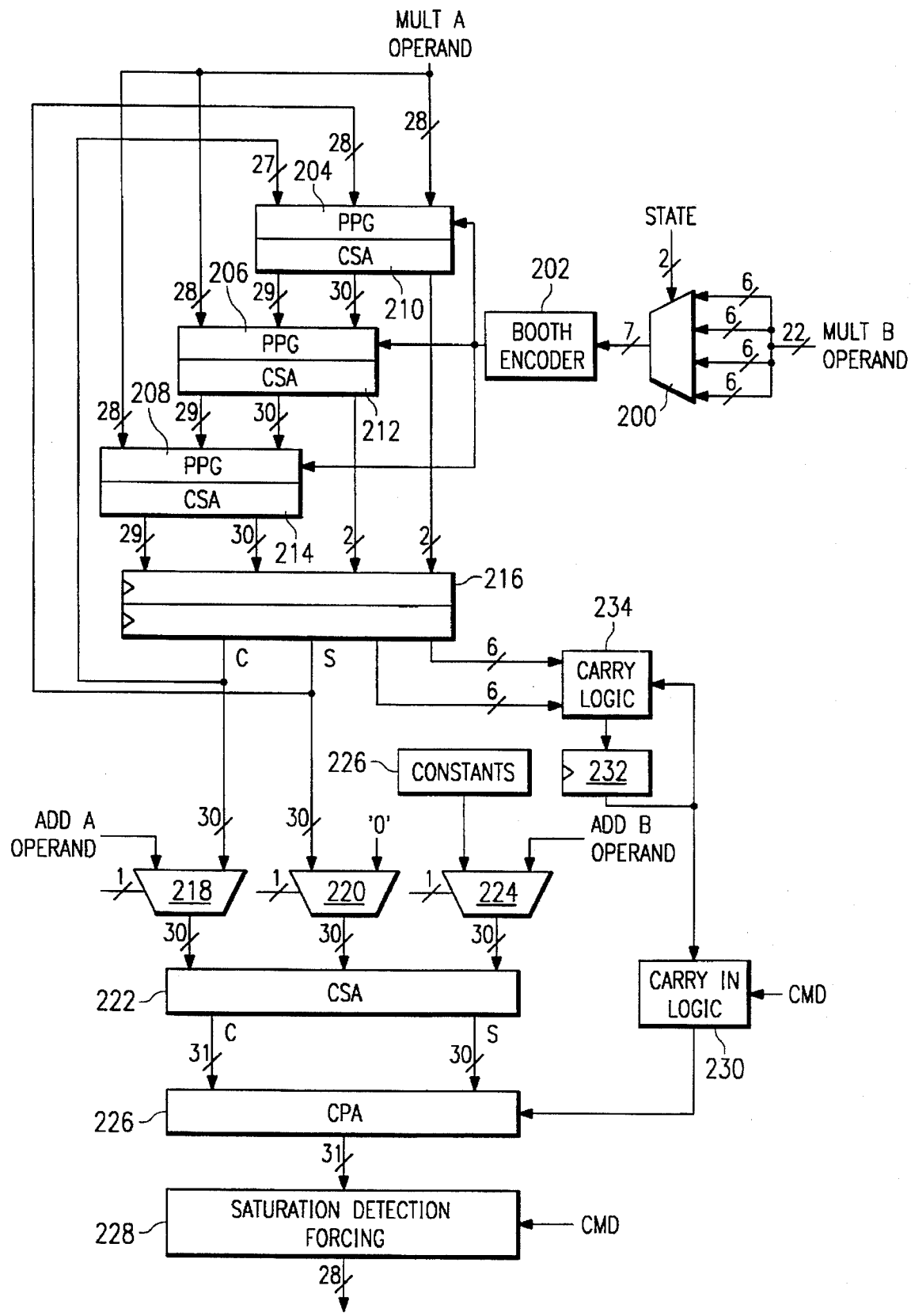
FIG. 6 is a more detailed schematic block diagram of the math, unit used in the hardware filter arithmetic unit of the present invention.

FIG. 6 is a schematic block diagram showing one possible embodiment of math unit block 154 which was described with reference to FIG. 4 previously. The multiplier portion of math unit 154 receives the B operand which is a 22-bit value split into 6-bit values input into multiplexer 200 which outputs a 7-bit value to a Booth encoder 202. Booth encoder 202 drives partial product generators 204, 206 and 208. Partial product generator 204 is coupled to a carry/save adder 210. Similarly, partial product generator 206 is coupled to a carry/save adder 212 and partial product generator 208 is coupled to a carry/save adder 214. The A operand is input into partial product generators 204, 206 and 208. Carry/save adder 214 outputs a 29-bit carry output and a 30-bit save output to a 34-bit pipeline register 216. Pipeline register 216 also receives a 2-bit field from carry/save adder 212 and a 2-bit field from carry/save adder 210. Pipeline register 216 outputs a carry output to a multiplexer 218 and a 30-bit saved output to a multiplexer 220. The carry and save outputs of pipeline register 216 are also fed back to the inputs of partial product generator 204. Multiplexer 218 serves to select between the carry output from pipeline register 216 and the adder A operand received from accumulator register 156 described with reference to FIG. 4. Multiplexer 218 outputs the selected value to a carry/save adder 222. Carry/save adder 222 receives the second input from multiplexer 220 which selects between the save output of pipeline register 216 and a constant equal to zero. Carry/save adder 222 receives a third input from a multiplexer 224 which selects between a constant store 226 and the adder B operand received from the R1 register 158 discussed with reference to FIG. 4 previously. Carry/save adder 222 outputs a carry output and a save output to a carry propagate adder 226. Carry propagate adder 226 outputs a 31-bit value to a saturation detection and zero forcing block 228. Saturation detection and zero forcing block 228 receives the CMD signal to enable it to force zeroes at its output or to force the highest or smallest number representable by the 28-bit field responsive to a saturation condition or the CMD signal. The carry propagate adder 226 receives signals from a carry-in logic block 230. The carry-in logic block 230 receives signals from a carry storage register 232 and the CMD signal. Carry storage register 232 receives signals from a carry logic block 234 which is coupled to two separate 6-bit fields stored within the pipeline register 216.

The math unit 154 performs the functions of addition and subtraction. Math unit 154 can also pass the A operand unchanged or force zeroes at its output. Math unit 154 can also multiply the A and B operands yielding a 28-bit or 22-bit result. Additionally, the math unit can round the value at its input to either 16 or 18 bits.

The operands for the addition/subtraction portion of the math unit 154 are both in 3.25 format indicating that 3 of the bits represent whole numbers and 25 bits represent the fractional portion of the number. The A operand for the multiplication portion of math unit 154 is also a number in 3.25 format. The B operand of the multiplier portion is a number in a 2.20 format. The addition/subtraction, pass A, force zero, and full multiply all yield a result in a 3.25 format. The 22-bit multiply yields a result in a 2.20 format. The 16-bit round and the 18-bit round operations yield numbers in a 1.15 format, and a 1.17 format, respectively. The multiplier portion of math unit 154 is a multi-cycle multiplier with a five cycle latency. Four clock cycles are spent in the operations prior to pipeline register 216 and one cycle is spent in the remainder of math unit 154. Carry/save adder 222 and carry/propagate adder 226 perform the full carry look-ahead addition operation which yields the final result. The bottom portion of math unit 154 is also used for the addition/subtraction, pass A, force zero, and 16 and 18-bit round operations. The results of multiplication operations are rounded by adding a 1 at the next-to-least significant bit position. The round-to-sixteen and round-to-eighteen operations also add a 1 to the next-to-least significant bit position and then performs a check of the range of the result and then forces the output to the maximum positive or minimum negative number.

Operation of the Hardware Filter Arithmetic Unit

In general, the hardware filter arithmetic unit block 32 is used in three modes. The first of these modes is a dequantization of the coded samples using the scale factor index values retrieved from the bit stream and coefficients stored in read-only memory tables. The second mode of operation is a fast cosine transform. The third mode of operation is a finite impulse response filtering. These three sequential operations yield the PCM output data which is stored in the PCM buffer 34 for retrieval by the PCM output block 36.

In the notation used for this description, Subband[k] is the input subband vector after decoding. N[i][k] is the synthesis matrix and v[i] is the result of the multiplication of the matrix N by the vector Subband[k]. v is a vector of dimension 64.

In the MPEG-audio decoder of the present invention, v is replaced by v' of dimension 32, as explained below. This substitution brings two advantages: it reduces by a factor of 2 the dimension of the problem to solve (number of multiply-adds and memory size) and, since the matrix is that of a direct cosine transform the product can be implemented using a fast direct cosine transform which will further reduce the number of multiply-adds and memory size.

SUBBAND SYNTHESIS $v[i] = \text{SUM} \{ N[i][k] * \text{Subband}[k]\}$ over $k = [0,31]$
for $i = [0,63]$ with $N[i][k] = \cos((i+16)*(2*k+1)*pi/64)$
$= \text{dctCoef}[i+16][k]$ then:
$v[i] = \text{SUM} \{ \text{dctCoef}[i+16][k] * \text{subband}[k] \}$ over $k=[0,31]$
for $i = [0,63]$ An equivalent form is:
$v'[i] = \text{SUM} \{ \text{dctCoef}[i][k] * \text{subband}[k]\}$ over $k=[0,31]$
for $i = [0,31]$ This is effectively implemented as:
$v'[32] = \text{Fast.Cosine.Transform}\{ \text{subband}[32]\}$
with:
$v[i] = v'[i+16]$     $0 <= i <= 15$
$v[i] = 0$     $i = 16$
$v[i] = -v'[48-i]$     $17 <= i <= 48$
$v[i] = -v[i-48]$     $49 <= i <= 63$ Because of the symmetries of the CT coefficients, V' exhibits the following symmetries:
$v'[i] = v'[-i]$
$v'[64-i] = -v'[i]$
$v'[32] = 0.$ In the following, V is the array of dimension 1024 as described in the subband synthesis flow chart of the MPEG specification. V is the input to a 16 tap FIR filter. The vector U of dimension 512 is the memory of the FIR filter.

In the operation of the hardware filter of the present invention, V is replaced by V' of dimension 512 and U is unchanged.

Filtering operation

The MPEG specification defines a vector V[1024] built as a FIFO that contains a sequence of 16 consecutive vectors v[64].

The vector U[512] is defined as:

$U[i+64*j] = V[i+128*j]$    for $i=[0,31]$    and $j=[0,7]$
$= V[i+64+128*j]$    for $i=[32,63]$    and $j=[0,7]$ Then the output samples S are obtained by: for $i=[0,31]$ $S[i]=\text{SUM}\{U[i+32*j] * D[i+32,j]\}$ over $j=[0,15]$. The actual implementation is derived as follows:

U as function of V can be rewritten as:

$$U[i+32*j] = V[i+64*j] \quad \text{for } i=[0,31],$$
$$j=[0,14] \text{ and } j \text{ even}$$
$$= V[i+64*j-32] \quad \text{for } i=[0,31],$$
$$j=[1,15] \text{ and } j \text{ odd}$$

Similarly to V, V'[512] also represents a sequence of 16 consecutive vectors V'[32] (as defined above).

Using the equations above and the symmetries of V', U can be expressed as a function of V' by the following equations:

$$U[i+32*j] = V[i+16+32*j] \quad \text{for } i=[0,15], \quad j=[0,14] \text{ and } j \text{ even}$$
$$= 0 \quad \text{for } i=16 \text{ and } \quad j=[0,14] \text{ and } j \text{ even}$$
$$= -V'[16-i+32*j] \quad \text{for } i=[0,16], \quad j=[1,15] \text{ and } j \text{ odd}$$
$$= -V'[48-i+32*j] \quad \text{for } i=[17,31], \quad j=[0,14] \text{ and } j \text{ even}$$
$$= -V'[i-16+32*j] \quad \text{for } i=[17,31], \quad j=[1,15] \text{ and } j \text{ odd}$$

During the operation of the FIR filter, the addressing of the FIR RAM 152 is simplified by using an address table.
In the expression of the FIR filter:
S[i]=SUM{U[i+32,j] * D[i+32,j]} over j=[0,15], or S[i]=SUM{(+/−)V'[index+32,j] * D[i+32*j]} over j=[0,15]
The index is calculated as follows:

$$\text{index} = i+16 \quad \text{for } i=[0,16] \quad \text{and } j \text{ even}$$
$$16-i \quad \text{for } i=[0,16] \quad \text{and } j \text{ odd}$$
$$48-i \quad \text{for } i=[17,31] \quad \text{and } j \text{ even}$$
$$i-16 \quad \text{for } i=[17,31] \quad \text{and } j \text{ odd}$$

Vindextable[32] contains index for i=[0,31].
In the expression of the FIR filter:
S[i]=SUM{(+/−)V'[index+32,j] * D[i+32*j]} over j=[0,15]
The addition/subtraction operation that depends of the value of the index (according to the expression of U as a function of V') can be replaced by a straight addition by modifying the FIR coefficients in D. In addition the size of the coefficient table can be reduced by a factor 2 by using the symmetry:

D[i]=−D[512-i] for i=64j where j=[0,15]
D[i]=D[512-i] for i=64j+m where j=[0,15] and m=[1,63].

As a result, the 256 elements, coefficient table is calculated as follows:

firCoef[i+32*j]=D[i+32*j] for i=[0,15], j=[0,14] and j even
firCoef[i+32*j]=−D[i+32*j] for i=[0,16], j=[1,15] and j odd and for i=[17,31] and j=[0,15]
The fact that firCoef[16+32j]=0 for j=[0,14] and j even has to be as an exception into the FIR filter.

The FIR filtering is then implemented as: S[i]=SUM{V'[Vindextable[i]]+32*j]*firCoef[i+32*j]} for i+32*j<=256 or S[i]=SUM{V'[Vindextable[i]]+32*j]*firCoef{512-(i+32*j)} for i+32*j>256 and firCoef forced to 0 when i=16 and j=0,2,4,6,8,10,12 or 14.

Fast-cosine-Transform operation

A flow-graph approach is used as opposed to a matrix formulation because the present implementation reduces the coefficient table from 1 k to 32 elements and reduces significantly the amount of calculation, thus allowing a slower clock rate.

The particular operation described herein was chosen because the coefficients involved are bound by positive and negative 1 and lead to a fixed-point implementation for a given required precision.

The flow of calculation involves two operators: a "butterfly" operator of the form:

y1=x1+x2
y2=(x1−x2)*d and a "subtract" operator of the form:

y1=x1
y2=x2−x1

Where the vector x[32] is the result of the previous iteration and the vector y[32] is the result of this iteration. There are 5 iterations.

The vector x[32] is initialized by the subband vector after its dequantification. However to simplify the following addressing of the x/y vector it is first reordered in the "Hadamard order":

x[i]=subband[h[i]] where h[i] is built with the following algorithm:

h[0]=0;
for (k=1; k<32; k *=2) for (i=k−1; i>=0; i—)
h[2*i]=h[i];
h[2*i+1]=2*k−1−h[i];

That table is stored in a ROM and used in the hw to reorder the subband samples at the time of their dequantification.

Then at each iteration the vector x[32] and y[32] must be addressed in a non sequential manner.

In the hw implementation, the address calculation at each stage of the iteration is also replaced by a table look-up for simplicity.

The butterfly and subtract operators are applied sequentially and iteratively in the following way: for(channel=0;channel<2;channel++)

```
for(channel=0;channel<2;channel++)
 {
  for(k=0;k<5;k++)
   {
    for(i=0;i<16;i++)
    butterflyOperator(&subbandVector[channel][butterflyOp1[k][i],
     &subbandVector[channel][butterflyOp2[k][i],
     &subbandVector[channel][butterflyOp1[k][i],
     &subbandVector[channel][butterflyOp2[k][i],
      &FCTcoef[k][i]);
    for(i=0;i<16;i++)
     if(subOp1[k][1])
    subOperator(&subbandVector[channel][subOp1[k][i]],
     &subbandVector[channel][subOp2[k][i]],
     &subbandVector[channel][subOp1[k][i]],
     &subbandVector[channel][subOp2[k][i]]);
   }
 }
```

Where channel refers to left and right channels, the first two arguments of "butterflyOperator" and "subOperator" refers to y1 and y2 and the last two arguments refer to x1 and x2.

k is the iteration counter, from 0 to 4. ButterflyOp1, butterflyOp2, subOp1, and subOp2 are the address tables implemented in the hardware arithmetic unit:

These tables are built in the following way;

```
ButterlyOp1 and butterflyOp2:
    for(k = 1, stage = 0; k < 32; k *= 2, stage++)
        for (j = 0; j < 32-k; j += 2*k)
            for (i = 0; i < k; i++)
            {
                butterflyOp1[stage][i+j/2] = i+j;
                butterflyOp2[stage][i+j/2] = i+j+k;
            }
subOp1 and subOp2:
    for(k=1, stage = 0; k < 32; k*=2, stage++)
        for(j = 0; j < 32-k; j += 2*k)
        {
            subOp1[stage][j/2] = 0;
            subOp2[stage][j/2] = 0;
            for(i = 1; i < k; i++)
            {
                subOp1[stage][[i+j/2] = i + j;
                subOp2[stage][[i+j/2] = j + 2*k - i;
            }
        }
```

The d coefficients used in the butterfly operator are also stored in a ROM and are calculated as follows:

```
d[0] = d[1] = 1/sqrt(2);
for(i=1;i<16;i++)
{
    d[2*i]   =        sqrt(.5*(1+d[i]));
    d[2*i+1] = sqrt(.5*(1-d[i]));
}
```

Dequantification of the Subband Samples

Before being used in the FCT, the subband sample codes extracted from the bit stream are dequantized as follows:

$s' = c * scf * (s+d)$ $s = (\text{sample code})/2^{(n-1)}$ $c = 2^n/\text{steps}$ $d = -(\text{steps}-1)/2^n$ n = number of bits of the sample code scf = scale factor associated with the sample steps = maximum number of steps used in encoding the subband sample.

The value of steps depends on n, the layer associated with a particular data stream and a grouping condition. A step table is given in the MPEG specification.

The coefficients c and d are stored in a ROM table addressed by a code made up with the layer, number of bits and grouping (or no grouping).

The coefficients c and d are calculated as follows:

```
if(layer == LAYER1) j = 15;
else if(layer == LAYER2) j = 19;
for(i=1;i<j;i++)
{
    if(layer == LAYER1) n = bit_tbl[1];
    else
        if(smp_tbl[1] != 3) n = bit_tbl[i]/3;
        else                n = (bit_tbl[i]+2)/3;
    c[i] = (1 << n) / step_tbl[i];
    d[i] = (1-step_tbl[i]) / (1 << n);
}
```

For each index i:

step_tbl provides the number of steps available for the encoding of the subband sample;

bit_tbl provides the number of bits used to encode the subband sample;

smp_tbl is=3 if the encoding is grouped or 1 otherwise; and i is characteristic of the encoding of each subband sample. It is recovered from the Bit Allocation (BAL) information extracted from the bit stream.

The 3 tables are provided in the MPEG specification.

SCALE FACTOR DECODING TABLE:

The scale factors as they are extracted from the bit stream are encoded. They are decoded by the hardware filter arithmetic unit 32 using a decoding table built as follows:

$rs = \frac{1}{2} \wedge (\frac{1}{3})$ scftbl[0]=2;

for(i=1;i<63;i++)

scfTbl[i]=scfTbl[i-1]/rs;

Dequantization Process

The dequantization process performs the equation s=scf x c x (SBB_CODE - d). The math unit performs this operation by receiving an index value from the arithmetic unit buffer 30 and storing the index value in registers 172 and 174 discussed with reference to FIG. 4. The index value retrieves values for the c and d coefficients and the scale factor from ROM tables 170 and 168, respectively. The coded samples are retrieved from the arithmetic unit buffer 30 and math unit 154 performs a subtraction operation and then successive multiplication operations to calculate the dequantized sample. The dequantized samples are then stored in the SBB RAM 150 discussed with reference FIG. 4. Each of the samples is dequantized until all 32 dequantized samples are present in SBB RAM 150.

Figure 7:
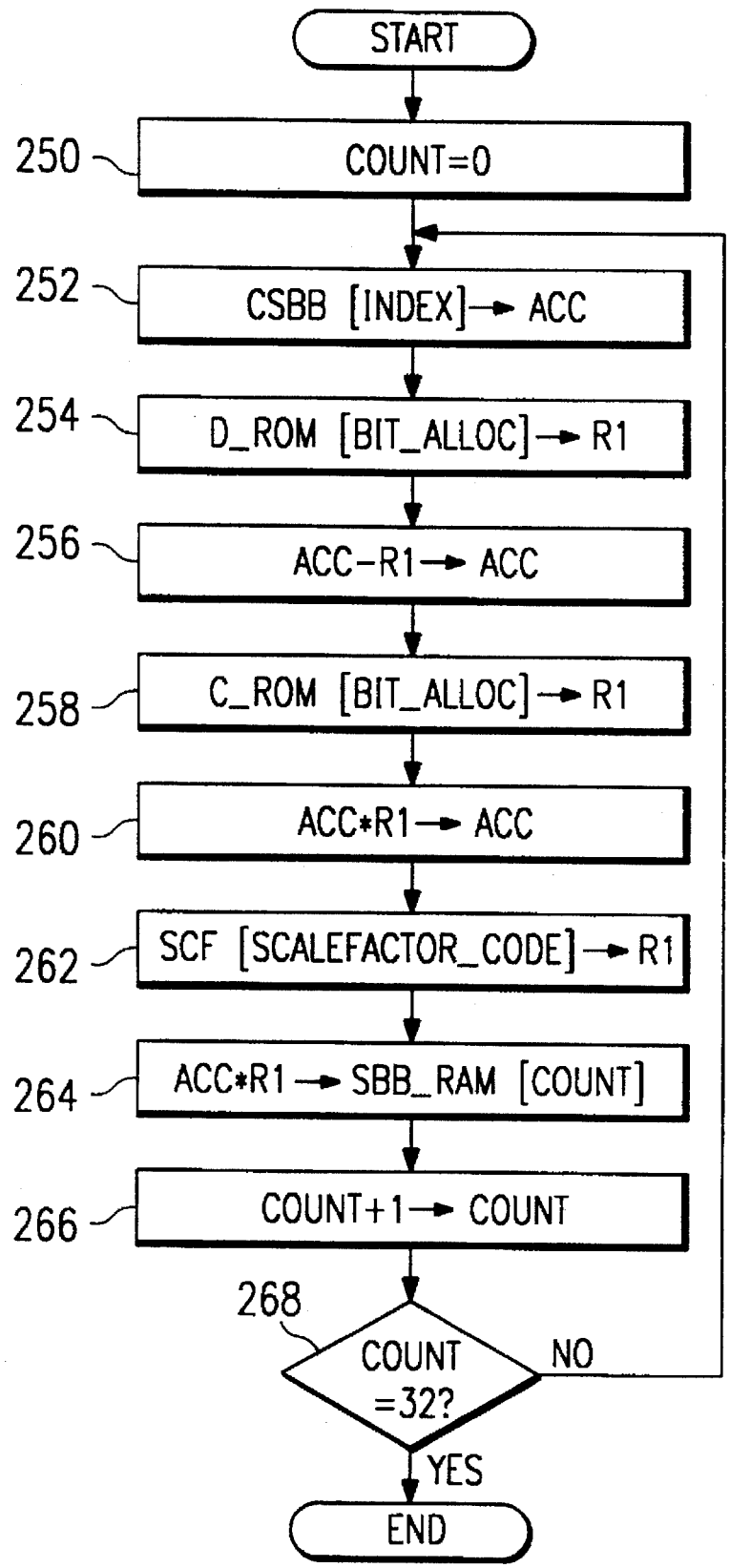
FIGS. 7 through 9 are flow charts illustrating the operation of the hardware filter arithmetic unit of the present invention.

FIG. 7 is a flow chart which illustrates the dequantizer operation performed by hardware filter arithmetic unit block 32. The operation begins at step 250 where a count is initiated to equal zero. The method proceeds to step 252 where a coded sample is selected using an index value retrieved from arithmetic unit buffer 30 and the selected coded sample is loaded into the accumulator 156. The method proceeds to step 254 where a D coefficient is retrieved from read-only memory 170 using the index value and is loaded into the R1 register 158. The method then proceeds to step 256 where math unit 154 subtracts the value in the R1 register 158 from the value in the accumulator 156 and loads the difference in the accumulator 156. The method then proceeds to step 258 where a C coefficient is retrieved from ROM 170 using the index value and the value for the C coefficient is loaded into the R1 register 158.

The method proceeds to step 260 where the math unit 154 forms the product of the value stored in accumulator 156 with the value stored in R1 register 158. The product is stored back in the accumulator 156. The method then proceeds to step 262 where the appropriate scale factor is loaded from the scale factor read-only memory 168 into the R1 register 158. The method then proceeds to step 264 where the math unit 154 forms the product of the value in the accumulator 156 and the R1 register 158 and loads the final dequantized sample back into the SBB RAM 150 over the first value that was retrieved. The method then proceeds to step 266 where the COUNT variable is incremented. The method then proceeds to step 268 where the COUNT variable is checked to see if it equals 32. If the COUNT variable does not yet equal 32, the method returns to step 252 where a new index value is retrieved from the AU buffer 30. If the COUNT is equal to 32, the method proceeds to perform the fast cosine transformation which will be discussed with reference to FIG. 18. It should be understood that the index value into the AU buffer 30 is non-linear and is determined using a conventional Hadamard order that selects the appropriate coded samples in the appropriate order. The C and D coefficients and the scale factors are indexed on values retrieved from the AU buffer 30 using the Hadamard index.

Fast Cosine Transform Process

After all of the dequantized samples are present in SBB RAM 150, the arithmetic unit block changes mode and begins performing the fast cosine transformation process.

The fast cosine transform effectively transforms 32 28-bit samples which depict a single instant in time at 32 different frequency levels into 32 samples which can be used sequentially to drive an external speaker for a period of 22 milliseconds. The 32 sequential samples are output in either 16 or 18-bit PCM data format.

Figure 8:
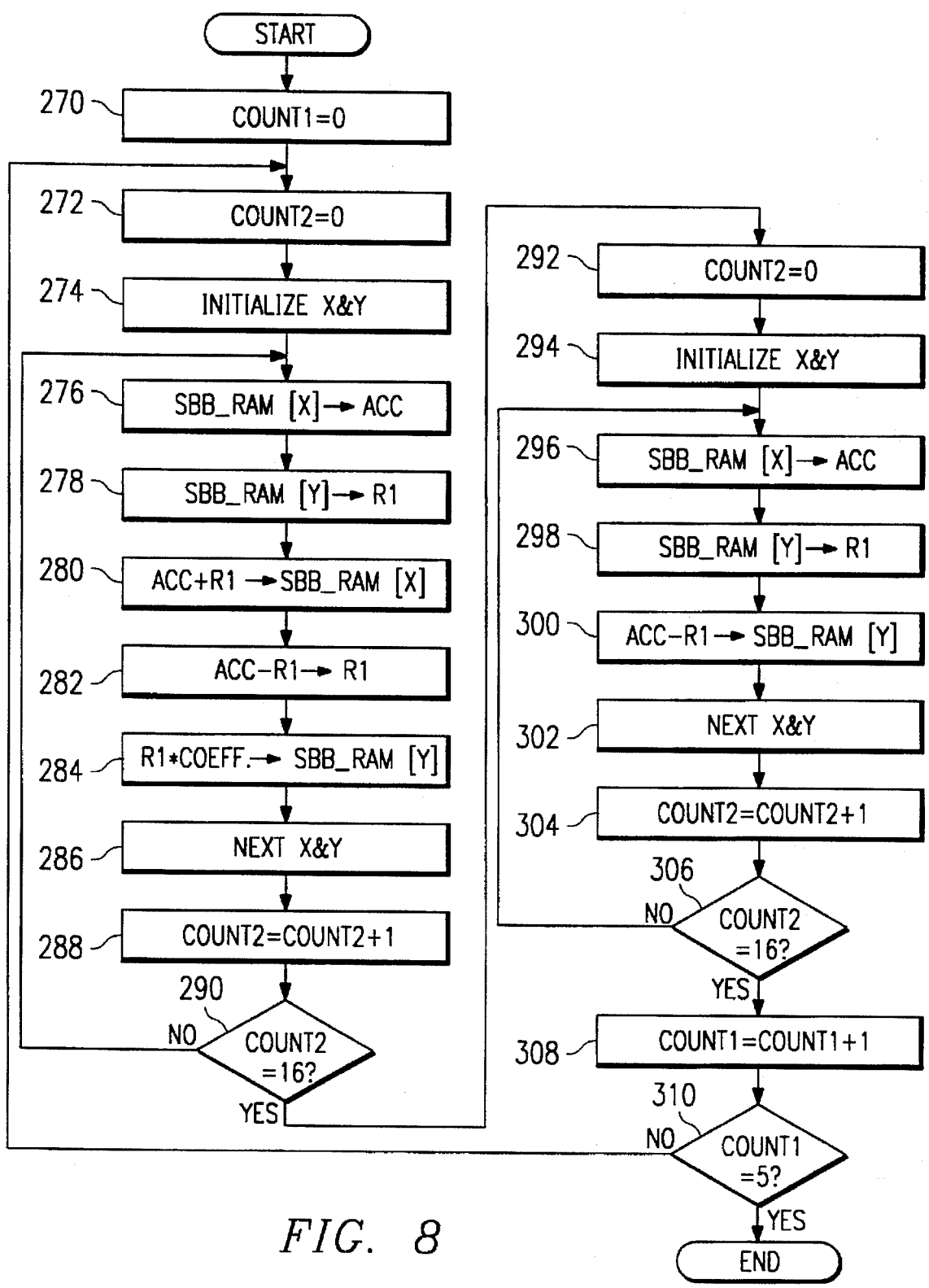

FIG. 8 is a flow chart that illustrates the fast cosine transformation operation performed by the hardware filter arithmetic unit block 32. The method begins at step 270 where a COUNT1 variable is said to equal zero. The method then proceeds to a step 272 where a COUNT2 variable is also said to equal zero. The method proceeds to step 274 where the index values X and Y are initialized. The method then proceeds to step 276 where a sample stored at position X in SBB RAM 150 is loaded into the accumulator 156. The method then proceeds to step 278 where a sample stored at position Y within SBB RAM 150 is loaded into the R1 register 158. The method then proceeds to step 280 where the math unit 154 forms the sum of the values stored in the accumulator 156 and R1 register 158 and loads the sum back into the SBB RAM 150 at position X. The method then proceeds to step 282 where the math unit 154 forms the difference of the values stored in accumulator 156 and R1 register 158 and returns the difference to the R1 register 158. The method then proceeds to step 284 where the math unit 154 forms the product of the difference stored in the R1 register 158 with a coefficient retrieved from the coefficient memory 178. The product is then stored at position Y within SBB RAM 150. The method then proceeds to step 286 where the next values for the X and Y variables are set. The method then proceeds to step 288 where the COUNT2 variable is incremented. The method then proceeds to step 290 where the COUNT2 value is checked to see if it has reached the value 16. It if has not, the method returns to step 276 and if the COUNT2 variable has reached 16, the method proceeds to step 292 where the COUNT2 variable is once again set equal to zero.

At step 294 of the method, the variables X and Y are once again initialized. The method then proceeds to step 296 where the sample stored at position X in SBB RAM 150 is loaded into the accumulator 156. The method then proceeds to step 298 where the sample stored in position Y is loaded into the R1 register 158. The method then proceeds to step 300 where the math unit 154 forms the difference of the value stored in accumulator 156 or R1 register 158 and loads the difference into SBB RAM 150 at position Y. The method then proceeds to step 302 where the next values for X and Y are set. The method then proceeds to step 304 where the COUNT2 variable is incremented. The method then makes a decision at step 306 as to whether or not the COUNT2 variable has reached the value 16. If the value 16 has not been reached, the method returns to step 296. If the COUNT2 variable has reached the value 16, the method proceeds to step 308 where the COUNT1 variable is incremented. The method then proceeds to step 310 where it is determined whether or not the COUNT1 variable has reached the value 5. If the value 5 has not been reached, the method returns to step 272. If the COUNT1 variable has reached 5, the FCT operation has been completed and the FIR operation will proceed as shown in FIG. 9.

Finite Impulse Response Filtering Operation

On completion of the fast cosine transformation of the data, the arithmetic unit block 32 performs its final operation which is a finite impulse response filtering operation on the data. The first step of the finite impulse response filtering operation is to copy the contents of the SBB RAM 150 into the FIR RAM block 152 which stores 1,024 24-bit values. The 24 most significant bits of each of the 32 values stored within the SBB RAM 150 are copied into the FIR RAM 152. The FIR filtering retrieves samples from throughout FIR RAM 152. FIR RAM 152 is able to store many sets of 32 24-bit numbers. The FIR filtering effectively averages the signal actually output to the PCM buffer by using not only the frame currently being decoded but also a predetermined number of prior frames to calculate the actual PCM data output by the arithmetic unit 32. When decoding is initiated, the FIR RAM 152 is filled with zeroes. Accordingly, the first sample output to the PCM buffer by the arithmetic unit 32 is necessarily filtered with the zeroes stored in FIR RAM 152. The sound output by the decoder system of the present invention will gradually ramp up due to the operation of the finite input response filtering. Similarly, sharp transitions in the audio encoded in the bit stream will be softened by the finite impulse response performed by arithmetic unit block 32. FIR RAM 32 acts as a circular buffer to continually update the values stored within the memory by writing the latest set of samples received over the oldest set of samples stored in the RAM 152. The FIR RAM 152 is separated into two sections, each comprising 512 24-bit values. The left channel is stored in one of the sections and the right channel is stored in the other. It should be understood that the operations performed by the arithmetic unit block 32 are performed sequentially on one channel and then the other. In other words, a single set of 32 samples corresponds to only one channel and 32 samples for the right channel will be dequantized, transformed and filtered before the 32 samples corresponding to the left sample will be processed. The FIR filtering begins by loading a 0 into the accumulator 156. The samples are then sequentially retrieved from the FIR RAM 152, multiplied by a coefficient retrieved from coefficient storage 178, and summed into the accumulator. The value in the accumulator is then rounded to a 16-bit value. After rounding, the value is checked to see if the value is saturated during the accumulation process. The weighted sum is then output as the 16-bit PCM sample to PCM buffer 34. The filtering is performed for each of the 32 samples stored within FIR RAM 152. Each sample is therefore filtered using the value of the sample itself summed with a weighted sum of 15 other samples that had been output previously.

Figure 9:
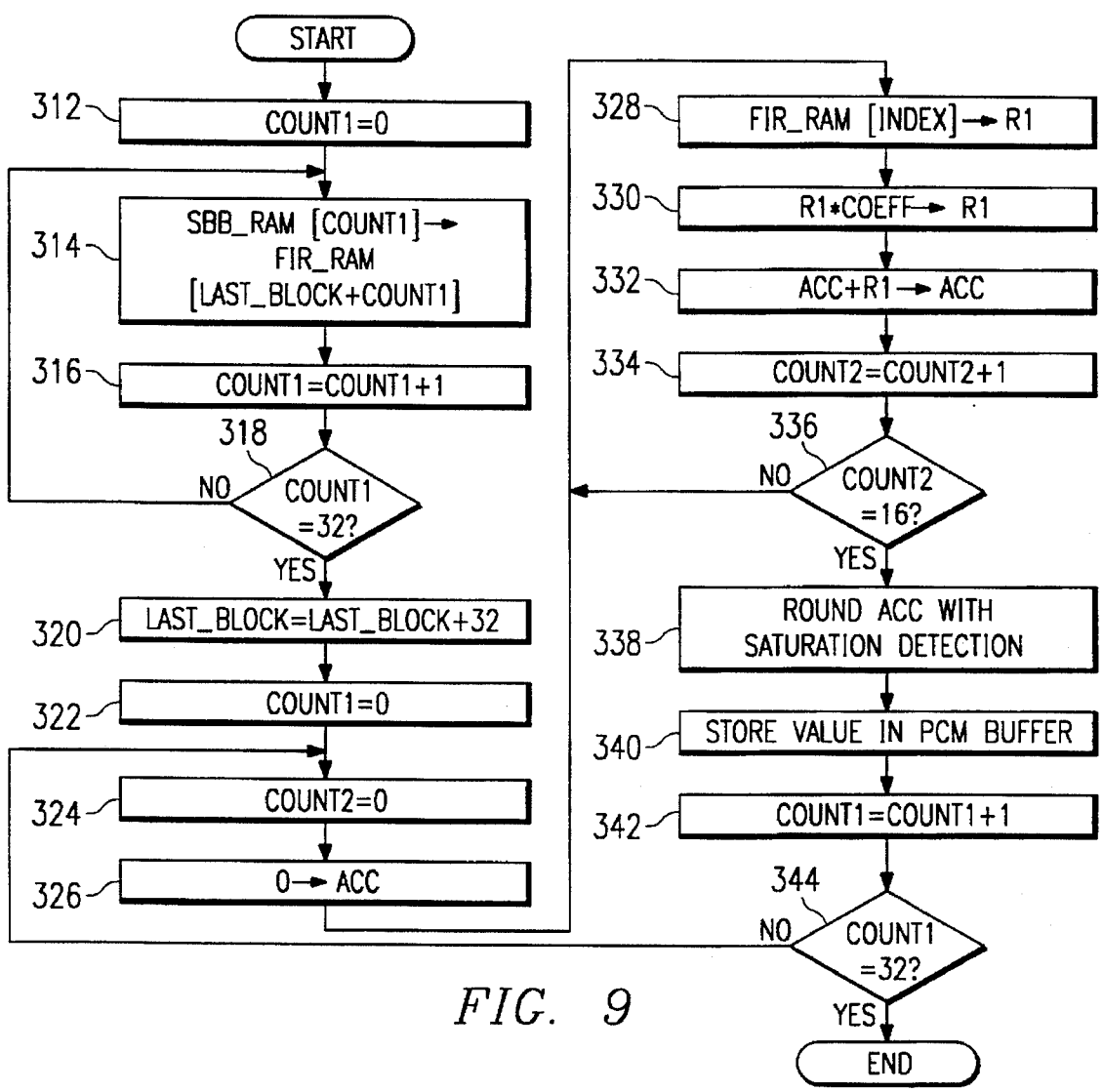

FIG. 9 is a flow chart representation of the finite impulse response filtering operation performed by the hardware filter arithmetic unit block 32. The FIR operation begins at step 312 where a COUNT1 variable is set to 0. The method then proceeds to a step 314 where the value stored in the SBB RAM 150 at position identified by the COUNT1 variable is moved to the FIR RAM at an address equal to the COUNT1 variable plus a LAST_BLOCK variable. The LAST_BLOCK variable points to onelocation after the address of the last value written to the FIR RAM 152 from the previous time that the FIR operation illustrated in FIG. 9 took place. The LAST_BLOCK variable will be greater than or equal to 0 and less than 512. The 24-bit values written to the FIR RAM 152 comprise the 24 most significant bits of the 28-bit values stored in SBB RAM 150.

The method proceeds from step 314 to step 316 where the COUNT1 variable is incremented. The method then makes a decision at step 318 as to whether or not the COUNT1 variable has reached the value 32. If the COUNT1 variable has not reached the value 32, all of the values stored within SBB RAM 150 have not yet been copied to the FIR RAM 152 and the method returns to step 312. If the COUNT1 variable has reached the value 32, the method proceeds to step 320 where the LAST_BLOCK variable is updated by adding 32 to its last value. The method then proceeds to step 322 where the COUNT1 variable is set to 0. The method then proceeds to step 324 where a COUNT2 variable is set to 0. The method then proceeds to step 326 where the value 0 is loaded into accumulator 156.

The method proceeds to step 328 where a value is retrieved from the FIR RAM 152 at a location specified by the INDEX variable. The value is loaded into the R1 register 158. The INDEX variable is equal to the sum of the COUNT1 variable and the product of the COUNT2 variable and the value 32. Step 328 effectively retrieves one sample from each set of 32 values present in the FIR RAM 32. The method then proceeds to step 330 where the value in R1 register 158 is multiplied by a coefficient retrieved from coefficient memory 178 and the product is stored in the R1 register 158. The method then proceeds to step 332 where the value in the accumulator 156 is added to the value in the R1 register 158 and the sum is returned to the accumulator 156. Step 332 effectively accumulates the sum of all of the values retrieved from the FIR RAM 152 after they have been appropriately scaled using coefficients retrieved from coefficient memory 178.

The method then proceeds to step 334 where the COUNT2 variable is incremented. The method then checks at step 336 whether the COUNT2 variable has reached the value 16. If it has not reached this value, the method returns to step 328. If COUNT2 has reached the value 16, the method proceeds to step 338 where the value stored within the accumulator 156 is rounded and checked for saturation in math unit 154. The method then proceeds to step 340 where the rounded value is stored in the PCM buffer 34. The method then proceeds to step 342 where the COUNT1 variable is incremented. The method then proceeds to step 344 where the COUNT1 variable is checked to see if it has reached the value 32. If the COUNT1 variable has not reached the value 32, the method returns to step 324. If the value 32 has been reached, the method concludes and the dequantization process described with reference to FIG. 7 previously is initiated for the next block of 32 samples. The next block will either be the remaining channel corresponding to the block previously processed or will be the opposite channel for the next set of audio samples to be dequantized, transformed and filtered.

Figure 10:
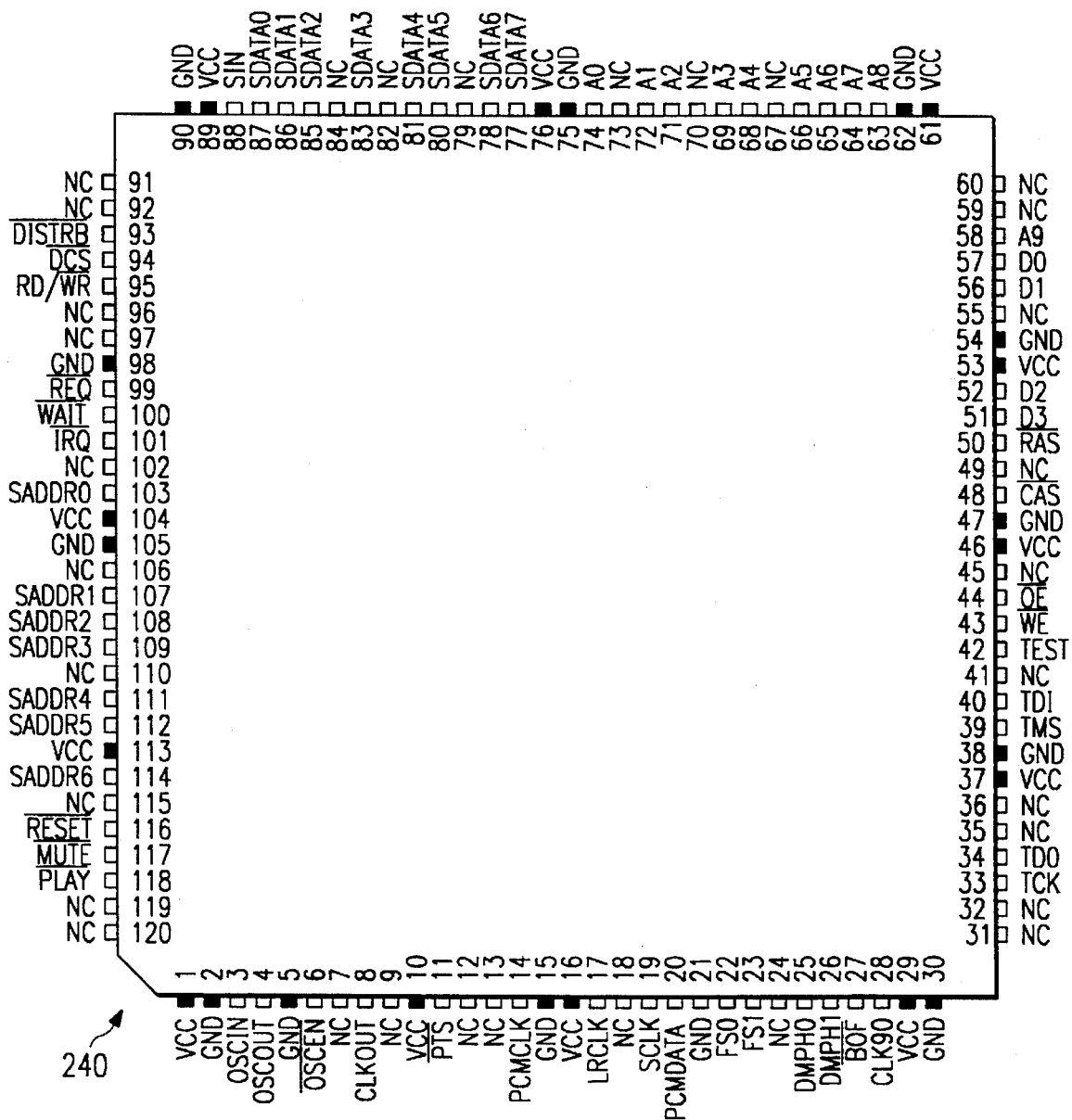
FIG. 10 is a top view of a pinout of one embodiment of the audio decoder system of the present invention.

FIG. 10 illustrates a pin-out diagram which illustrates one possible package in which the system of the present invention may be housed. The following table describes the nature of the signals illustrated in the pin-out diagram.

| PIN NAME | NO. | I/O | DESCRIPTION |
| --- | --- | --- | --- |
| A9 | 58 | O | DRAM address bus output |
| A8 | 63 | | |
| A7 | 64 | | |
| A6 | 65 | | |
| A5 | 66 | | |
| A4 | 68 | | |
| A3 | 69 | | |
| A2 | 71 | | |
| A1 | 72 | | |
| A0 | 74 | | |
| BOF | 27 | O | Beginning of frame signal |
| CAS | 48 | O | DRAM column address strobe |
| CLK90 | 28 | I | 90 kHz reference clock input |
| CLKOUT | 8 | O | Buffered 24 MHz oscillator output |
| D3 | 51 | I/O | DRAM data bus |
| D2 | 52 | | |
| D1 | 56 | | |
| D0 | 57 | | |
| DCS | 94 | I | Chip select |
| DMPH1 | 26 | O | Decoded de-emphasis select output |
| DMPH0 | 25 | | |
| DSTRB | 93 | I | Data strobe |
| FS1 | 23 | O | Decoded sampling frequency output |
| FS0 | 22 | | |
| GND | see dwg | | Ground |
| IRQ | 101 | O | Interrupt request |
| LRCLK | 17 | O | Left/right channel select output |
| MUTE | 117 | I | Forces muted audio output |
| OE | 44 | O | DRAM output enable |
| OSCEN | 6 | I | Buffered oscillator output enable |
| OSCIN | 3 | I | 24 MHz oscillator input or crystal connection |
| OSCOUT | 4 | O | Crystal connection (crystal low side) |
| PCMCLK | 14 | I | PCM clock input |
| PCMDATA | 20 | O | PCM serial data output |
| PLAY | 118 | I | Enables output of decoded audio |
| PTS | 11 | O | Signals the presence of a PTS associated with the audio at the PCM output |
| RAS | 50 | O | DRAM row address strobe |
| REQ | 99 | O | Data request |
| RESET | 116 | I | Reset signal |
| RD/WR | 95 | I | Read/Write select |
| SADDR6 | 114 | I | Register address bus |
| SADDR5 | 112 | | |
| SADDR4 | 111 | | |
| SADDR3 | 109 | | |
| SADDR2 | 108 | | |
| SADDR1 | 107 | | |
| SADDR0 | 103 | | |
| SCLK | 19 | O | PCM clock output |
| SDATA7 | 77 | I/O | 8-bit parallel data bus for register and data input/output |
| SDATA6 | 78 | | |
| SDATA5 | 80 | | |
| SDATA4 | 81 | | |
| SDATA3 | 83 | | |
| SDATA2 | 85 | | |
| SDATA1 | 86 | | |
| SDATA0 | 87 | | |
| SIN | 88 | I | Serial compressed audio data input |
| TCK | 35 | I | JTAG clock input |
| TDI | 40 | I | JTAG data input |
| TDO | 37 | O | JTAG data output |
| TEST | 42 | I | Test enable |
| TMS | 39 | I | JTAG mode select input |
| VCC | see dwg | I | 5 V power |
| WAIT | 100 | O | Wait request – three-state output |
| WE | 43 | O | DRAM Read/Write control |

Audio Decoding Operation Flow Charts

General Operation

Figure 11:
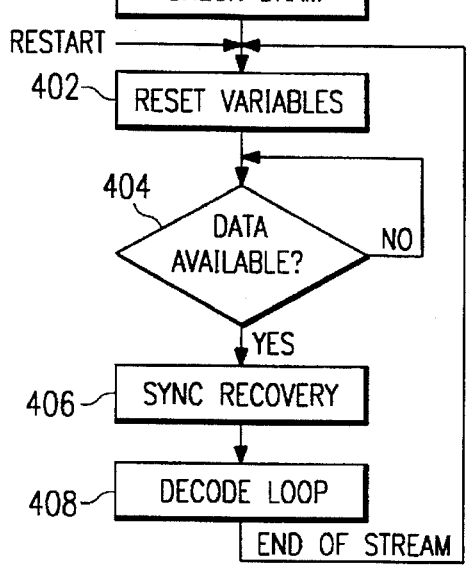
FIGS. 11 through 31 are flow charts illustrating the operation of the integrated audio decoder system of the present invention.

FIG. 11 is a flow chart which illustrates the high level activities of the audio decoder block 28. Processing begins after reset at block 400 where the system checks to determine if external buffer 26 is present or not. The process used to complete block 400 will be discussed more completely with reference to FIG. 12 herein. The process continues at step 402 where a number of variables used by the audio decoder block 28 are reset. The process used to reset the variables will be discussed more fully with reference to FIG. 13 herein. The method proceeds to a decision block 404 where the audio decoder block 28 determines whether or not there is data to be decoded stored in either input buffer 24 or external buffer 26. If there is no data available, the system continues to check until data is available and then proceeds to step 406 where the system attempts to recover synchronization in the data stream. The processes used by audio decoder block 28 to recover synchronization will be discussed more completely with reference to FIG. 14a and 14b herein.

After synchronization has been recovered, the process proceeds to step 408 where the bit stream received by audio decoder block 28 is decoded and is passed into the arithmetic unit buffer 30. The processes used to complete step 408 shown in FIG. 11 will be detailed with reference to FIG. 29 herein. The decode loop 408 continues until all data in the input buffer 24 or external buffer 26 has been decoded or until an end of stream condition occurs.

Initial DRAM Check process

Figure 12:
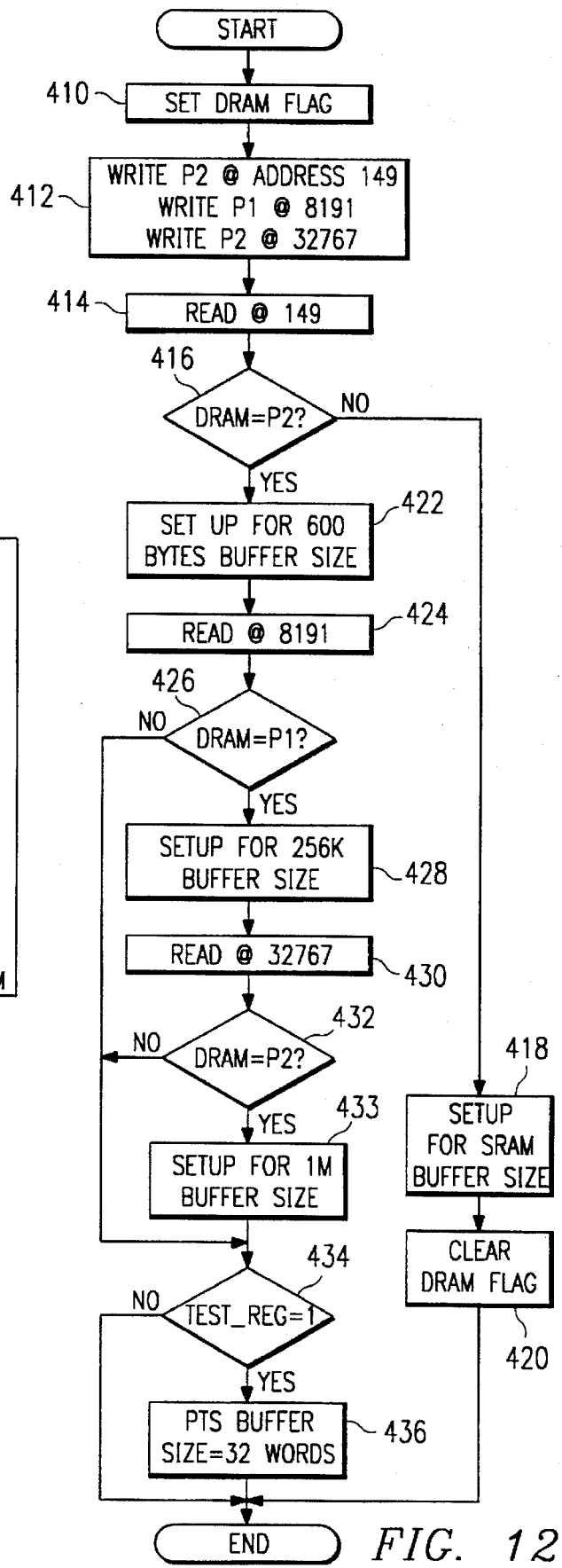

FIG. 12 details the process used by audio decoder block 28 to check the size of available buffer memory. The method begins at step 410 where the DRAM flag is set. The method then proceeds to step 412 where 32-bit values of predetermined bit strings P2 and P1 are written to three different addresses. A READ operation is then performed from the first address in step 414. The method then proceeds to step 416 where the value retrieved from address 149 is compared to the P2 variable. If this comparison is not valid, it indicates that the address 149 was not present and that no external DRAM is present. The method therefore branches to step 418 where the system is set up to use the internal SRAM buffer 24. The PTS buffer size is set equal to two words operable to store a single PTS within the input buffer 24. The system proceeds from step 418 to step 420 where the DRAM flag is cleared. The process for checking for DRAM concludes after step 420.

If in step 416 the P2 value was retrieved from address position 149, the method proceeds to step 422 where the system is set up to use a 600-byte buffer. The PTS buffer size is set to 4 words within the 600-byte buffer. The method then proceeds to step 424 where the system checks for the existence of further DRAM address locations by attempting to read from address location 8191. The method then proceeds to step 426 where the value retrieved from address 8191 is compared to the P1 variable. If this comparison is not valid, the method branches to step 434 where the TEST_REG variable is tested. If the TEST_REG variable is not equal to 1, the method exists. If the TEST_REG variable is equal to 1, the method proceeds to step 434 where the PTS buffer size is set equal to 32 words.

If the comparison at step 426 was valid, the method proceeds to step 428 where the system is set up to use a 256 kilobit buffer size. The PTS buffer size is set to 1640 words within the 256-kilobit buffer. The method then proceeds to step 430 to test for the existence of more DRAM by reading from address 32767. The method then proceeds to step 432 where the value retrieved from address 32767 is compared to the P2 variable. If the comparison in step 432 is not valid, the method once again returns to step 434 where the TEST_REG variable is tested. If the comparison in step 432 is valid, the method proceeds to step 433 where the system is set up to use a 1 megabit buffer. The PTS buffer size is set to 6554 words within the 1-megabit buffer. The method then proceeds to step 434 where the TEST_REG variable is tested.

Variable Initialization and Reset

Figure 13:
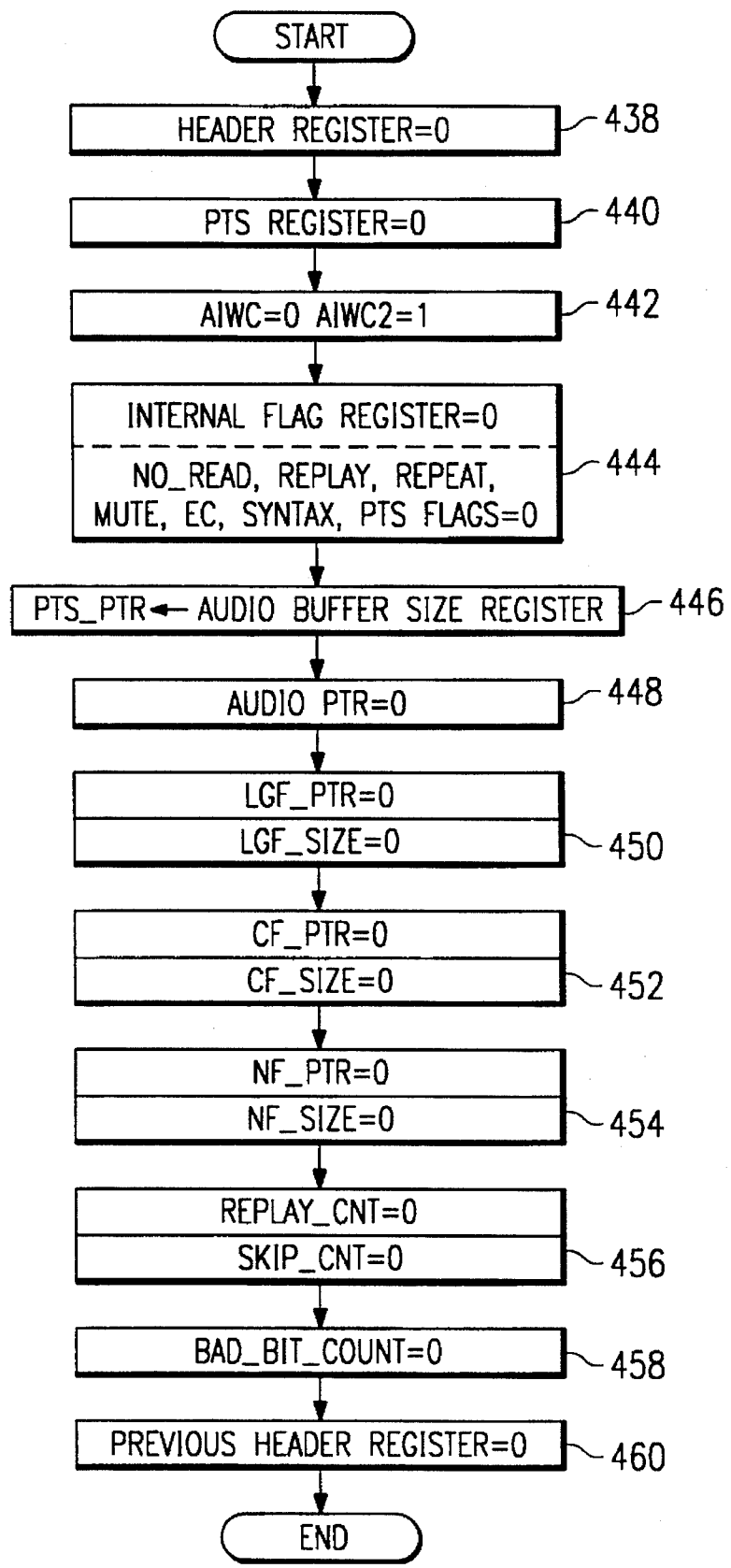

FIG. 13 illustrates the process that the audio decoder block 28 performs to clear and initialize the registers and variables used in the audio decoding process. The method begins at step 438 where the header register is set equal to 0 and a second audio input word count AIWC2 is set equal to 1. The method then proceeds to step 440 where the PTS register is set to 0. The method then proceeds to step 442 where the audio input word count or AIWC is set equal to 0. The method then proceeds to step 444 where the INTERNAL FLAG register is set equal to 0. The INTERNAL FLAG register includes the NO_READ, REPLAY, REPEAT, MUTE, EC, SYNTAX and PTS flags. The method proceeds to step 446 where the value for the audio buffer size is input into the PTS pointer (PTS_PTR). This places the PTS_PTR at the first location available to store presentation time stamp values.

The INTERNAL FLAG register is a dedicated portion of the audio decoder RAM 148 used by the audio decoder. The NO_READ flag is set when the frame is not to be read. The REPLAY flag indicates that the audio decoder 28 is replaying the last good frame. The REPEAT flag is usually an instruction from the host 12 to repeat the last good frame to allow for a delay to regain synchronization. The MUTE flag is set whenever the audio decoder block 28 outputs a "no sound" or 0 frame. The error concealment (EC) flag is set when the audio decoder block 28 detects an error and performs some sort of error concealment. The SYNTAX flag is set when the audio decoder block 28 detects a syntax error. The PTS flag is set when a presentation time stamp field is detected in the bit stream.

The method proceeds to step 448 where the audio pointer (AUDIO_PTR) is set equal to 0. The method then proceeds to step 450 where both the last good frame pointer (LGF_PTR) and last good frame size (LGF_SIZE) fields are set equal to 0. The method proceeds to step 452 where the current frame pointer (CF_PTR) and current frame size (CF_SIZE) variables are set equal to 0. The method proceeds to step 454 where the next frame pointer (NF_PTR) and next frame size (NF_SIZE) variables are set equal to 0. The method then proceeds to step 456 where the replay count (REPLAY_CNT) and skip counter (SKIP_CNT) variables are set equal to 0. The method proceeds to step 458 where the bad bit count (BAD_BIT_COUNT) value is set equal to 0. The method concludes with step 460 where the previous header register is set equal to 0. The audio decoder block 28 then exits the method used to reset variables and proceeds to step 404 discussed previously with reference to FIG. 11 where the audio decoder awaits data to be decoded by repeatedly testing the Audio Input Word Count (AIWC) variable which indicates the system decoder block 20 has placed data into input buffer 24 or external buffer 26 to be decoded.

Synchronization Acquisition

Figure 14A:
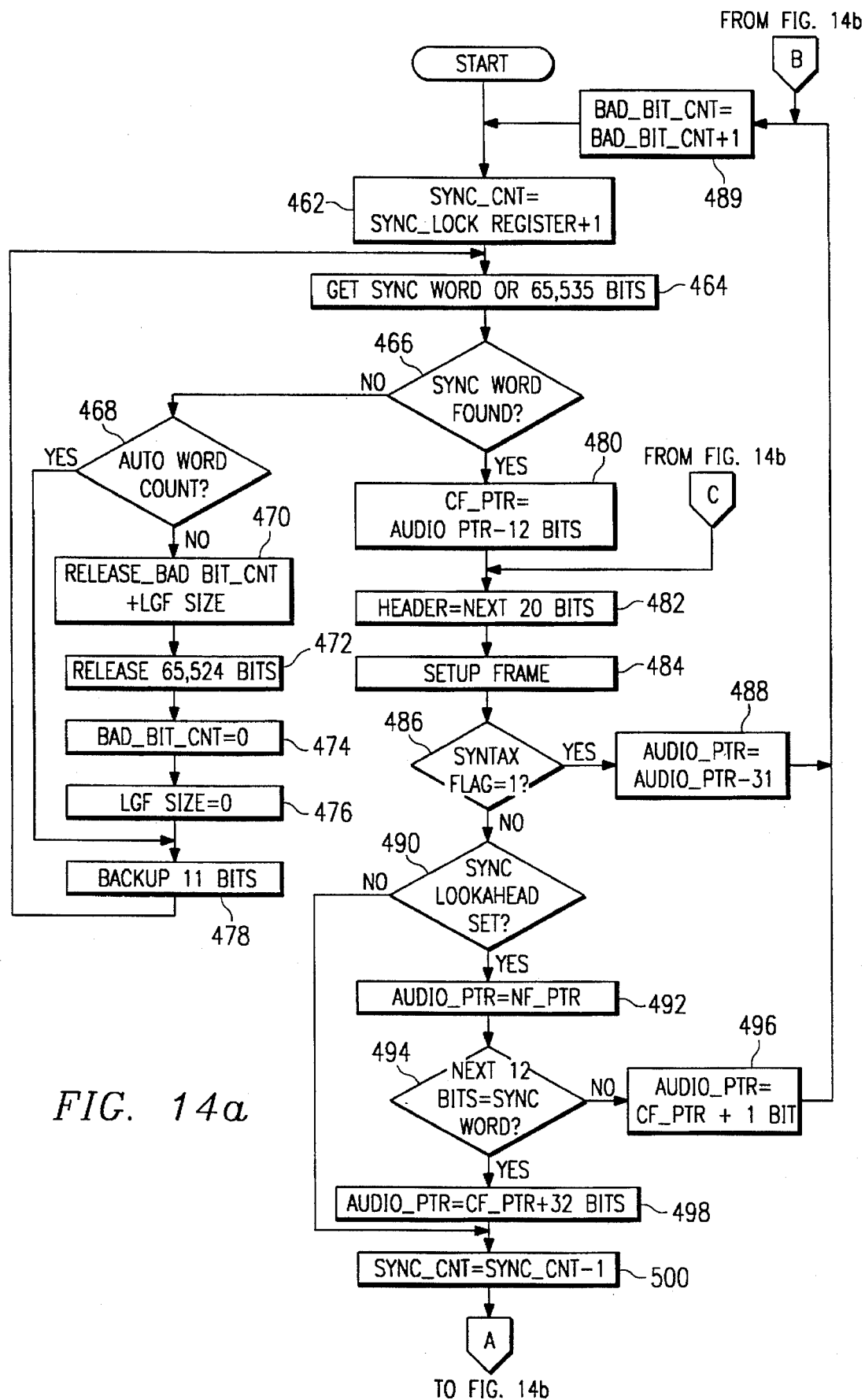
Figure 14B:
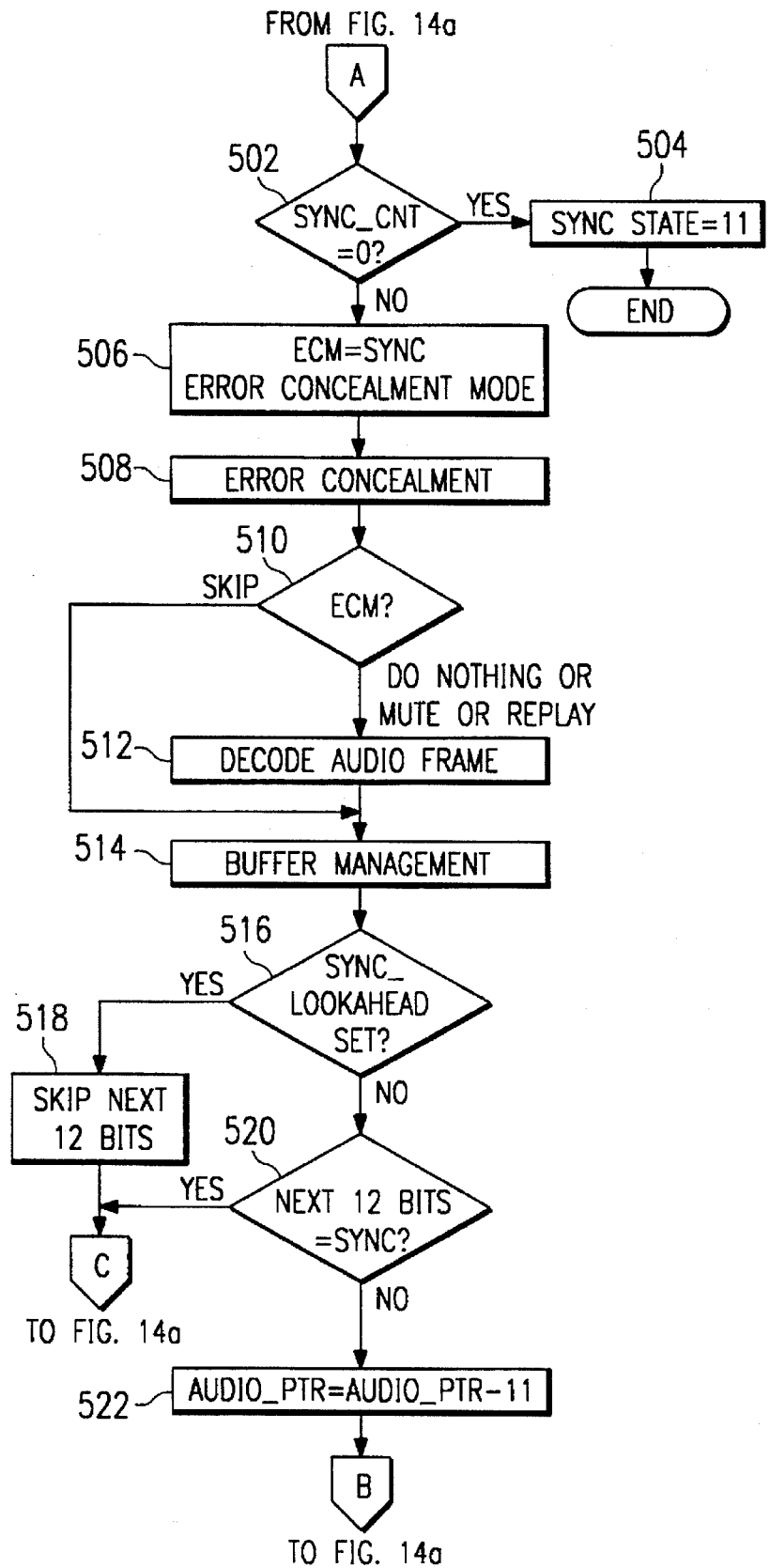

FIG. 14a and 14b illustrate the manner in which the audio decoder block 28 searches for synchronization characters and acquires synchronization in the incoming bit stream. The method begins at step 462 where the synchronization count (SYNC_CNT) variable is loaded with value of the SYNC_LCK register plus 1. The SYNC_LCK register value is used by the microprocessor host 12 to specify how many synchronization words the audio decoder block 28 must locate before it is allowed to consider itself locked in synchronization. The method then proceeds to step 464 where a GSYN command is executed with a parameter of 65,535 bits. As discussed previously, the GSYN instruction will sequentially retrieve bits in the bit stream until a synchronization word is located or until the value specified in the immediate operand is reached. 65,535 is the maximum value for the immediate operand of a GSYN instruction.

The method proceeds to step 466 where a decision is made as to whether or not a synchronization word was found in step 464. If no synchronization word was found, the method branches to step 468 where a decision is made as to whether the automatic word count feature is enabled. If the automatic word count feature is enabled, the method proceeds to step 478 where the AUDIO_PTR is backed up 11 bits. The AUDIO_PTR is the pointer into the input buffer 24 or external buffer 26 which indicates the location from which the audio decoder block 28 is currently reading. [The GSYN instruction will set the carry bit within the control status register block 22 if a synchronization word is found.] The auto word count feature indicates that the system is not saving any good frames and is not keeping track of the BAD_BIT_CNT using the microcode detailed in FIG. 14a. Accordingly, if the auto word count feature is enabled, the method merely proceeds back to step 464 where an additional GSYN instruction is performed. If the auto word count feature is not being used in step 468, the bad bits within the input buffer 24 must be released so that the system decoder block 20 can overwrite these bits. Accordingly, the method proceeds to step 470 where the BAD_BIT_CNT and LGF_SIZE variables are used to release a number of bits within the input buffer 24. The method then proceeds to step 472 where 65,524 bits are released within the input buffer 24 or the external buffer 26. The number 65,524 is 11 bits less than the number that was used as the argument for the GSYN instruction. The last 11 bits retrieved could be 11 bits within a synchronization word as a synchronization word is 12 bits in length.

The method proceeds to step 474 where the BAD_BIT_CNT variable is set to equal 0 and the method then proceeds to step 476 where the LGF_SIZE is set equal to 0. The method then proceeds to step 478 where the pointer into the input buffer 24 or external buffer 26 is manipulated to back up in the bit stream 11 bits. As discussed previously, the last 11 bits read could be a portion of an incomplete synchronization word and therefore these 11 bits must be rechecked when the method returns to step 464.

If at step 466 a synchronization word was located, the CF_PTR is set equal to the AUDIO_PTR minus 12 bits in step 480. The CF_PTR is used to point to the beginning of a frame which actually begins with a synchronization word. The method then proceeds to step 482 where GBT and GBTL instructions are used to retrieve the next 20 bits of the bit stream which comprises the header information. These 20 bits are stored in the header register within control status register block 22. The method then proceeds to step 484 where the routines necessary to set up the frame are accomplished. These routines will be discussed with reference to FIGS. 15a and 15b herein. The set up frame routine performs all the calculations necessary before the audio decoder block 28 can begin to decode an audio frame.

The method proceeds to step 486 where the SYNTAX flag is checked. If the SYNTAX flag is 1, the method proceeds to step 488. The SYNTAX flag indicates on this path that a syntax error was detected during the frame set up in step 484. In step 488, the AUDIO_PTR is reduced by 31 bit positions. The method proceeds to step 489 where the BAD_BIT_CNT is incremented by 1. Processing then returns to step 462. Step 488 effectively backs the pointer up to a position 1 bit past the beginning of the synchronization word that was located in step 464. If the SYNTAX flag was not set at step 486, the method proceeds to step 490 where a branch occurs depending on whether or not the SYNC_LOOKAHEAD flag is set. If the SYNC_LOOKAHEAD flag is set, the AUDIO_PTR is loaded with the value of the NF_PTR in step 492. The method then proceeds to step 494 where the next 12 bits are retrieved and it is determined whether or not these bits comprise a synchronization word. If these bits do not comprise a synchronization word, the AUDIO_PTR is set to the value of the CF_PTR plus 1 bit in step 496. The method proceeds to step 489 where the BAD_BIT_CNT is incremented by 1. The process then returns to step 462 to once again search for a synchronization word. If the next 12 bits were a synchronization word at step 494, the method proceeds to step 498 where the AUDIO_PTR is set to the value of the CF_PTR plus 32 bits. The method then proceeds to step 500 where the synchronization count is decremented. If at step 490, the SYNC_LOOKAHEAD flag was not set, the method proceeds directly to step 500.

The method proceeds on FIG. 14b where, at step 502, the synchronization count variable is tested to determine if it is equal to 0. If the synchronization count variable after being decremented in step 500 is equal to 0, the method proceeds to step 504 where the synchronization state variable is set equal to 11. This value for the synchronization state variable indicates to the remainder of the system that the required number of synchronization words have been found and that the system is now in a locked synchronization state. If at step 502, the synchronization count variable is not equal to 0, the method proceeds to step 506 where the error concealment mode (ECM) variable is loaded with the contents of the synchronization error concealment mode register which is set by the microprocessor host 12. The synchronization error concealment mode specifies what is to be done with the data that is present while the audio decoder block 28 is searching for the required number of synchronization words prior to reaching a synchronization locked state.

After the error concealment mode is set, the method proceeds to step 508 where the error concealment routines are performed. The error concealment routines will be described with reference to FIG. 17 herein. In general, the error concealment can play the last good frame of data, play the current frame, skip the current frame or mute the output for the duration of the current frame. As will be described herein, these options are specified by the error concealment mode variable and by the presence or absence of the external buffer 26.

The method proceeds to step 510 where the error concealment mode variable is checked. If the error concealment mode indicates that the error concealment mode is MUTE, REPLAY or do nothing, the method proceeds to step 512 where the audio frame is decoded. The method utilized by audio decoder block 28 to decode audio frames will be discussed with reference to FIGS. 18a and 18b herein. The method proceeds from step 512 to step 514 where the audio decoder block 28 performs buffer management. If the error control mode indicates that the audio frame is to be skipped, the method proceeds directly from step 510 to step 514. The methods used by the audio decoder block 28 to perform buffer management will be discussed with reference to FIGS. 28a and 28b herein.

The method proceeds to step 516 where the SYNC_LOOKAHEAD flag is tested. If the SYNC_LOOKAHEAD flag is set, the method proceeds to step 518 where the next 12 bits in the audio bit stream are skipped. The method then proceeds to branch point C which re-enters the method at FIG. 14a at step 482. If the SYNC_LOOKAHEAD flag was not set in step 516, the method proceeds to step 520 where the next 12 bits are checked to see if they contain a synchronization word. If the next 12 bits do contain a synchronization word, the method proceeds to branch point C to re-enter the method at step 482 in FIG. 14a. If the next 12 bits do not contain a synchronization word, the method proceeds to step 522 where the audio pointer is reset to a value equal to the audio pointer minus 11. The method then proceeds to branch point B which re-enters the method at step 489 at FIG. 14a.

Frame Set-Up Operation

Figure 15A:
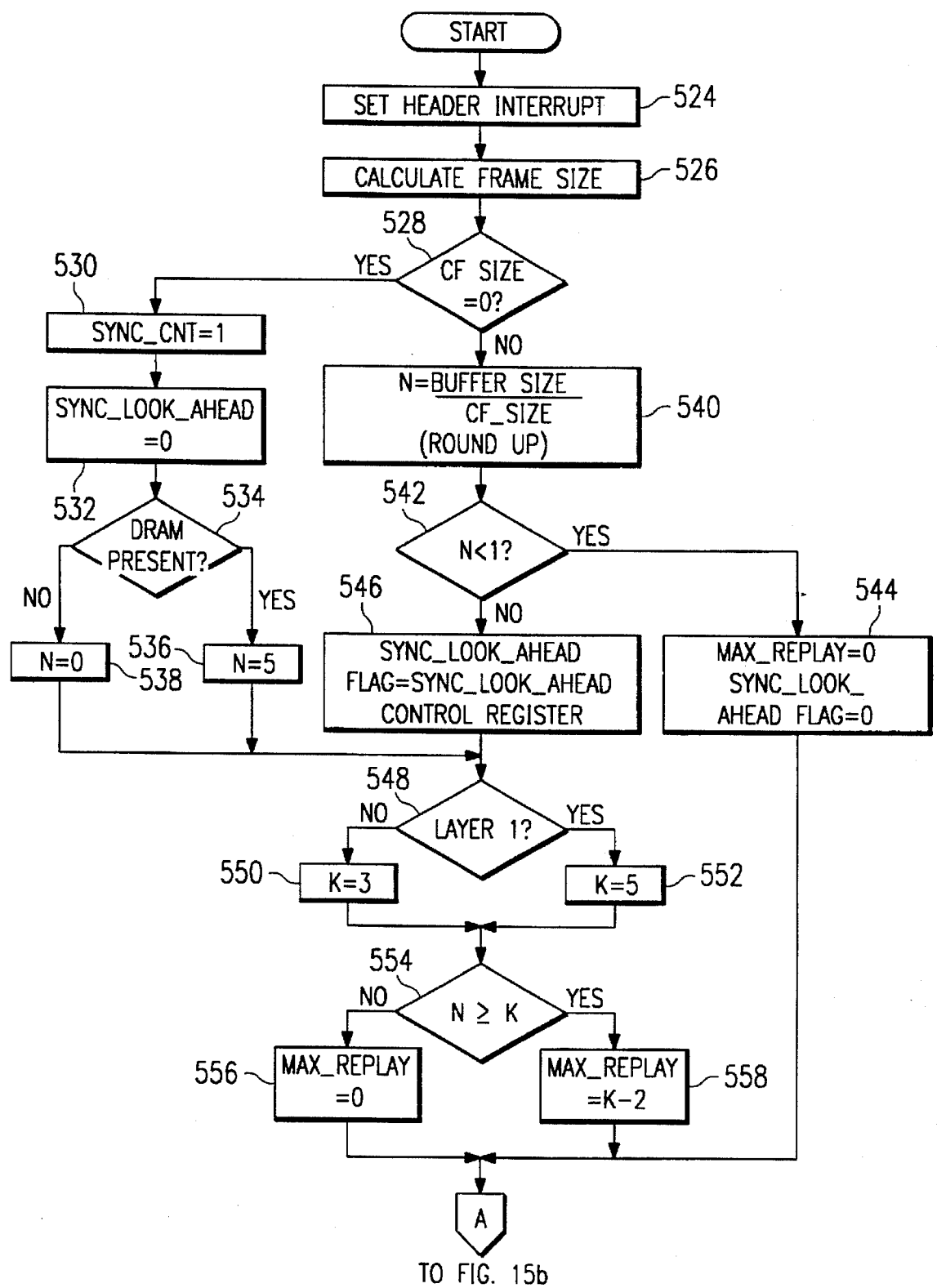
Figure 15B:
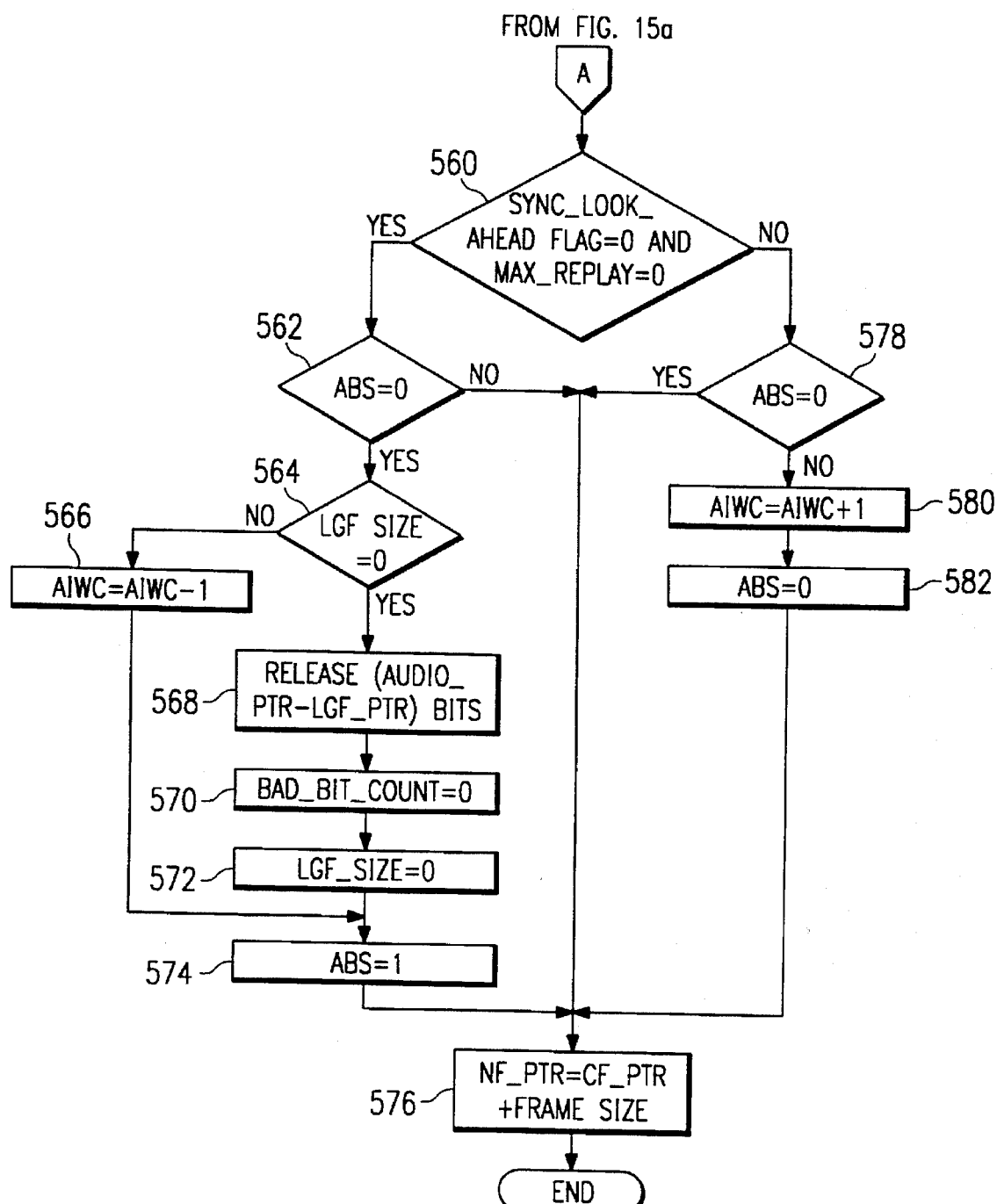

FIG. 15a illustrates the methods used by the audio decoder block 28 to set up the frame once a header has been located in the bit stream. The method begins by setting the header interrupt at step 524. The method then proceeds to step 526 where the frame size is calculated and loaded into the CF_SIZE field. The methods used to calculate the frame size will be discussed with reference to FIG. 16 herein. The method proceeds to step 528 where the CF_SIZE is compared to the value 0. If the CF_SIZE is equal to 0, it indicates that the header did not specify the frame size and that microprocessor host 12 has not specified the frame size and, accordingly, the bit stream is in free format with no specified frame size. The method proceeds to step 530 where the synchronization count variable is set equal to 1 and then to step 532 where the SYNC_LOOKAHEAD flag is cleared. The SYNC_LOOKAHEAD flag indicates whether or not the audio decoder 28 will look ahead to try to find another synchronization word at the end of the current frame. Since the audio decoder block 28 does not know the size of the current frame, there is no way that the SYNC_LOOKAHEAD process can take place. The method then proceeds to step 534 where a determination is made as to whether external DRAM is present. If DRAM is present, a variable N equal to the number of frames that can be stored in the input buffer is set equal to 5 in step 536 and if DRAM is not present, the variable N is set equal to 0 in step 538.

Returning to step 528, if the CF_SIZE was not 0, the method proceeds to step 540 where the variable N is set equal to the quotient of the buffer size divided by the CF_SIZE rounded up to the nearest integer. The method then proceeds to step 542 where the variable N is compared to the value 1. If N is less than 1, there is not enough memory to store a good frame and therefore the MAX_REPLAY variable is set equal to 0 and the SYNC_LOOKAHEAD flag is set equal to 0 in step 544. If N is greater than or equal to 1, the method proceeds to step 546 where the SYNC_LOOKAHEAD flag is set equal to the SYNC_LOOKAHEAD control register set by the microprocessor host 12. The method then proceeds to step 548 where a determination is made whether or not the current frame contains layer 1 MPEG audio data or layer 2 MPEG audio data. If the frame contains layer 2 MPEG audio data, the method proceeds to step 550 where a variable K is set equal to 3. If at step 548, the current frame contains layer 1 MPEG audio data, the method proceeds to step 552 where the variable K is set equal to 5. K signifies the number of frames that must be able to be stored in the input buffer 24 or external buffer 26 to enable maximum replay.

The method proceeds from both steps 550 and 552 to a step 554 where the variable N is compared to the variable K. If N is less than K, the method proceeds to step 556 where the MAX_REPLAY variable is set equal to 0. Once again, if N is less than K, there is not enough memory to allow for the replay of the last good frame of data. If N is greater than or equal to K, the MAX_REPLAY variable is set equal to K-2 in step 558. The MAX_REPLAY variable will always be either 1 or 3 as a result of the operation performed in step 558. The method proceeds from steps 556, 558 and 544 to a step 560 indicated in FIG. 15b. In step 560, a determination is made if the SYNC_LOOKAHEAD flag and the MAX_REPLAY variable are both equal to 0. If this is the case, the method proceeds to step 562 where a determination is made as to whether the Automatic Buffer Size (ABS) feature is enabled by testing the ABS flag. If the feature is disabled, the method proceeds to step 564 where the LGF_SIZE is tested. If the LGF_SIZE is not equal to 0, the method proceeds to step 566 where the audio input word count is decremented. The count is decremented because the header has already been read. If the LGF_SIZE is equal to 0 at step 564, the method proceeds to step 568 where a number of bits in the input buffer 24 or external buffer 26 are released. The number of bits released is equal to the AUDIO_PTR minus the LGF_PTR. The method then proceeds to step 570 where the BAD_BIT_CNT is set equal to 0 and then to step 572 where the LGF_SIZE is set equal to 0. The method proceeds from both steps 566 and 572 to step 574 where the ABS flag is set equal to 0. The method then proceeds to step 576 where the NF_PTR is set equal to the CF_PTR plus the frame size. The method also proceeds to step 576 if at step 562 the ABS flag was equal to 1. If at step 560, the SYNC_LOOKAHEAD flag and the MAX_REPLAY variable are not both equal to 0, the method proceeds to step 578 where once again the ABS flag is tested. If the ABS flag is equal to 0, the method proceeds directly to step 576. If the ABS is equal to 1, the method proceeds to step 580 where the audio input word count is incremented and then to step 582 where the ABS flag is cleared. The method then proceeds to step 576.

Frame Size Calculation

Figure 16:
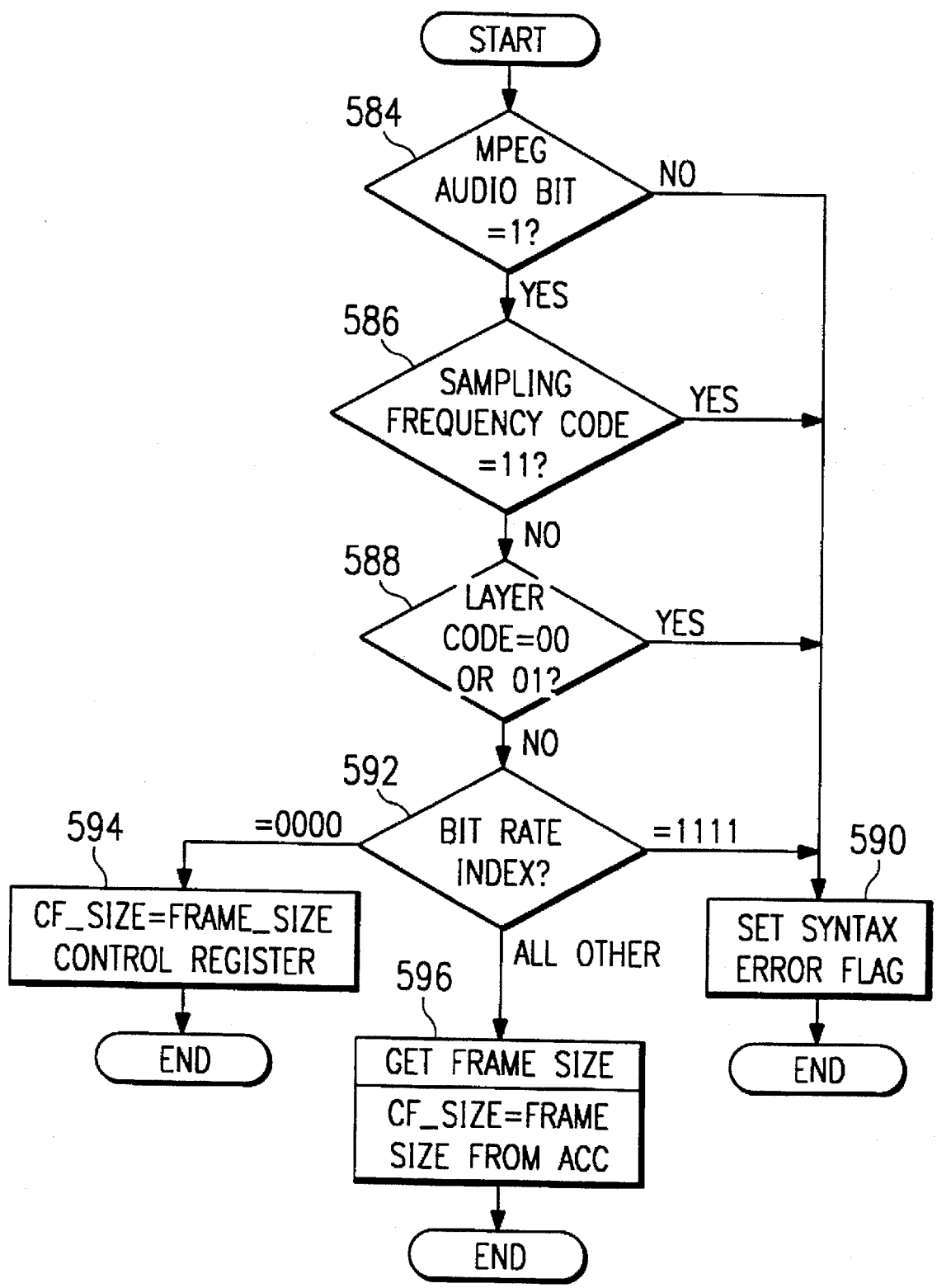

FIG. 16 illustrates the methods used by the audio decoder block 28 to calculate the frame size. The method begins at step 584 where the MPEG audio bit within the header is tested. If the MPEG audio bit is not set, it indicates that the frame does not contain MPEG audio data and the method proceeds to step 590 where the SYNTAX ERROR flag is set. If the MPEG audio bit is set, the method proceeds to step 586 where the sampling frequency code is checked. If the sampling frequency code is equal to 11, the method once again proceeds to step 590 where the syntax error flag is set. A sampling frequency code of 11 is an invalid code. If the sampling frequency code is not 11, the method proceeds to step 588 where the layer code is checked. Layer codes of 00 and 01 will cause the method to proceed to step 590 where the syntax error flag is set. Layer codes of 00 and 01 are invalid codes. If the layer code is valid, the method proceeds to step 592 where the bit rate index is set. A bit rate index of 1111 causes the method to once again route to step 590 where the syntax error flag is set. A bit rate of 1111 is invalid. If the bit rate index is all zeroes, the method proceeds to step 594 where the CF_SIZE variable is loaded with the contents of the frame size control register specified by the microprocessor host 12. A bit rate index value of all zeroes indicates that the bit stream is a free format bit stream. The frame size control register can be used by the microprocessor host 12 to communicate the actual size of the frame to the audio decoder block 28. If the microprocessor host 12 does not place a value in the frame size control register, the CF_SIZE variable is set equal to 0 at step 594 when the contents of the frame size control register are loaded into the CF_SIZE variable. For all other bit rate values, the method proceeds from step 592 to step 596 where the GET TABLE instruction is used to retrieve the frame size from the header information. After this operation, the frame size will be present in the accumulator 110. The contents of accumulator 110 are loaded into the CF_SIZE variable in step 596.

Error Concealment Operations

Figure 17:
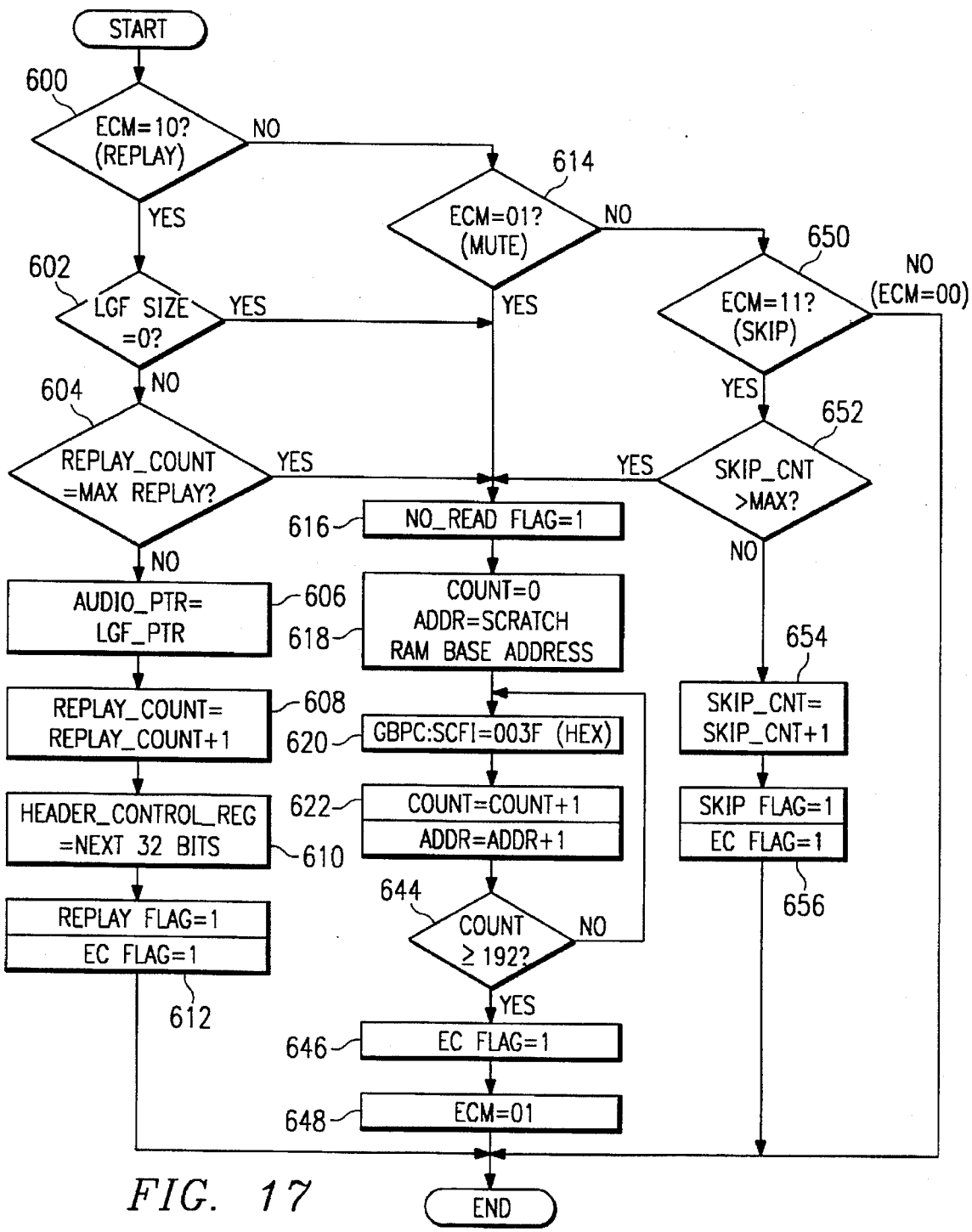

FIG. 17 illustrates the methods of error concealment used by audio decoder block 28 when either an error has been detected in a frame or a synchronization lock state has not yet been achieved. The method begins at step 600 where the error concealment mode variable is compared to the value 10 indicating the replay mode. If the replay mode is the current error concealment mode, the method proceeds to step 602 where the LGF_SIZE is checked. If the LGF_SIZE is not equal to 0, the method proceeds to step 604 where it is determined if the REPLAY_CNT is equal to the maximum replay value which is either 1 or 3. If the REPLAY_CNT is not equal to the maximum replay value, the method proceeds to step 606, where the audio decoder block 28 effectively backs up in the bit stream by loading the value of the LGF_PTR into the AUDIO_PTR. The method then proceeds to step 608 where the REPLAY_CNT variable is incremented. The method then proceeds to step 610 where the header control register is loaded with the next 32 bits. The method then proceeds to step 612 where the replay flag is set and the error concealment flag is set.

If the error concealment mode was not set for replay at step 600, the method proceeds to step 614 where the error concealment mode is checked to see if it is in mute mode indicated by a 01 value. If the error concealment mode is in mute mode, the method proceeds to step 616 where the NO_READ flag is set. Step 616 is also reached if the LGF_SIZE is equal to 0 or if the REPLAY_CNT is equal to the maximum replay in step 602 and 604, respectively. Accordingly, if there is no last good frame, the error concealment system of the present invention will mute the output for the current frame or if the maximum number of replays has already been reached, the output will be muted by proceeding to step 616 from steps 602 and 604. The method proceeds from step 616 to 618 where a COUNT variable is set equal to 0. The method proceeds to step 618 to a step 620 where the value H003F is written at address 0 in the arithmetic unit buffer. The value H003F corresponds to two concatenated values. The H3F comprises a scale factor index value that will cause a scale factor of 0 to be retrieved which when multiplied by the SBB values in the hardware filter arithmetic unit block 32 will effectively mute the output. The H00 corresponds to a bits per code word value of 0.

The method proceeds to step 622 where the COUNT variable and ADDRESS variable are incremented. The method then proceeds to step 644 where the COUNT variable is compared to the value 192. If the value 192 has not yet been reached, the method returns to step 620 and writes a H003F into the next addressed position within arithmetic unit buffer 30. If at step 6644, the count is greater than or equal to 192, the method proceeds to step 646 where the error concealment flag is set equal to 1. The method then proceeds to step 648 where the error concealment mode is set equal to the code 01 indicating the mute selection. In this manner, if the mute operation was reached from either a failure in the replay or the skip operation, the error concealment mode is reset to indicate that the mute operation should be followed henceforth.

If the error concealment mode value was not equal to 01 at step 614, the method proceeds to step 650 where it is determined if the error concealment mode is equal to 11 indicating a skip process. If the error concealment mode is not equal to 11 at step 650, it is assumed that the error concealment mode is equal to 00 indicating no action and the method exits. If the error concealment mode is equal to 11 in step 650, the method proceeds to step 652 where it is determined whether or not the maximum number of frames have been skipped. If the maximum number of frames have been skipped, the method proceeds to step 616 and the mute operation described previously is implemented. If the maximum number of frames have not been skipped at step 652, the method proceeds to step 654 where the SKIP_CNT is incremented. The method then proceeds to step 656 where the SKIP flag and EC flag are set.

Audio Frame Decoding process

Figure 18A:
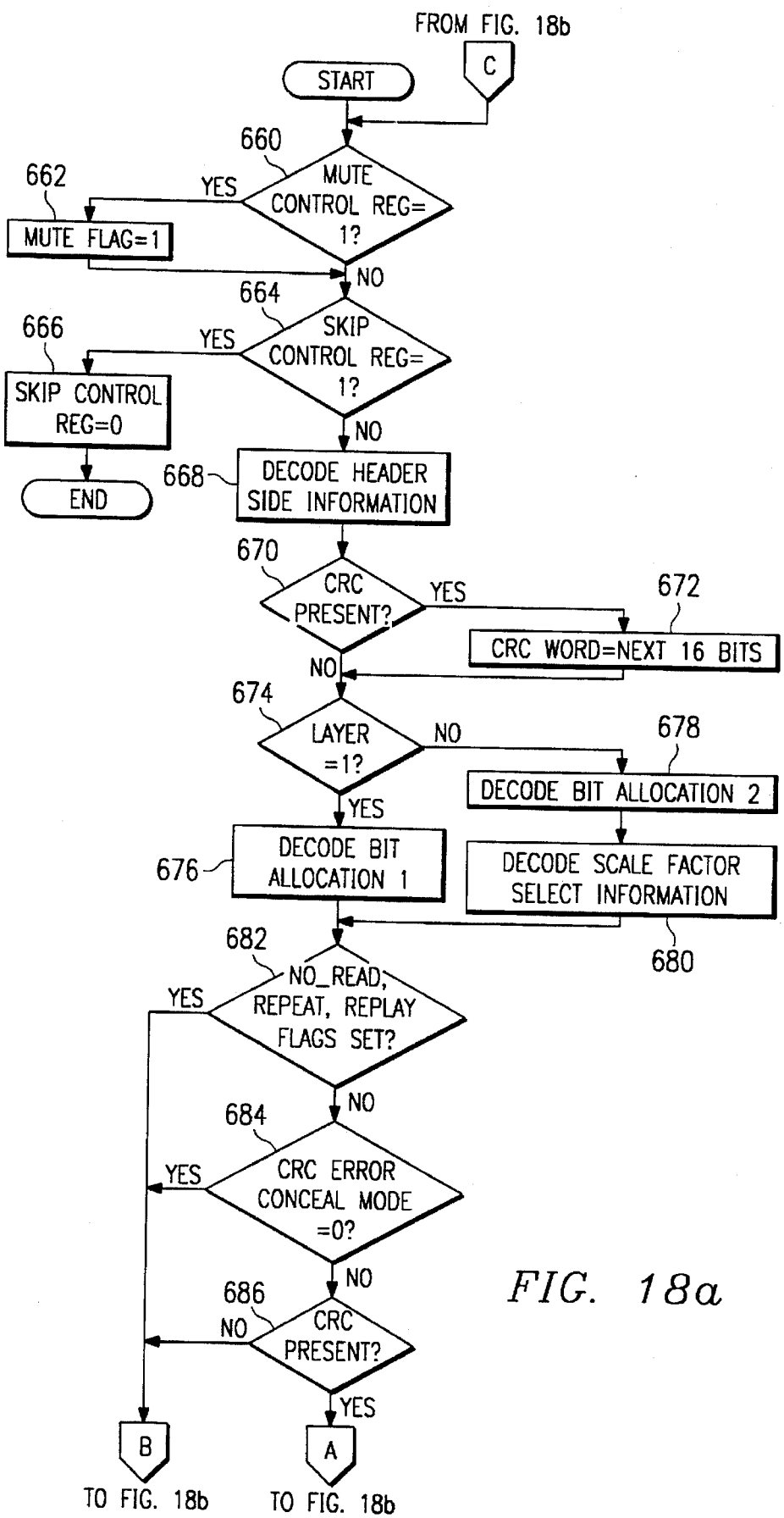
Figure 18B:
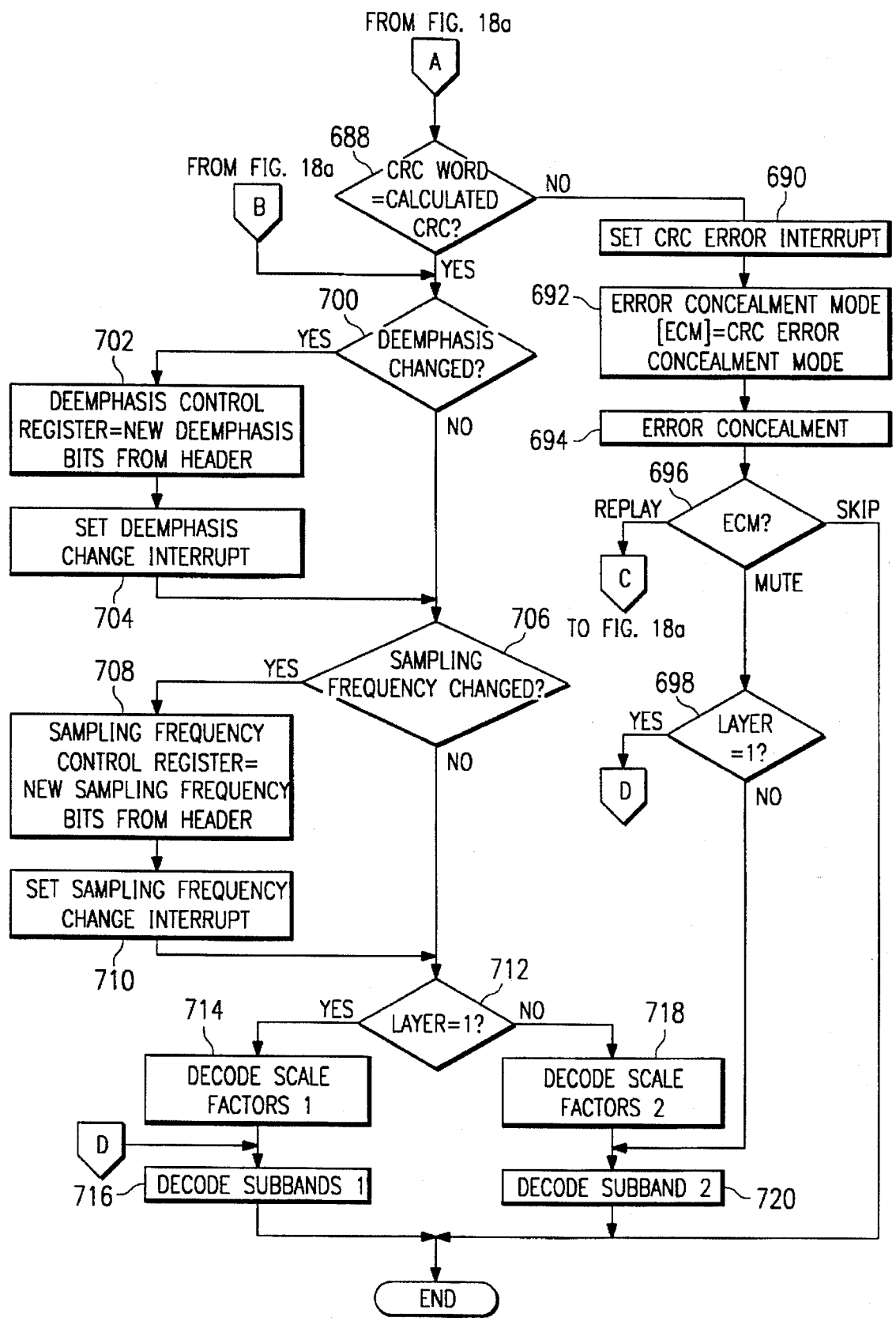

FIGS. 18a and 18b are flow charts which illustrate the processes used by audio decoder block 28 to decode an audio frame. The method begins at step 660 where the audio decoder block 28 checks the MUTE control register. If the microprocessor host 12 has set the MUTE control register, the method proceeds to step 662 where the internal MUTE flag is set. If the MUTE control register was not set in step 660, or following the setting of the MUTE flag in step 662, the method proceeds to step 664 where the audio decoder block 28 checks to see if the microprocessor host 12 has set the SKIP control register. If the SKIP control register has been set by the microprocessor host 12, this condition indicates that the frame is to be skipped. The method therefore proceeds to step 666 where the SKIP control register is cleared. The method then exits the process of decoding the audio frame. If the SKIP control register was not set, the method proceeds to step 668 where the header side information is decoded. The processes used to decode the header side information will be discussed fully with reference to FIG. 19 herein. The method proceeds after decoding the header side information to step 670 where the audio decoder block 28 determines if the bit stream is CRC protected. If the audio bit stream is CRC protected, the method proceeds to step 672 where the CRC word is retrieved using a GBT instruction to retrieve the next 16 bits in the data stream. These 16 bits are stored in a CRC word variable. The method proceeds from step 672 or from step 670 if the data stream is not CRC protected to step 674 where the layer of the data stream is checked. If the data stream is layer 1 data, the method proceeds to step 676 where a first method is used to decode the bit allocation data. This method will be described with reference to FIG. 20 herein. If the method is layer 2 data, the method proceeds from step 674 to step 678 where a second method is used to decode the bit allocation data. This method will be described with reference to FIG. 21 herein. The method then proceeds to step 680 where the scale factor select information (SCFSI) is decoded. The method used to decode the scale factor selection information will be discussed with reference to FIG. 22 herein.

The method proceeds from step 676 or step 680 to step 682 where the audio decoder block 28 tests the NO_READ, REPEAT and REPLAY flags. If any of these flags are set, the method proceeds to branch point B which will re-enter the method in FIG. 18b. If none of the flags are set, the method proceeds to step 684 where the CRC error concealment mode is checked. If the CRC error concealment mode is equal to 0, the method proceeds to branch point B. The CRC error concealment mode equal to 0 indicates that the microprocessor host 12 is instructing the audio decoder block 28 to ignore CRC errors. If the CRC error concealment mode is not equal to 0, the method proceeds to step 686 where the header is checked to see if there is a CRC word present. If there is no CRC word present, the method proceeds to branch point B. If there is a CRC word present, the method proceeds to branch point A which will re-enter the method on FIG. 18b.

Referring now to FIG. 18b, the method proceeds from branch point A to a step 688 where the stored CRC word which was retrieved from the bit stream is compared to the calculated CRC word. If the CRC word does not match the calculated CRC value, there is a CRC error in the bit stream. Accordingly, the method proceeds to step 690 where the CRC error interrupt is set. The method then proceeds to step 692 where the error concealment mode is set equal to the CRC error concealment mode. The method then proceeds to step 694 where error concealment is performed in accordance with the method discussed with reference to FIG. 17 previously.

The method returns from error concealment process at step 694 to make a decision at step 696 where the ECM variable is checked. If the ECM variable indicates that the current frame is to be skipped, the method concludes. If the ECM variable indicates that the last good frame is to be replayed, the method proceeds to branch point C which re-enters the method at step 660 in FIG. 18a. If the PCM variable indicates that the output is to be muted for the current frame, the method proceeds to step 698 where the layer is checked. If the current frame is layer 1 audio data, the method proceeds to branch point B which re-enters the method at step 716 in FIG. 18b. If the current frame is not layer 1 MPEG audio, the method re-enters prior to the decoding of the subband information for layer 2 audio data as shown in FIG. 18b.

If the CRC word matched the calculated CRC word in step 688, the method proceeds to step 700. In addition, the method proceeds from branch point B to step 700. At step 700, a determination is made as to whether or not the deemphasis value has changed. If the deemphasis value has been changed, the method proceeds to step 702 where the deemphasis control register is updated and loaded with the new deemphasis bits retrieved from the HEADER register. The method then proceeds to step 704 where the deemphasis change interrupt is set. The deemphasis mode can change in a bit stream from frame to frame, so the audio decoder block 28 must check the deemphasis value and inform the microprocessor host 12 of any change. Similarly, the sampling frequency can change from frame to frame. Accordingly, the method proceeds from step 704 or from step 700 to step 706 where a determination is made as to whether or not the sampling frequency has changed. If the sampling frequency has changed, the method proceeds to step 708 where the sampling frequency control register is loaded with the new sampling frequency bits retrieved from the HEADER register. The method then proceeds to step 710 where the sampling frequency change interrupt is set to inform the microprocessor host 12 that a change in the sampling frequency has been detected. The method proceeds from step 710 or from step 706 to step 712 where a branch is made based on which layer is associated with the current frame. If the current data is layer 1 audio data, the method proceeds to step 714 where a first method is used to decode the scale factor information. This method will be described with reference to FIG. 23 herein. The method proceeds from step 714 and from branch point D to step 716 where a first method is used to decode the subband information. This method will be described with reference to FIGS. 24a and 24b herein. The method concludes following step 716.

If the data for the current frame is layer 2 audio data, the method proceeds from step 712 to step 718 where a second method of decoding the scale factor information is used. This method will be discussed with reference to FIGS. 25a and 25b. The method proceeds from step 718 or from step 698 to a step 720 where a second method is used to decode the subband information. This method will be discussed with reference to FIGS. 26a and 26b herein. The method concludes following step 720.

Side Information Decoding Process

Figure 19:
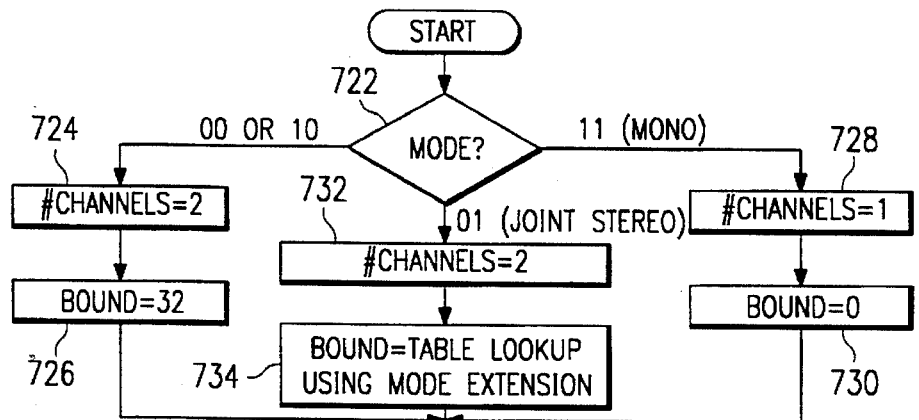

FIG. 19 is a flow chart of the process used by the audio decoder block 28 to decode side information contained within the header. The method begins at step 722 where the audio decoder block 28 checks the mode which is contained within the header stored in the HEADER register. If the mode field within the header contains either a 00 or a 10, it indicates that stereo or dual channel data is contained within the audio frame. The method proceeds to step 724 where a number of channels (#CHANNELS) variable is set equal to 2. The method then proceeds to step 726 where a BOUND variable is set equal to 32. If at step 22 the mode field contains all, the audio frame contains monaural information. Accordingly, the method proceeds from step 722 to step 728 where the #CHANNELS variable is set equal to 1. The method then proceeds to step 730 where the BOUND variable is set equal to 0. If at step 722 the mode field contained a 01, the frame contains joint stereo audio data. Full stereo data contains separate samples for all 32 frequency ranges. In contrast, monaural audio data uses the same samples for the right and left channels for all 32 frequency ranges. Joint stereo data accomplishes compression of the bit stream by using the same sample for some frequency bands and using separate right and left channel samples for other frequency bands. The BOUND variable indicates how many of the 32 frequency bands are coded separately. Accordingly, the method proceeds from step 722 to step 732 where the #CHANNELS variable is set equal to 2. The method then proceeds to step 734 where a GET TABLE instruction is used to retrieve the BOUND value associated with the current audio frame. The method ends after step 726, step 750 or step 734.

Layer 1 Bit Allocation Decoding process

Figure 20:
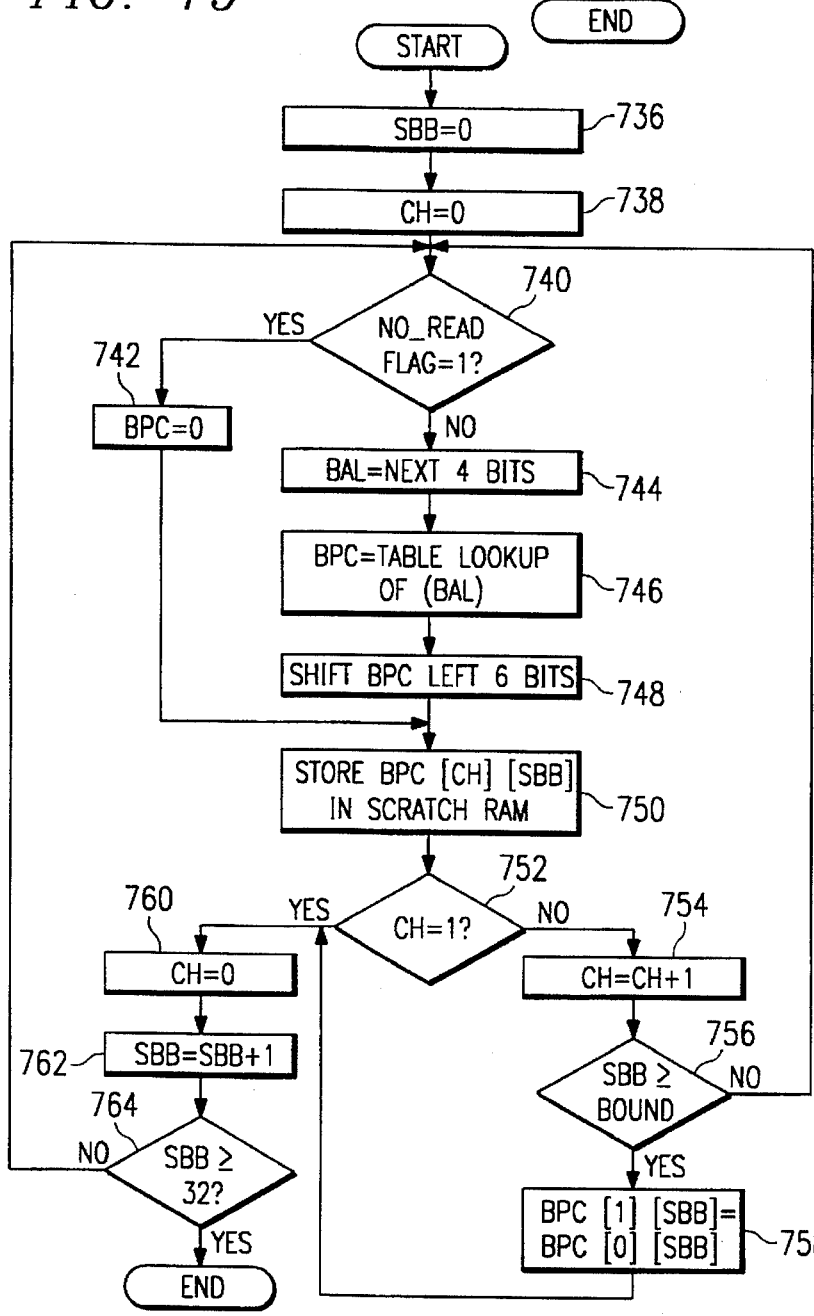

FIG. 20 illustrates the method the audio decoder block uses to decode the bit allocation information if the bit stream is layer 1 audio data. The method begins at step 736 where a SBB variable is set equal to 0. The method then proceeds to step 738 where a channel variable (CH) is set equal to 0. The method then proceeds to step 740 where the internal NO_READ flag is tested. If the NO_READ flag is set equal to 1, the method proceeds to step 742 where the bits per code word (BPC) variable is set equal to 0. If the NO_READ flag has not been set, the method proceeds to step 744 where a GBTC instruction is used to retrieve the next 4 bits and store them in a bit allocation (BAL) variable. The method then proceeds to step 746 where a GET TABLE instruction is used to retrieve the BPC using the 4 bits stored in the BAL variable. The value returned by the GET TABLE instruction is stored in a BPC variable. The method proceeds to step 748 where the BPC variable is shifted left by 6 bits to allow it to become concatenated with the scale factor index associated with the sample. The method then proceeds to step 750 where the shifted BPC value is stored in the scratch RAM within audio decoder block 28 in a vector location given by the CH and SBB variables.

The method then proceeds to step 752 where a decision is made based on the channel value. If at step 752 the channel is equal to 0, the CH variable is incremented at step 754. The method then proceeds to step 756 where the SBB value is compared to the BOUND variable. If the SBB variable is less than the BOUND, it indicates that the SBB value is still within the stereo range of the joint stereo data set and the method loops back to perform the same operation for the second channel associated with the SBB value. If at step 756, the SBB value is greater than or equal to BOUND, it indicates that the SBB value is in the monaural range of the joint stereo spectrum. The method then proceeds to step 758 where the value associated with channel 0 and the SBB value is copied into the scratch RAM at a location vectored according to the same SBB value and channel 1. The method proceeds directly from step 758 or from step 752 if the CH value was equal to 1 to step 760 where the CH value is reset to 0. The method then proceeds to step 762 where the SBB value is incremented. The SBB value is then compared to the number 32 in step 764. If the SBB value is less than 32, the method loops back to step 740, otherwise the method concludes. The method illustrated in FIG. 20 finishes with 64 BPC values stored left-justified in scratch RAM 142 within audio decoder block 28.

Layer 2 Bit Allocation Decoding Process

Figure 21:
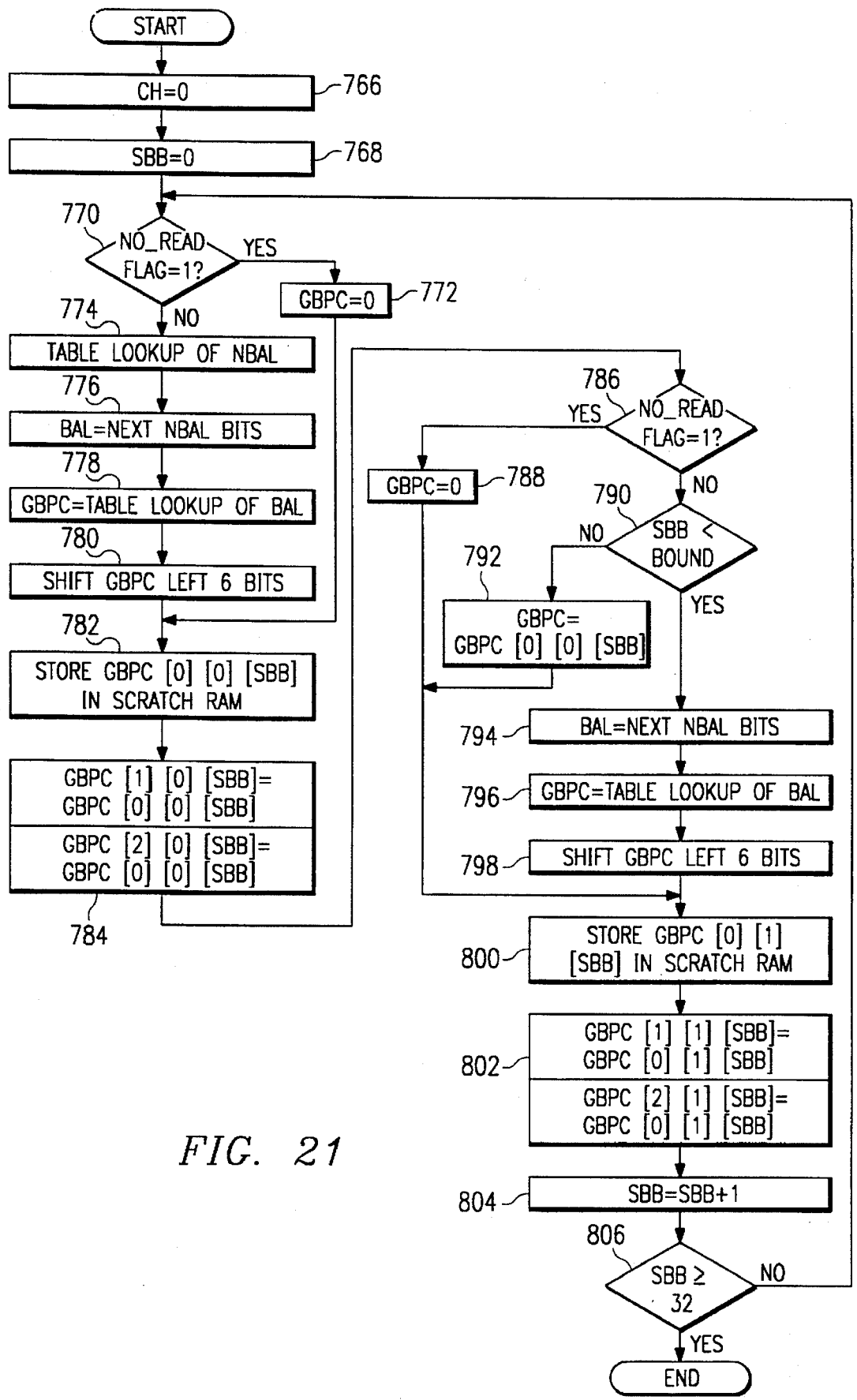

FIG. 21 illustrates the method used to decode the bit allocation data when the frame is layer 2 audio data. The method begins at step 766 where the CH variable is set equal to 0. The method then proceeds to step 768 where the SBB variable is set equal to 0. The method then proceeds to step 770 where the NO_READ flag is checked. If the NO_READ flag is set, the BPC value is set equal to 0 at step 772. If the NO_READ flag is not set at step 770, the method proceeds to step 774, where a GET TABLE instruction is used to look up a value of nBAL using the SBB value and information from the header. The method then proceeds to step 776 where a GBTC instruction is used to retrieve a number of data bits in the bit stream corresponding to the value for nBAL that was retrieved in step 774. These bits are stored in a BAL variable. The method then proceeds to step 778 where a grouped bits per code word (GBPC) value is retrieved using a GET TABLE instruction using the value of the BAL variable to specify the bits to be retrieved. In layer 2 MPEG audio data, additional compression is achieved by associating a single BPC value with a group of 3 sets of samples. Hence the BPC becomes a grouped bits per code word.

The method proceeds to step 780 where the GBPC value is shifted left 6 bit positions. In layer 2, three sets of 32 pairs of SBB values are grouped together in a block, also referred to as a granule. In layer 2 MPEG audio data, the 3 sets within a granule or block share the same BPC value for a given SBB value. Accordingly, the method proceeds to step 782 where the GBPC value is stored in scratch RAM at a location vectored on the set number, channel number and SBB value. The method then proceeds to step 784 where the GBPC value for the second and third granules are copied from the values stored in step 782.

The method proceeds to step 786 where the NO_READ flag is once again checked. If the NO_READ flag is set, the GBPC value is set equal to 0 in step 788. If the NO_READ flag was not set, the method proceeds to step 790 where the current SBB value is compared to the BOUND value. If the SBB value is not less than the BOUND value, the SBB value is in the monaural range of the joint stereo spectrum and the method proceeds to step 792 where the GBPC value is set equal to the GBPC value associated with the prior channel. If the SBB value is less than the BOUND value of step 790, the current SBB value is within the stereo range of the joint stereo spectrum. The method therefore proceeds to step 794 where a GBTC instruction is used to retrieve a number of bits from the bit stream equal to the nBAL variable. The retrieved bits are stored as the BAL variable. The method then proceeds to step 796 where the GBPC value is retrieved using a GET TABLE instruction keyed off the BAL variable. The method then proceeds to step 798 where the GBPC value retrieved in step 796 is shifted left by 6 bits. The method proceeds from step 788, step 792 and step 798 to step 800 where the GBPC value is stored in scratch RAM at a vector of the set number, channel number and SBB number similar to the operation performed in step 782 previously. The method then proceeds to step 802 where the values for the GBPC variable for the second and third sets are copied from the values stored from the first set in step 800. The values for the second and third sets are also stored in scratch RAM. The method then proceeds to step 804 where the SBB value is incremented. The method then checks at step 806 whether or not the SBB value is greater than or equal to the number 32. If the SBB value is greater than or equal to 32, the method concludes. If the SBB value is less than 32, the method returns to step 770 and performs the operation for the next SBB value.

Scale Factor Selection Information Retrieval Process

Figure 22:
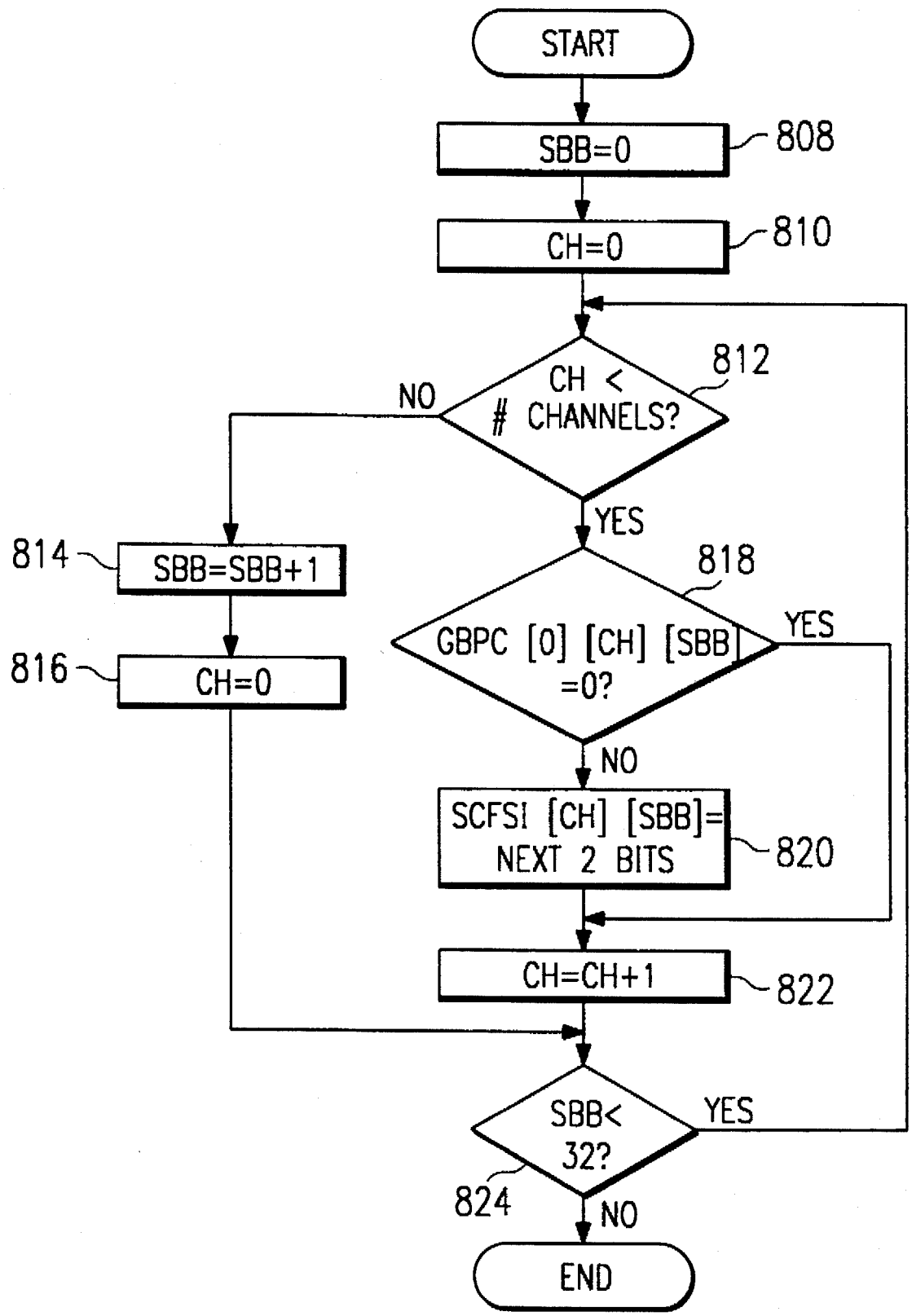

FIG. 22 illustrates the method used to retrieve the scale factor select information associated with layer 2 MPEG audio data. The 3 sets within a block of layer 2 audio data can use independent scale factors or share scale factors with other sets within the block on a per-subband basis. The scale factor select information indicates, using a 2-bit field, the mode of scale factor sharing that each subband utilizes. The method begins at step 808 where the SBB variable is set equal to 0. The method then proceeds to step 810 where the CH variable is set equal to 0. The method then proceeds to step 812 where the CH variable is compared to the #CHANNELS variable. If the CH variable is greater than the #CHANNELS variable, the method proceeds to step 814 where the SBB value is incremented. The method then proceeds to step 816 where the CH variable is set equal to 0. If the CH variable is less than the #CHANNELS variable, the method proceeds to step 818 where the GBPC value for the particular granule, channel, and subband number is compared to the value 0. If this value is equal to 0, it indicates that there are no bits per code word allocated for that subband and the method does not need to retrieve any scale factor select information. If there is a non-zero GBPC for a given set, channel, and subband, the method proceeds to step 820 where the scale factor select information for that set, channel, and subband is retrieved by retrieving the next 2 bits from the bit stream using a GBTC instruction. These 2 bits are stored in a scratch RAM in a location vectored by the #CHANNELS and SBB number. The method then proceeds to step 822 where the CH variable is incremented. The method also proceeds to step 822 directly if the GBPC value was equal to 0 at step 818. The method proceeds from step 822 and from step 816 to step 824 where the SBB value is compared to the value 32. If the SBB value is 32 or greater, the method concludes. If the SBB value is less than 32, the method returns to step 812 to retrieve the scale factor select information for the opposite channel or to increment the SBB number.

Layer 1 Scale Factor Index Decoding process

Figure 23:
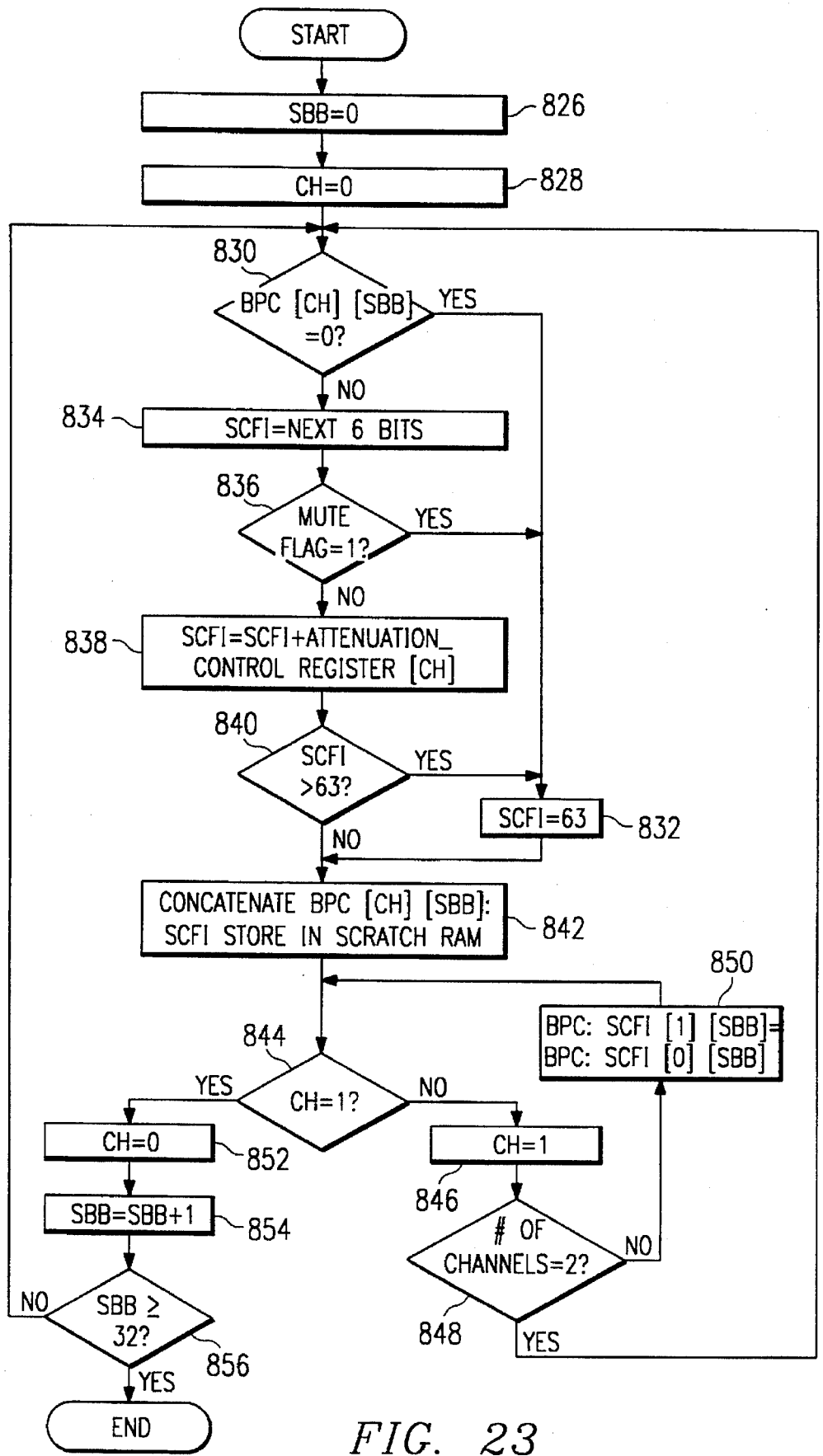

FIG. 23 illustrates the method the audio decoder block 28 utilizes to decode the scale factor indices for layer 1 MPEG audio data. The method begins at step 826 where the SBB variable is set equal to 0. The method then proceeds to step 828 where the CH variable is set equal to 0. The method then reads from the scratch pad memory a value for BPC indexed on the CH variable and the SBB variable at step 830. A decision is made at step 830 whether or not the BPC stored at that location is equal to 0. If the value is 0, the method proceeds to step 832 which sets a value of 63 or H3F equal to a SCF index variable. A scale factor index of 63 will result in a muting of that subband when the scale factor index is used by the hardware filter arithmetic unit 32 to retrieve the scale factor from memory. A scale factor index value of 0 will retrieve the largest scale factor and a scale factor index of 63 will receive a 0 scale factor from the scale factor ROM associated with hardware filter arithmetic unit block 32. If the BPC value retrieved in step 830 was not equal to 0, the method proceeds to step 834 where the SCF index variable is set equal to the next 6 bits in the bit stream. The method then proceeds to step 836 where the MUTE flag is checked. If the MUTE flag is set, the subband is muted by routing to step 832 which stores the number 63 as the SCF index variable as discussed previously.

If the MUTE flag was not set in step 836, the method proceeds to step 838 where the scale factor index is added to the value of an attenuation control register selected according to the CH variable. The attenuation control register contains a value that may be set by the microprocessor host 12 to attenuate one channel with respect to the other by adding a value to the scale factor index resulting in the fact that the ultimate scale factor retrieved for the particular subband will result in less volume for that subband. Step 838 selects the attenuation control register as a function of the channel. Accordingly, the attenuation control register can be thought of as a right-to-left balance switch which is programmable by the microprocessor host 12. According to an alternate embodiment of the present invention, the attenuation control register is selected based on the channel and the subband. In this manner, microprocessor host 12 can control a programmable 64-channel equalizer by attenuating the various subbands in the first and second channels. In this manner, a 64-band equalizer can be implemented in the digital domain preventing the losses and distortion associated with equalizers implemented in the analog domain.

The method proceeds to step 840 which tests to see if the attenuated scale factor index is greater than 63. If the scale factor index is greater than 63 after the addition of the contents of the attenuation control register, the number 63 is loaded into the SCF index variable in step 832. The method proceeds from step 832 and step 840 to step 842 where the scale factor index for the particular channel and subband is concatenated onto the BPC which is already stored in the scratch RAM. The concatenated pair is then placed back in the scratch RAM in the same address location. The method proceeds from step 842 to step 844 which tests the CH variable. If the CH variable is not equal to 1, the method branches to step 846 where the CH variable is equal to 1. The method proceeds from step 846 to step 848 where a determination is made as to whether or not the audio stream uses two channels. If the audio stream does use two channels, the method returns to step 830 to retrieve the scale factor index associated with the subband for channel 1. If there are not two channels in use, the method proceeds from step 848 to step 850 where the BPC and scale factor index pair for channel 0 are copied to the address location associated with the same subband for channel 1. The method then returns to step 844.

If at step 844 the CH variable is equal to 1, the CH variable is reset to 0 at step 852. The method then proceeds to step 854 where the SBB variable is incremented. The method then proceeds to step 856 where the SBB variable is compared to 32. If the SBB variable is less than 32, the method returns to step 830 where the scale factor index for the next subband is decoded. If the SBB variable is greater than or equal to 32 at step 856, the method concludes.

Layer 1 Subband Information Decoding Process

Figure 24A:
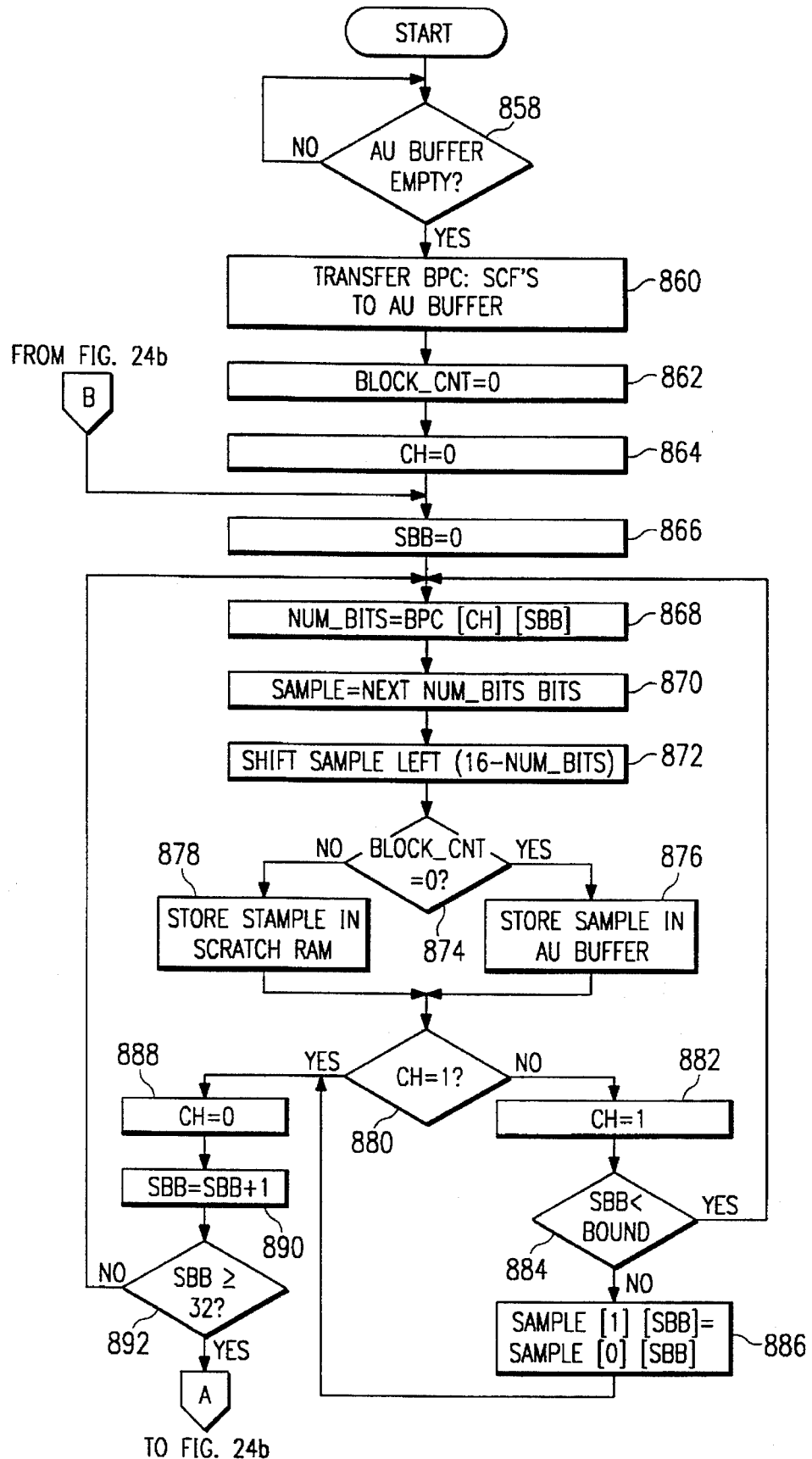
Figure 24B:
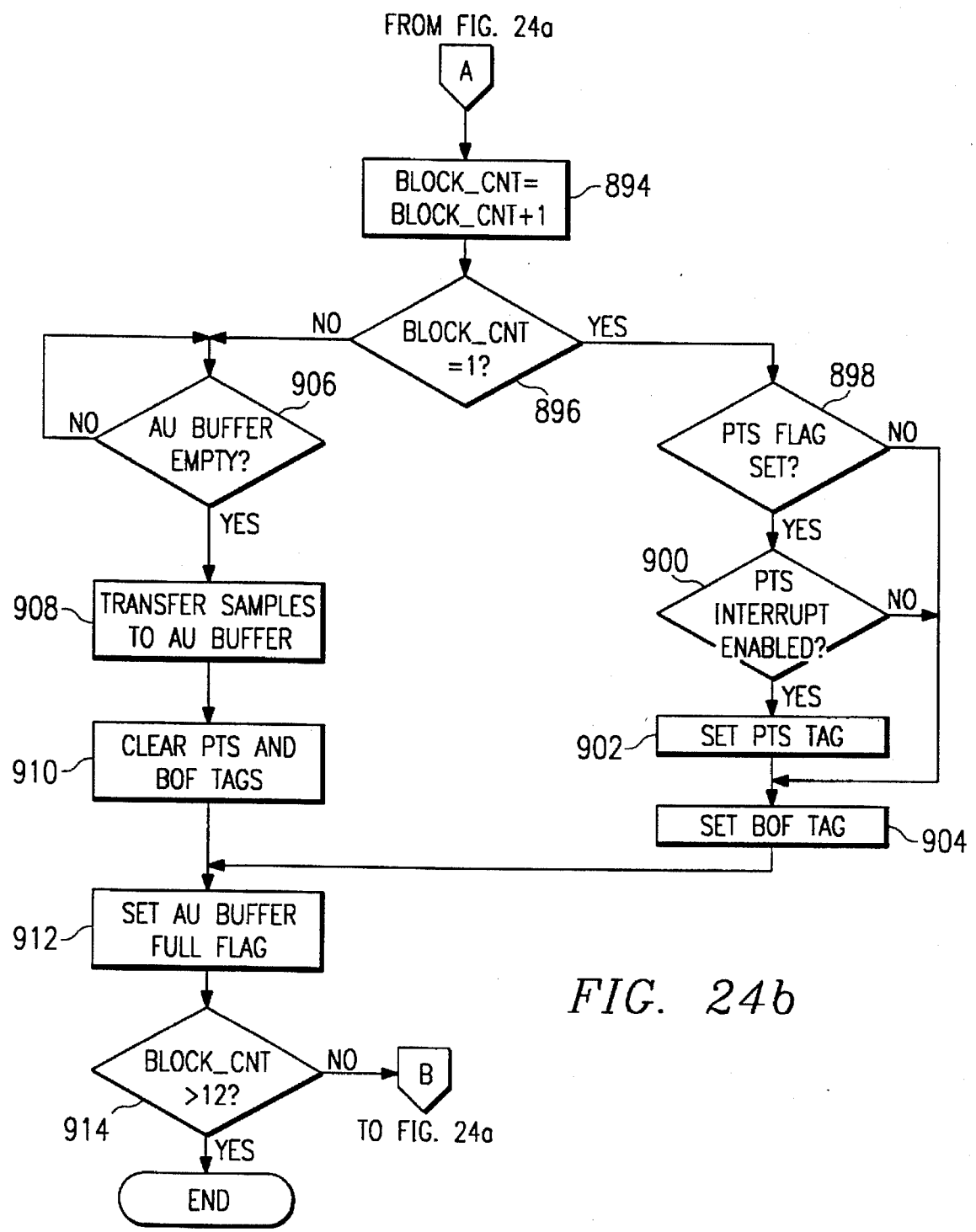

FIGS. 24a and 24b illustrate the method that the audio decoder block 28 utilizes to decode the subband information of layer 1 MPEG audio data. The method begins at step 858 where a determination is made whether or not the hardware filter arithmetic unit block 32 has emptied the arithmetic unit buffer 30. This determination is made by testing a register within the special register block of audio decoder block 28. When the arithmetic unit buffer 30 is found to be empty, the method proceeds to step 860 where the concatenated BPC and scale factor indices are moved to the arithmetic unit buffer 30 from the scratch RAM associated with audio decoder 28. The method proceeds to step 862 where the BLOCK_CNT is set equal to 0. The method then proceeds to step 864 where the CH variable is set equal to 0. The method then proceeds to step 866 where the SBB variable is set equal to 0. The method proceeds to step 868 where the value of the BPC selected by the CH variable and the SBB variable are loaded in a variable NUM_BITS. The method then proceeds to step 870 where a GBT instruction is used to retrieve a number of bits from the bit stream equal to the value of the NUM_BITS variable and stores the retrieved bits in a SAMPLE variable. The method then proceeds to step 872 where the SAMPLE variable is shifted left a number of bits equal to 16 minus the value of the NUM_BITS variable. This process left justifies the subband sample in a 16-bit field.

The method proceeds to step 874 where a branch is made. If the block count (BLOCK_CNT) variable is equal to 0, the shifted sample is stored directly into the arithmetic unit buffer 30 in step 876. If the BLOCK_CNT variable is not equal to 0, the method proceeds to step 878 where the shifted sample is stored in the scratch RAM associated with the audio decoder block 28. The method proceeds from step 876 or from step 878 to a step 880 where a branch is made depending on the CH variable. If the CH variable is not equal to 1, the method proceeds to step 882 where the CH variable is set equal to 1. The method then proceeds to step 884 where the SBB variable is compared to the BOUND variable. If the SBB variable is less than the BOUND, the current subband is within the stereo range of a joint spectrum and the method returns to step 868 to retrieve the sample associated with the second channel. If the SBB variable is less than the BOUND variable in step 884, the method proceeds to step 886 where the shifted sample that was written to memory is copied to a second location in either the scratch RAM or the AU buffer 30 associated with the opposite channel. The method then proceeds from step 886 or step 880 to a step 888 where the CH variable is set equal to 0. The method then proceeds to step 890 where the SBB variable is incremented. The method then proceeds to step 892 where the SBB variable is compared to the value 32. If the SBB value is not greater than or equal to 32, the method returns to step 868. If at step 892, the SBB variable is greater than or equal to 32, the method proceeds to branch point A which continues on FIG. 24b.

Referring to FIG. 24b, the method resumes at step 894 where the BLOCK_CNT variable is incremented. The method proceeds to step 896 where a branch is made based on the BLOCK_CNT variable. If the BLOCK_CNT variable is equal to 1 after being incremented in step 894, the method proceeds to step 898 where the PTS flag is tested. If the PTS flag is set at step 898, the method proceeds to step 900 where the PTS interrupt is tested. If the PTS interrupt is enabled at step 900, the PTS tag is set at step 902. The method then proceeds to step 904 where the beginning of frame (BOF) tag is set. The PTS and BOF tags are used by the PCm output block 36 to set the BOF signal and PTS interrupt when the data is output on the PCM data pin. If the PTS flag was not set in step 898 or the PTS interrupt was not enabled in step 900, the method proceeds directly to step 904.

If the BLOCK_CNT was not equal to 1 in step 896, the method proceeds to step 906 where the method waits until the arithmetic unit buffer 30 is empty. Once the arithmetic unit buffer 30 has been emptied by the hardware filter arithmetic unit block 32, the method proceeds to step 908 where the samples stored in scratch RAM are transferred to the arithmetic unit buffer 30. The method proceeds to step 910 where the PTS and BOF tags are cleared. The method proceeds from step 904 or step 910 to step 912 where a flag is set indicating that the arithmetic unit buffer 30 is full. The method then proceeds to step 914 where the BLOCK_CNT is compared to a value of 12. If the BLOCK_CNT is less than or equal to 12, the method returns to step 866 discussed with reference to FIG. 24a previously. If the BLOCK_CNT is greater than 12 at step 914, the method concludes.

Layer 2 Scale Factor Index Decoding Process

Figure 25A:
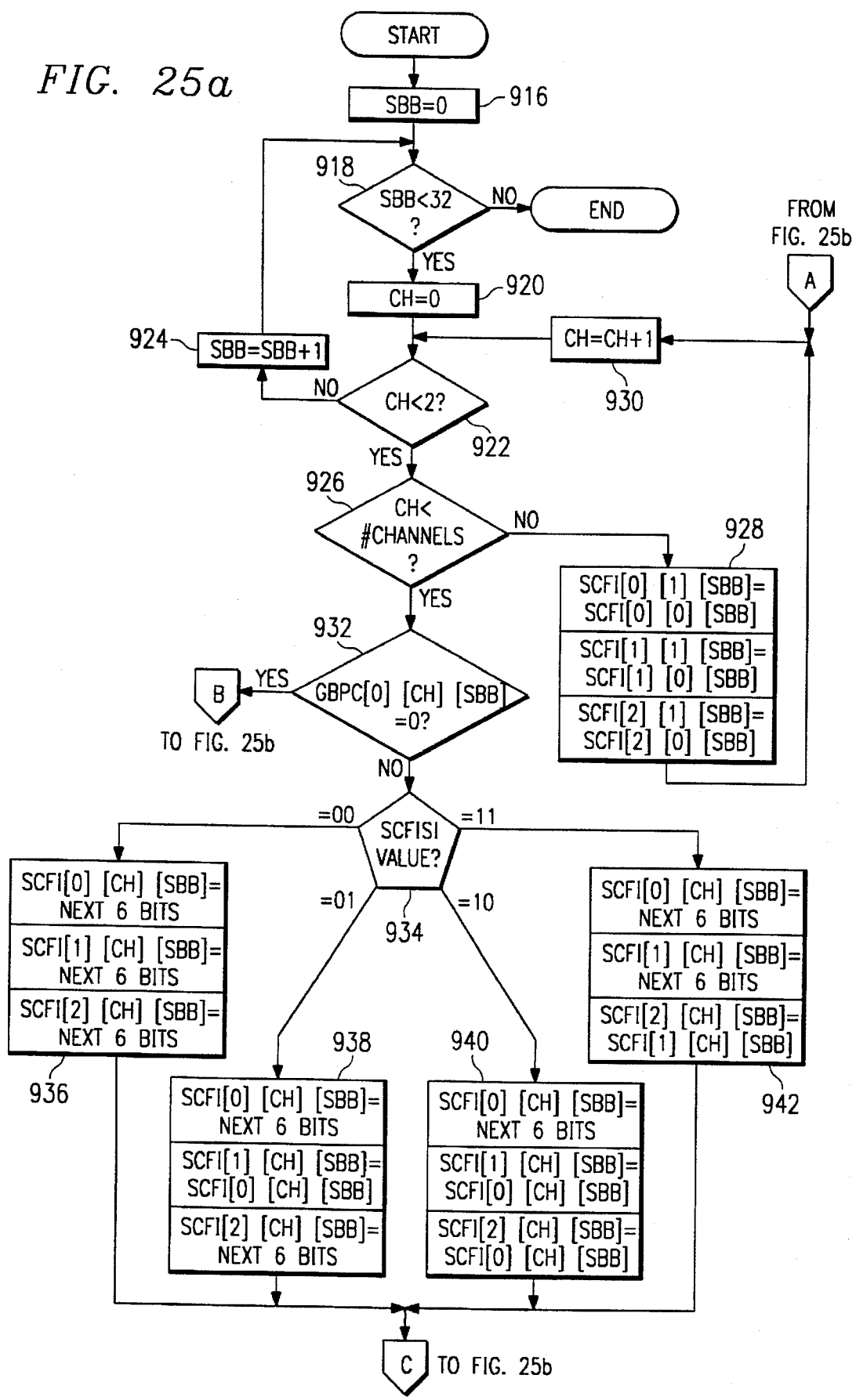
Figure 25B:
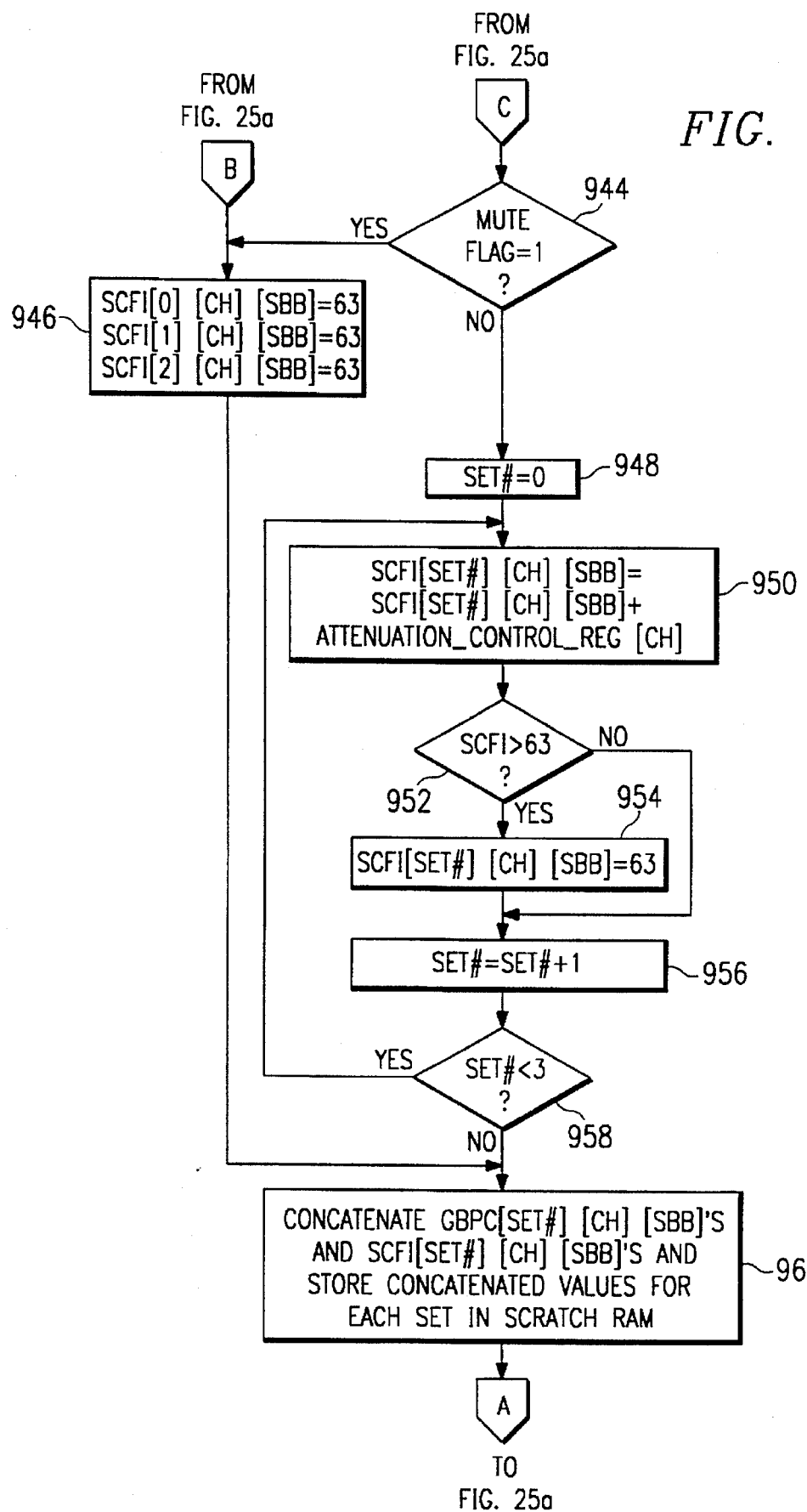

FIGS. 25a and 25b detail the method used by audio decoder block 28 to decode the scale factor index information for layer 2 MPEG audio data. The method begins at step 916 where the SBB variable is set equal to 0. The method then proceeds to step 918 where the SBB variable is compared to the number 32. If the SBB variable is not less than 32, the method concludes. If the SBB variable is less than 32, the method proceeds to step 920 where the CH variable is set equal to 0. The method then proceeds to step 922 where the CH variable is compared to 2. If the CH variable is not less than 2, the method proceeds to step 924 where the SBB variable is incremented. The method then returns to step 918. If the CH variable is less than 2, the method proceeds to step 926 where the CH variable is compared to the #CHANNELS variable. If the CH variable is not less than the #CHANNELS variable, it indicates that the data is monaural data and the method proceeds to step 928 where the scale factor index information for channel 0 is copied to form the scale factor index information for channel 1. As shown in step 928 of FIG. 25a, there is a scale factor index associated with each subband within each channel within each set of a block of audio data. The method proceeds from step 928 to step 930 where the CH variable is incremented. The method then returns to step 922.

If at step 926, the CH variable was less than the #CHANNELS, the method proceeds to step 932 where the GBPC value for set 0 of the present channel of the present subband is compared to 0. If the indicated GBPC value is equal to 0, the method proceeds to branch point B which re-enters the method in FIG. 25b. If the indicated GBPC value is not equal to 0, the method proceeds to a 4-way branch point 934 which branches based on the scale factor selection information which was retrieved with the method discussed with reference to FIG. 22 previously. As detailed previously, the scale factor selection information identifies which of the sets within a block of layer 2 audio data will share the same scale factor index values. A scale factor selection value of 00 indicates that each of the sets within a block will have independent scale factor index values. As such, the method proceeds to step 936 where three successive GBT instructions are executed to retrieve the scale factor index information for sets 0, 1, and 2 associated with the indicated channel and subband value. The 6-bit scale factor index values are stored in scratch RAM as they are retrieved from the bit stream. A scale factor selection information value of 01 causes the method to proceed from step 934 to step 938 where the next 6 bits are retrieved and stored as the scale factor index for set 0 of the given channel and given subband. The same 6 bits are then copied as the scale factor index for set 1 associated with the given channel and subband. The next 6 bits are then retrieved and stored as the scale factor index for set 2 of the indicated channel and subband.

A scale factor select information value of 10 indicates that all 3 sets will use the same scale factor index value. Accordingly, the method proceeds from step 934 to step 940 where the next 6 bits are retrieved from the bit stream and stored as the scale factor index in 3 locations corresponding to the scale factor index for sets 0, 1, and 2 associated with the indicated channel and subband value.

Finally, a scale factor selection information value of 11 indicates that the second and third sets will share scale factor index values and the first set will have a separate scale factor index value. Accordingly, the method proceeds from step 934 to step 942 where the next 6 bits are retrieved and stored as the scale factor index for set 0 of the associated channel and subband. The next 6 bits are then retrieved and stored in two locations corresponding to scale factor index value for set 1 and set 2 associated with the indicated channel and subband. The method proceeds from step 936, 938, 940, or 942 to a branch point C which re-enters the method on FIG. 25b.

Referring to FIG. 25b, the method proceeds from branch point C to step 944 where the MUTE flag is tested. If the MUTE flag is set, it indicates that the output for the current frame is to be muted. Accordingly, the method proceeds to step 946 where the scale factor index information for each of the sets 0, 1, and 2 associated with the indicated channel and subband is overwritten with the value 63. As discussed previously, a scale factor index value of 63 will cause a scale factor of 0 to be retrieved when processed by the hardware filter arithmetic unit block 32 to cause a muted output.

If the MUTE flag was not set in step 944, the method proceeds to step 948 where the set number variable is set equal to 0. The method then proceeds to step 950 where the scale factor index for the indicated set number, channel number and subband are added to the value of the attenuation control register for the indicated channel. This process is similar to the process discussed with reference to step 838 in FIG. 23. The attenuation control register value acts as a balance control to selectively attenuate either the right or left channel. By adding a number to the scale factor index value, the volume of the output for the given subband is ultimately reduced. Also as discussed previously, according to an alternate embodiment of the present invention, the attenuation control value can be programmed for each subband to enable a programmable 64-channel equalizer to be implemented in the digital domain.

The method proceeds from step 950 to step 952 which compares the attenuated scale factor index to the value 63. If the adjusted scale factor index is greater than 63, the method proceeds to step 954 where the number 63 is loaded as the scale factor index value for the given set number, channel number and subband value. If at step 952, the adjusted scale factor index value was not greater than 63 or following step 954, the method proceeds to step 956 where the set number is incremented. The method then proceeds to step 958 where the set number is compared to the value 3. If the set number is less than 3, the method returns to step 950 to perform the attenuation control on the next set. If the set number was not less than 3 in step 958 or directly from step 946, the method proceeds to step 960 where the scale factor index for a given set number, channel number and subband is concatenated with the GBPC value for that set number, channel number and subband. The concatenated value is then stored in the scratch RAM associated with audio decoder block 28. The method then proceeds to branch point A which returns to FIG. 25a and proceeds to step 930 discussed previously.

Layer 2 Subband Information Decoding Process

Figure 26A:
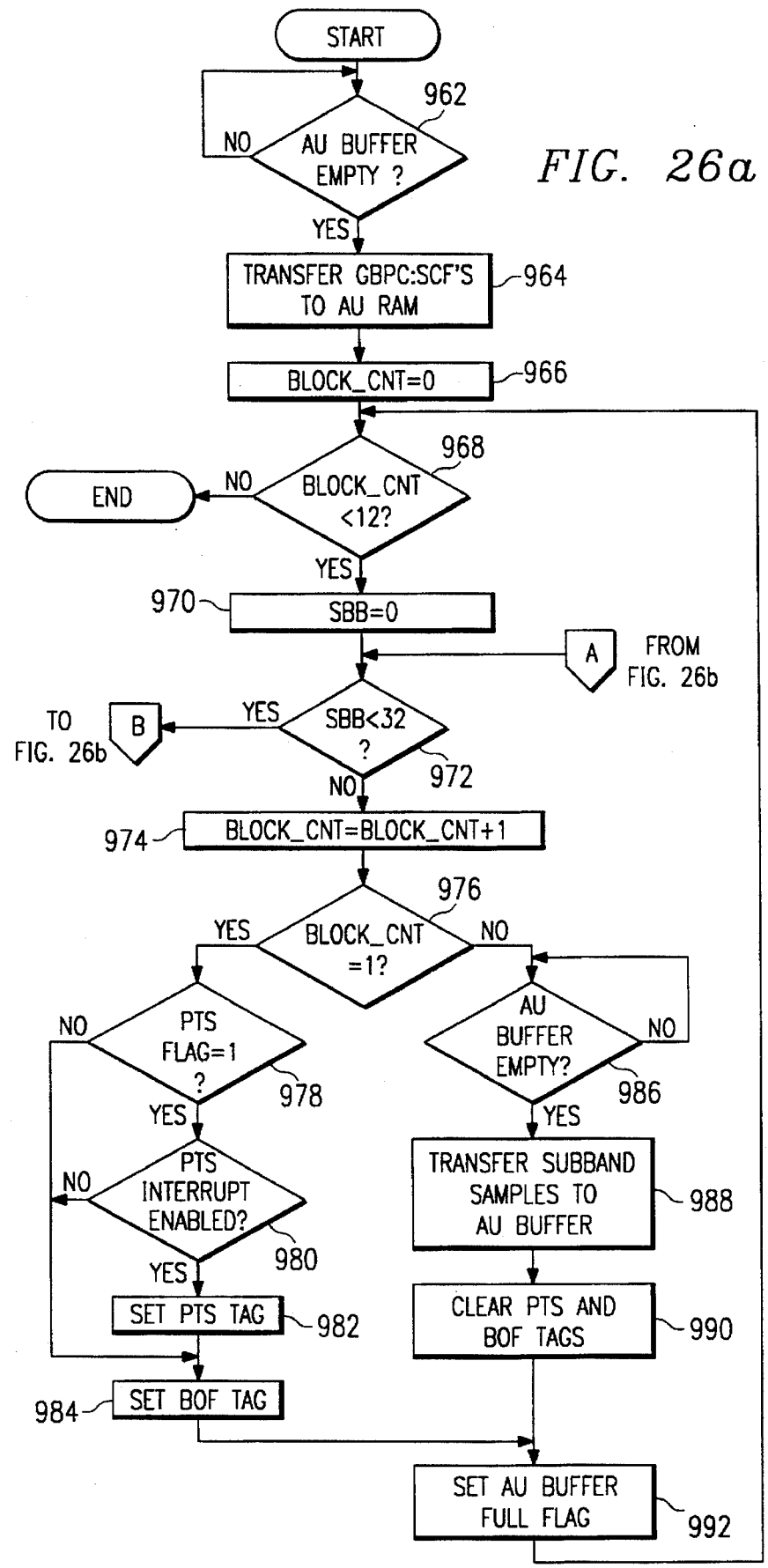

FIGS. 26a and 26b describe the method used by audio decoder block 28 to decode the subband information in layer 2 MPEG audio data. The method begins at step 962 where the audio decoder block 28 waits until the arithmetic unit buffer is emptied by the hardware filter arithmetic unit block 32. When the arithmetic unit buffer 30 is empty, the method proceeds to step 964 where the concatenated pairs of GBPC values and scale factor index values are transferred from the scratch RAM associated with audio decoder block 28 into the arithmetic unit buffer 30. The method proceeds to step 966 where a BLOCK_CNT variable is set equal to 0. The method then proceeds to step 968 where, if the BLOCK_CNT variable is not less than 12, the method concludes. If the BLOCK_CNT variable is less than 12, the method proceeds to step 970 where a SBB variable is set equal to 0. The method then proceeds to step 972 where the SBB variable is compared to 32. If the SBB variable is less than 32, the method proceeds to branch point B which resumes on FIG. 26b. If the SBB value is not less than 32, the method proceeds to step 974 where the BLOCK_CNT variable is incremented. The method then proceeds to step 976 where the incremented BLOCK CNT variable is compared to 1. If the BLOCK_CNT variable is equal to 1, the method proceeds to step 978 where the PTS flag is tested. If the PTS flag is set, the method proceeds to step 980 where a determination is made whether or not the PTS interrupt is enabled. If the PTS interrupt is enabled, the method proceeds to step 982 where the PTS flag is set. If the PTS flag is not set in step 978 or the PTS interrupt is not enabled in step 980 or directly from step 982, the method proceeds to step 984 where the BOF tag is set. The PTS and BOF tags are used by the PCm output block 36 to set the BOF signal and PTS interrupt when the data is output on the PCM data pin.

If at step 976 the BLOCK_CNT was not equal to 1, the method proceeds to step 986 where the audio decoder block 28 waits until the arithmetic unit buffer 30 is emptied by the hardware filter arithmetic unit block 32. When the arithmetic unit buffer 30 is empty, the method proceeds to step 988 where the subband samples are transferred from the scratch RAM 142 associated with audio decoder block 28 to the arithmetic unit buffer 30. The method proceeds to step 990 where the PTS and BOF tags are both cleared. The method proceeds from step 990 or from step 984 to step 992 where a flag indicating that the arithmetic unit buffer 30 is full is set. The method proceeds from step 992 and returns to step 968.

Referring to FIG. 26b, the method resumes from branch point B and proceeds to a step 994 where a CH variable is set equal to 0. The method proceeds to step 996 where the CH variable is compared to 2. If the CH variable is not less than 2, the method proceeds to step 998 where the SBB variable is incremented. The method then proceeds to branch point A which re-enters the method on FIG. 26a at step 972 discussed previously. If at step 996, the CH variable was less than 2, the method proceeds to step 1000 where the CH variable is compared to 1. If the CH variable is equal to 1, the method proceeds to step 1002 where the current value of the SBB variable is compared to the BOUND variable. If the SBB variable is less than the BOUND variable, the method proceeds to step 1004 where the most significant bit of the GBPC is compared to 1. A 1 in the most significant bit position of the GBPC indicates that the audio data is grouped. If the audio data is grouped, the method proceeds to step 1006 where group decoding is performed. The method used by the audio decoder 28 to perform group decoding will be discussed fully with reference to FIG. 27 herein.

If the most significant bit of the GBPC value indicates that the bit stream is not grouped, the method proceeds to step 1008 where the sample for the first set of the indicated channel and indicated subband are retrieved from the bit stream by performing a GBT instruction using the GBPC value for the indicated channel and subband to supply the number of bits to be retrieved by the GBT instruction. The method then proceeds to step 1010 where the retrieved bits are left justified by shifting the retrieved sample left by the difference between 16 and the GBPC value. The method then proceeds to step 1012 where the sample for the second set of the indicated channel and indicated subband is retrieved in the same manner as described with reference to step 1008 previously. The retrieved sample is then left justified in step 1014 by performing a left shift as discussed previously. The method then proceeds to step 1016 where the sample for the third set corresponding to the indicated channel and indicated subband is retrieved using the same method as used in steps 1008 and 1012 previously. The method then proceeds to step 1018 where the retrieved sample is left justified using a similar left shift operation.

If at step 1002, the SBB value was not less than the BOUND value, the indicated SBB value is in the monaural range of joint stereo and the method proceeds to step 1020 where the samples retrieved for channel 0 of the indicated SBB values for sets 0, 1, and 2 are copied to create the samples for channel 1 of the indicated SBB values for sets 0, 1 and 2. The samples created in step 1020 and created in steps 1010, 1014, and 1018 discussed previously are stored in the scratch RAM 142 associated with audio decoder block 28 until step 988 discussed previously with reference to FIG. 26a is reached, at which time the samples are transferred to the arithmetic unit buffer 30. The method proceeds from step 1020, 1006, and 1018 to step 1022 where the CH variable is incremented. The method proceeds from step 1022 to step 996 discussed previously.

Group Decoding Process

Figure 27:
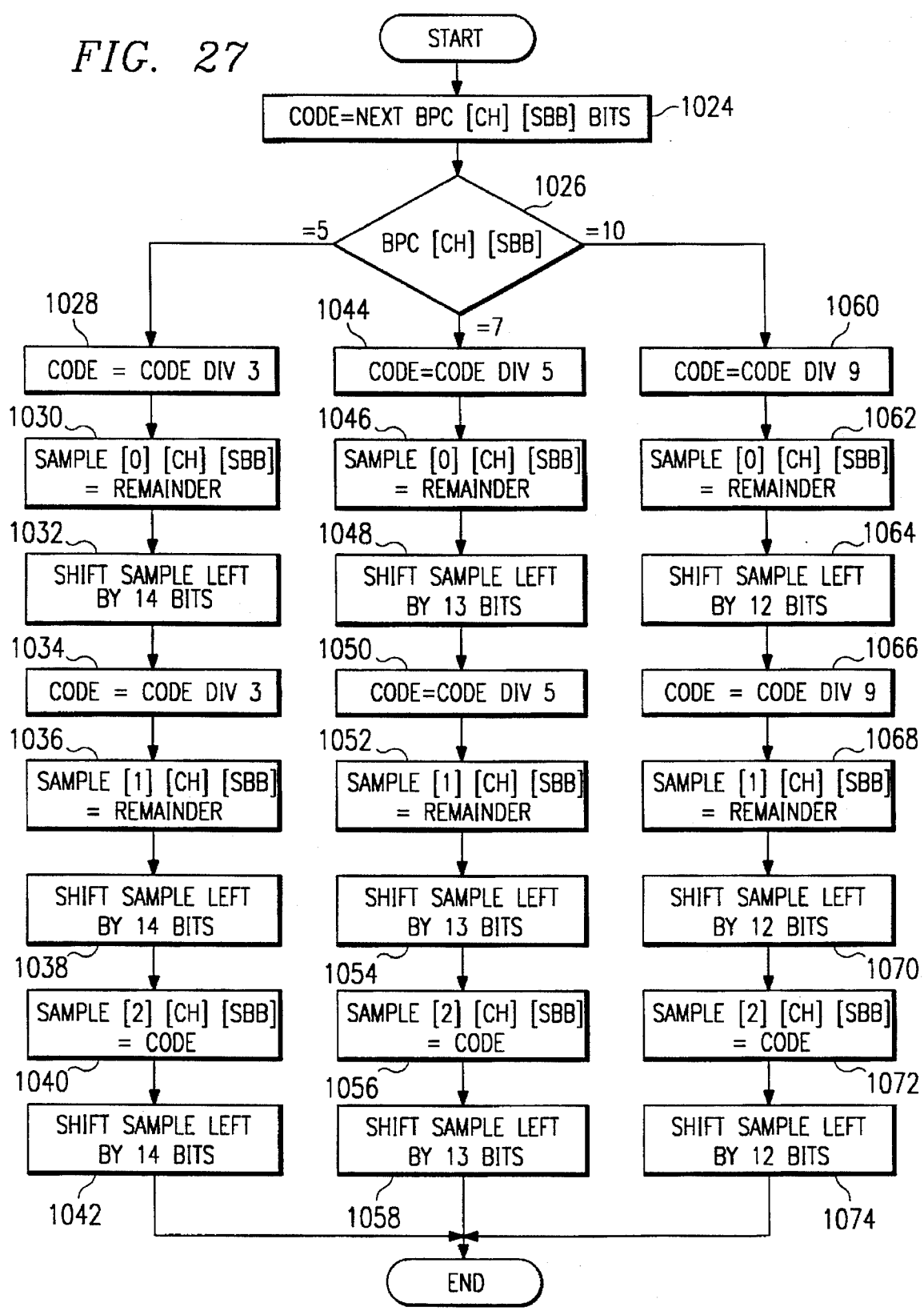

FIG. 27 illustrates the method used by the audio decoder block 28 for performing group decoding. Samples are group encoded when three successive samples for the same channel and subband are grouped together and coded using a single value of 5, 7, or 10 bits in length. The method illustrated in FIG. 27 retrieves the 5, 7, or 10-bit field and decodes the field to create the sample associated with set 0, set 1, and set 2 for the given channel and subband. The method begins at step 1024 where a GBT instruction is used to retrieve a number of bits from the bit stream equal to the BPC value for the current channel and subband. The BPC value is the five least significant bits of the GBPC value. These bits are loaded into a CODE variable. The method proceeds to step 1026 where the BPC value is once again used to direct a branch. If the BPC value is equal to 5, the method proceeds to step 1028 where the CODE variable is reset to equal the CODE variable divided by 3 using an integer divide operation. The quotient is once again saved as the new CODE variable. The remainder is saved from the integer divide operation and is stored as the sample associated with set 0 for the given channel and subband in step 1030. The sample is shifted left by 14 bits to left justify the sample in step 1032. The method proceeds to step 1034 where the new CODE variable is once again divided by 3 using an integer divide operation. The quotient is stored as the new CODE variable. The remainder from the integer divide operation comprises the sample for set 1 for the given channel and subband value as indicated in step 1036. The method proceeds to step 1038 where the next sample is once again left justified by shifting left 14 bit positions. The final value of the CODE variable is finally saved in step 1040 to comprise the sample for set 2 for the given channel and subband. The method proceeds to step 1042 where the final sample is shifted left by 14 bit positions to left justify the sample. The method concludes after step 1042.

If at step 1026 the BPC value for the given channel and subband was equal to 7, the method proceeds to step 1044 where the CODE variable is set equal to the CODE variable divided by 5 using an integer divide operation. The sample for set 0 for the given channel and subband is set equal to the remainder of the divide operation performed in step 1044 in step 1046. The sample is 1 left justified by shifting left 13 bit positions in step 1048. The CODE variable is once again divided by 5 in an integer divide operation in 1050. The quotient is stored as the new CODE variable. The method proceeds to step 1052 where the sample for set 1 for the given channel and subband is set equal to the remainder of the integer divide operation performed in step 1050. The method proceeds to step 1054 where the sample is once again left justified by shifting left 13 bit positions. The method then proceeds to step 1056 where the sample for set 2 for the given channel and subband is set equal to the final value of the CODE variable. The final sample is shifted left 13 bit positions to left justify the sample in step 1058. The method concludes after step 1058.

If at step 1026 the GBPC value for the given channel and subband was equal to 10, the method proceeds to step 1060 where the CODE variable is set equal to the CODE variable divided by 9 using an integer divide operation. The sample for set 0 for the given channel and subband is set equal to the remainder of the division operation in step 1062. This sample is left justified by shifting it left 12 bit positions in step 1064. The CODE variable is once again divided by 9 using an integer division operation in step 1066. The quotient is stored as the new CODE variable. The method proceeds to step 1068 where the sample for set 1 for the given channel and subband values is set equal to the remainder of the, division operation performed in step 1066. The method proceeds to step 1070 where the sample is left justified by shifting it left 12 bit positions. The method then proceeds to step 1072 where the final value of the CODE variable supplies the value for the sample for set 2 for the given channel and subband value. The final sample is shifted left 12 bit positions to left justify the sample in step 1074. The method concludes following step 1074. The samples generated by the group decoding method illustrated in FIG. 27 are stored in the scratch RAM associated with audio decoder block 28 until they are transferred to the arithmetic unit buffer 30 in step 988 described with reference to FIG. 26a previously.

Buffer Management Process

Figure 28A:
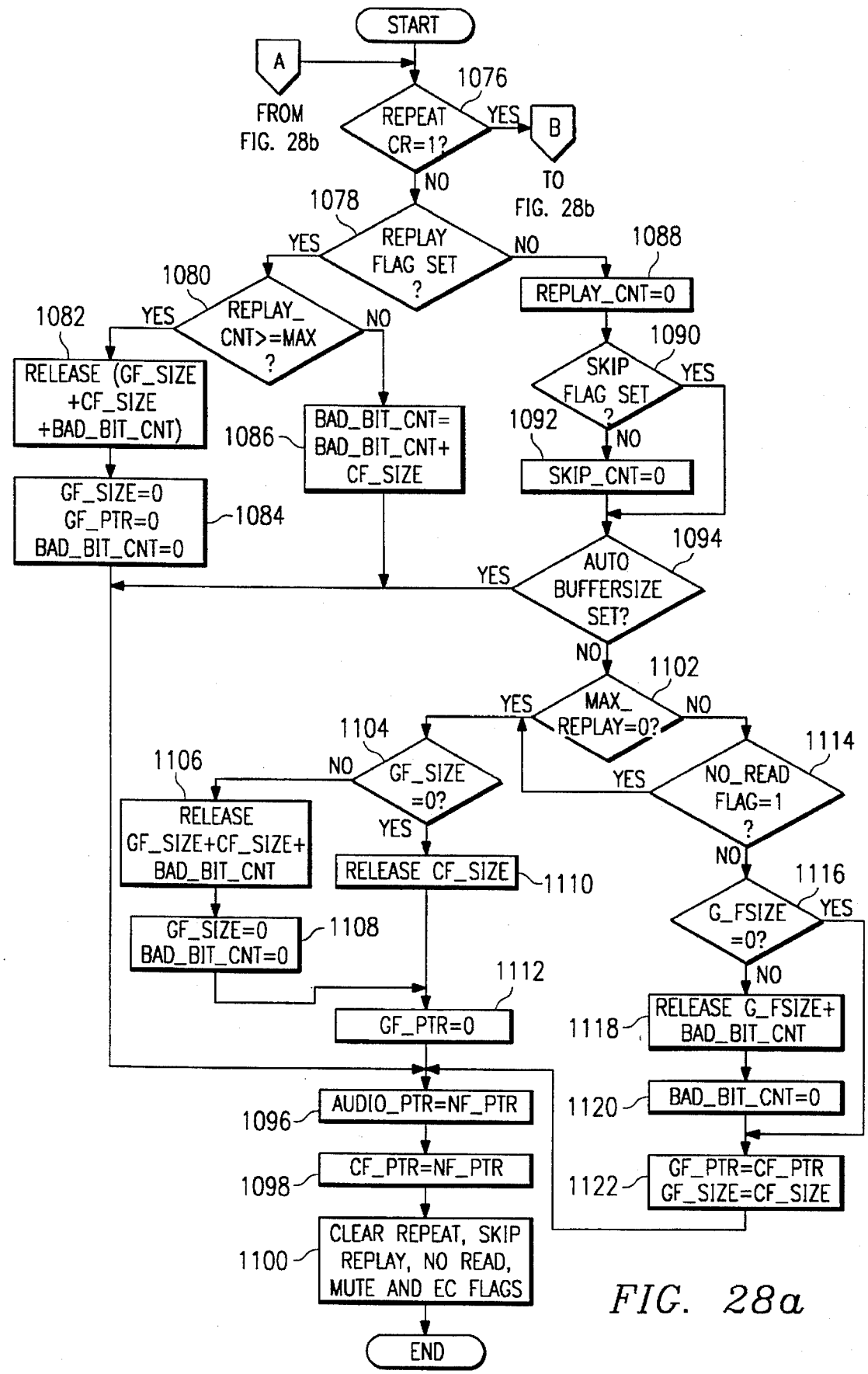
Figure 28B:
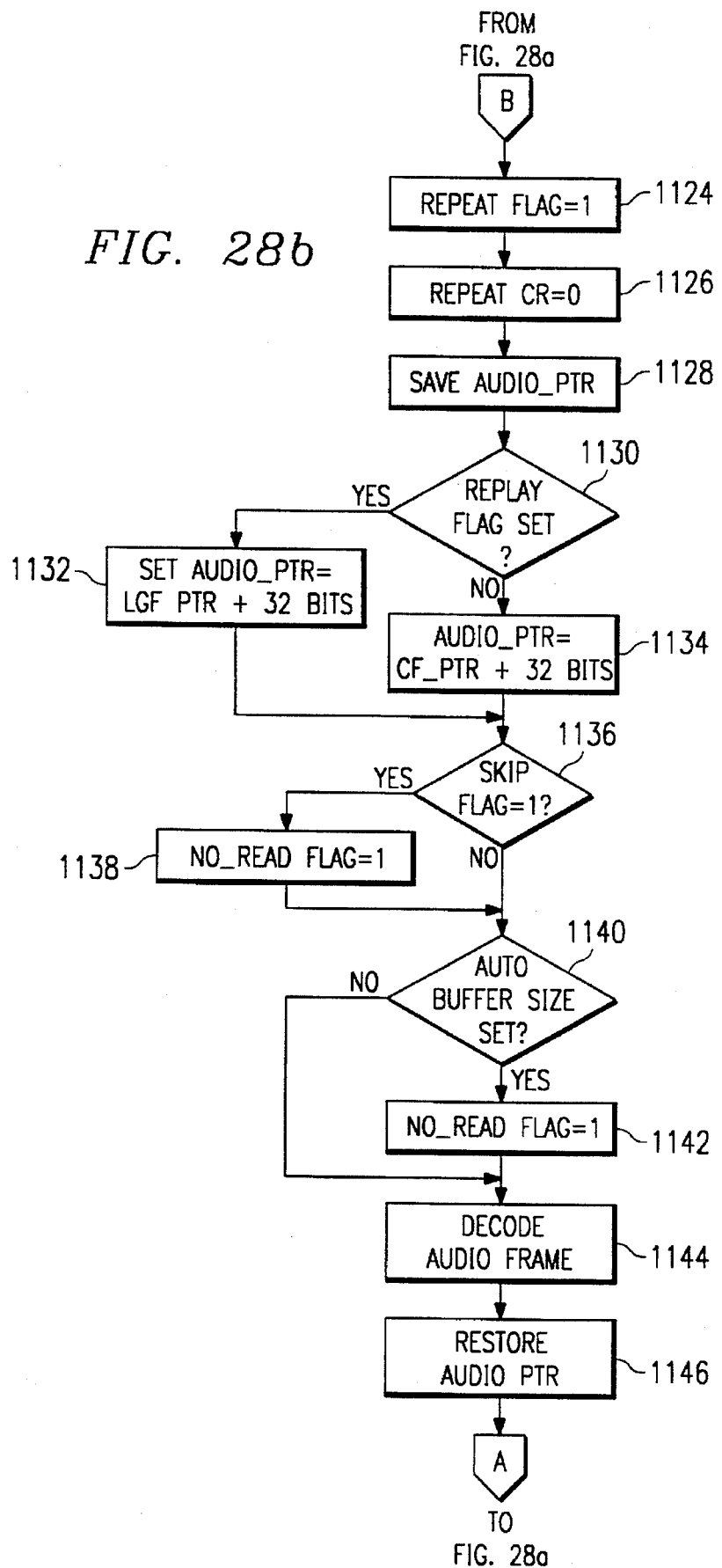

The method used by audio decoder block 28 to perform buffer management with respect to the input buffer 24 and the external buffer 26 is illustrated in FIGS. 28a and 28b. The method begins at step 1076 where the REPEAT control register is tested. The REPEAT control register can be set by the microprocessor host 12 to inform the audio decoder block 28 that there is a synchronization error and that the audio decoder block is too far ahead in the bit stream and needs to repeat a frame to aid in regaining synchronization. If the REPEAT control register is set, the method branches to branch point B which will resume on FIG. 28b. If the REPEAT control register is not set, the method proceeds to step 1078 where the REPLAY flag is tested. If the REPLAY flag is set, the method proceeds to step 1080 where the REPLAY_CNT is compared to the maximum replay count allowed. If the REPLAY_CNT is greater than or equal to the maximum allowed, the method proceeds to step 1082 where a number of bits equal to the sum of the GF_SIZE, the CF_SIZE and the BAD_BIT_CNT are released in the input buffer 24 or the external buffer 26. The method then proceeds to step 1084 where the GF_SIZE is set equal to 0, the good frame pointer (GF_PTR) is set equal to 0, and the BAD_BIT_CNT is set equal to 0.

If at step 1080 the REPLAY_CNT was less than the maximum allowed replay count, the method proceeds from step 1080 to step 1086 where the BAD_BIT_CNT is updated to be equal to the old BAD_BIT_CNT plus the current frame size.

If at step 1078 the REPLAY flag was not set, the method proceeds to step 1088 where the REPLAY_CNT variable was set equal to 0. The method then proceeds to step 1090 where the SKIP flag is tested. If the SKIP flag is not set, the SKIP_CNT variable is set equal to 1092. If the SKIP flag is set in step 1090 or directly from step 1092, the method proceeds to step 1094 where the AUTO_BUFFER_SIZE flag is checked. If the AUTO_BUFFER_SIZE feature is enabled in step 1094, the method proceeds to step 1096 where the AUDIO_PTR is set equal to the NF_PTR. The method also proceeds from steps 1084 and 1086 to step 1096. The method proceeds from step 1096 to step 1098 where the current frame point is set equal to the CF_PTR. The method concludes at step 1100 where the REPEAT, SKIP, REPLAY, NO_READ, MUTE and EC flags are cleared.

If the AUTO_BUFFER_SIZE flag was not set in step 1094, the method proceeds to step 1102 where the MAX_

REPLAY value is compared to zero. If the MAX_REPLAY value is equal to zero, the method proceeds to step 1104 where the GF_SIZE variable is checked. If the GF_SIZE is not equal to 0, the method proceeds to step 1106 where a number of bits equal to the GF_SIZE plus the CF_SIZE plus the BAD_BIT_CNT are released in input buffer 24 or external buffer 26. The method proceeds from step 1106 to step 1108 where the GF_SIZE is set equal to 0 and the BAD_BIT_CNT is set equal to 0. The method then proceeds to step 1112 where GF_SIZE is set equal to 0. The method proceeds from step 1112 to step 1096 discussed previously.

If at step 1104 the GF_SIZE was equal to 0, the method proceeds to step 1110 where a number of bits equal to the current frame size are released in input buffer 24 or external buffer 26. The method proceeds to step 1112 discussed previously.

If the MAX_REPLAY value was not equal to zero in step 1102, the method proceeds to step 1114 where the NO_READ flag is tested. If the NO_READ flag is set, the method returns to step 1104 discussed previously. If the NO_READ flag was not set in step 1114, the method proceeds to step 1116 where the GF_SIZE is tested. If the GF_SIZE is not equal to 0, the method proceeds to step 1118 where a number of bits equal to the GF_SIZE plus the BAD_BIT_CNT is released in input buffer 24 or external buffer 26. The method then proceeds to step 1120 where the BAD_BIT_CNT variable is set equal to 0. If in step 1116, the GF_SIZE was equal to 0 or directly from step 1120, the method proceeds to step 1122 where the GF_PTR is set equal to the current frame pointer and the GF_SIZE variable is set equal to the current frame size. The method proceeds from step 1122 to step 1096 discussed previously.

Referring to FIG. 28b, the method proceeds from branch point B to step 1124 where the REPEAT flag is set equal to 1. The method then proceeds to step 1126 where the REPEAT control register is set equal to 0. The method then proceeds to step 1128 where the AUDIO_PTR value is saved. The method then proceeds to step 1130 where the REPLAY flag is tested. If the REPLAY flag is set, the method proceeds to step 1132 where the AUDIO_PTR is set equal to the LGF_PTR plus 32 bits. If the REPLAY flag was not set in step 1130, the method proceeds to step 1134 where the AUDIO_PTR is set equal to the current frame pointer plus 32 bits. The method proceeds from either step 1132 or 1134 to step 1136 where the SKIP flag is tested. If the SKIP flag is set, the method proceeds to step 1138 where the NO_READ flag is set equal to 1. If the SKIP flag was not set in step 1136 or directly from step 1138, the method proceeds to step 1140 where the audio buffer size register is tested. If the audio buffer size feature is enabled, the method proceeds to step 1142 where the NO_READ flag is set equal to 1. If the audio buffer size feature was not enabled in step 1140 or directly from step 1142, the method proceeds to step 1144 where the audio frame is decoded. The methods used to decode the audio frame were discussed with reference to FIGS. 18a and 18b previously. The method proceeds from step 1144 to step 1146 where the saved value for the AUDIO_PTR is restored. The method then proceeds to branch point A which re-enters the method in FIG. 28a at step 1076.

General Decoding Operation

Figure 29:
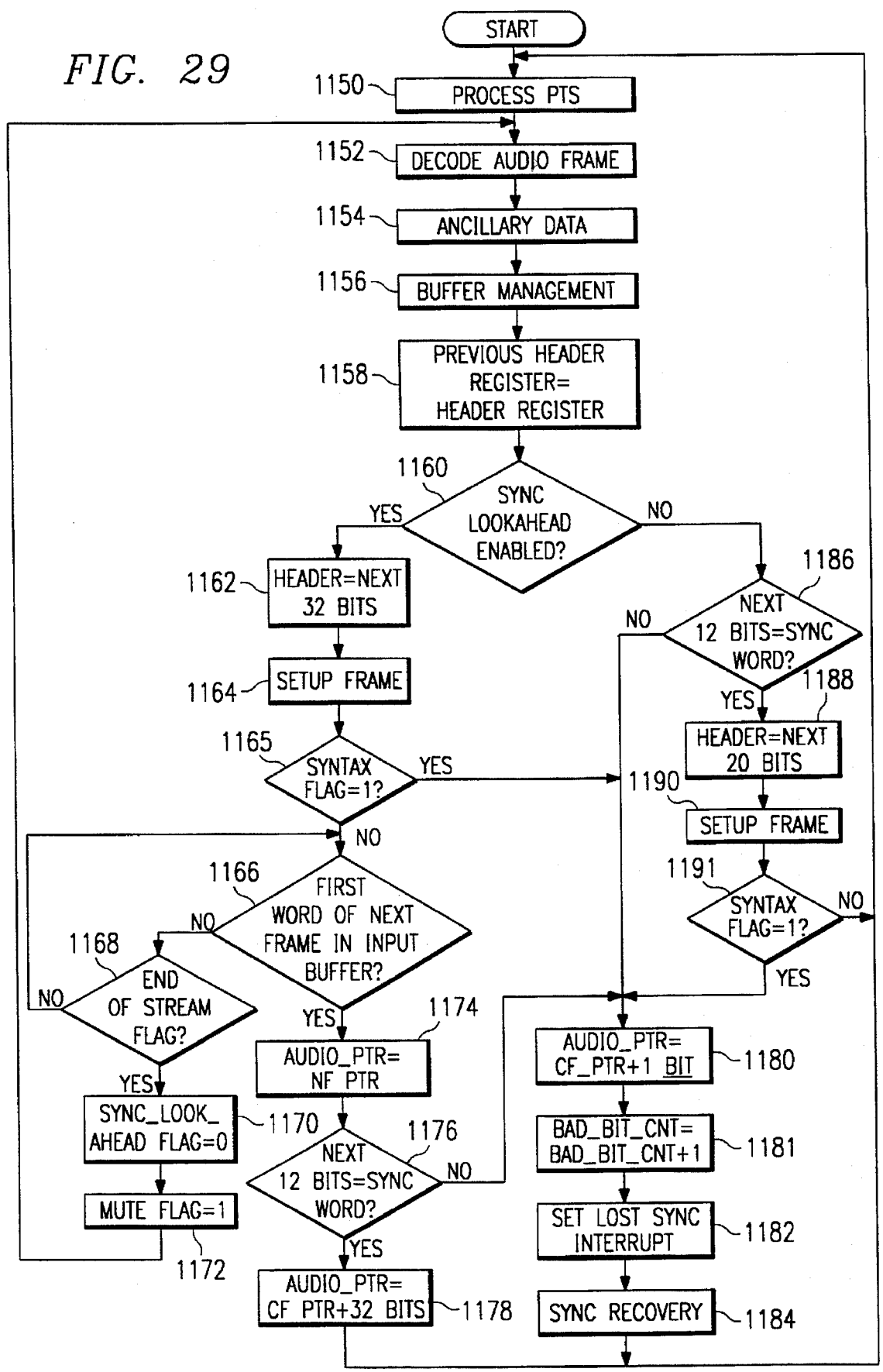

FIG. 29 illustrates the general decoding operation that the audio decoder block 28 performs. The method begins at step 1150 where the audio decoder block 28 processes the presentation time stamp (PTS) information. The method used to process the PTS data will be discussed with reference to FIG. 30 herein. The method proceeds from step 1150 to step 1152 where the audio decoder block decodes the audio frame. The method used by the audio decoder block 28 to decode the audio frame was discussed with reference to FIGS. 18a and 18b previously. The method then proceeds to step 1154 where the audio decoder block 28 processes any ancillary data that might be present. The method used to process ancillary data will be discussed with reference to FIG. 31 herein. The method then proceeds to step 1156 where the audio decoder block 28 performs buffer management. The method used to perform buffer management was discussed with reference to FIGS. 28a and 28b previously. The method continues to step 1158 where the previous HEADER register is loaded with the value from the HEADER register. The method then proceeds to step 1160 where a determination is made as to whether or not the SYNC_LOOKAHEAD feature has been enabled. If SYNC_LOOKAHEAD has been enabled, the method proceeds to step 1162 where the HEADER register is loaded with the next 32 bits within the bit stream. The method then proceeds to step 1164 where the audio decoder sets up the frame for decoding. The method used to set up the frame was discussed with reference to FIGS. 15a and 15b previously. The method proceeds from step 1164 to step 1165 where a test of the syntax flag is made. If the syntax flag is 1, the method proceeds to step 1180, discussed later. If the syntax flag is 0, the method proceeds to step 1166 where a determination is made whether or not the first word of the next frame is present in input buffer 24 or external buffer 26. If the first word of the next frame is not present in the input buffer, the method proceeds to step 1168 where the END_OF_STREAM flag is checked. If the END_OF_STREAM flag is not set, the method returns to step 1166. If the END_OF_STREAM flag is set, the method proceeds to step 1170 where the SYNC_LOOKAHEAD flag is cleared. The method then proceeds to step 1172 where the MUTE flag is set equal to 1. The method then returns to step 1152.

If at step 1166 the first word of the next frame was present in the input buffer, the method proceeds to step 1174 where the AUDIO_PTR is set to the value of the NF_PTR. The method then proceeds to step 1176 where the next 12 bits in the bit stream are checked to see if they contain a synchronization word. If the next 12 bits do contain a synchronization word, the method proceeds to step 1178 where the AUDIO_PTR is reset the value of the CF_PTR plus 32 bits. The method then returns to step 1150. If the next 12 bits did not contain a synchronization word, the method proceeds from step 1176 to step 1180 where the AUDIO_PTR is reset to a value equal to the CF_PTR plus 1 bit. In step 1181, the BAD_BIT_CNT is incremented by 1. Steps 1180 and 1181 are reached if the SYNC_LOOKAHEAD feature was enabled and the SYNC_LOOKAHEAD function failed. The method must, therefore, proceed from step 1180 through step 1181 to step 1182 where the LOST_SYNC interrupt is set. The method then proceeds to step 1184 where the audio decoder block 28 performs synchronization recovery. The synchronization recovery procedure discussed with reference to FIGS. 14a and 14b previously.

Similarly, at step 1160, if the SYNC_LOOKAHEAD feature was not enabled, the method proceeds to step 1186 where the next 12 bits are checked to see if they contain a synchronization word. If the next 12 bits do not contain a synchronization word, the method again proceeds to step 1180 to reset the AUDIO_PTR to the current frame pointer plus 1 bit. If at step 1186, the next 12 bits did contain a synchronization word, the method proceeds to step 1188 where the HEADER register is loaded with the next 20 bits. The method then proceeds to step 1190 where the set-up frame operation is performed as described with reference to FIGS. 15a and 15b previously. The method proceeds to step 1191 where the syntax flag is checked. If the syntax flag is set, the method proceeds to step 1180. Otherwise, the method continues at step 1150.

Presentation Time Stamp Decoding Process

Figure 30:
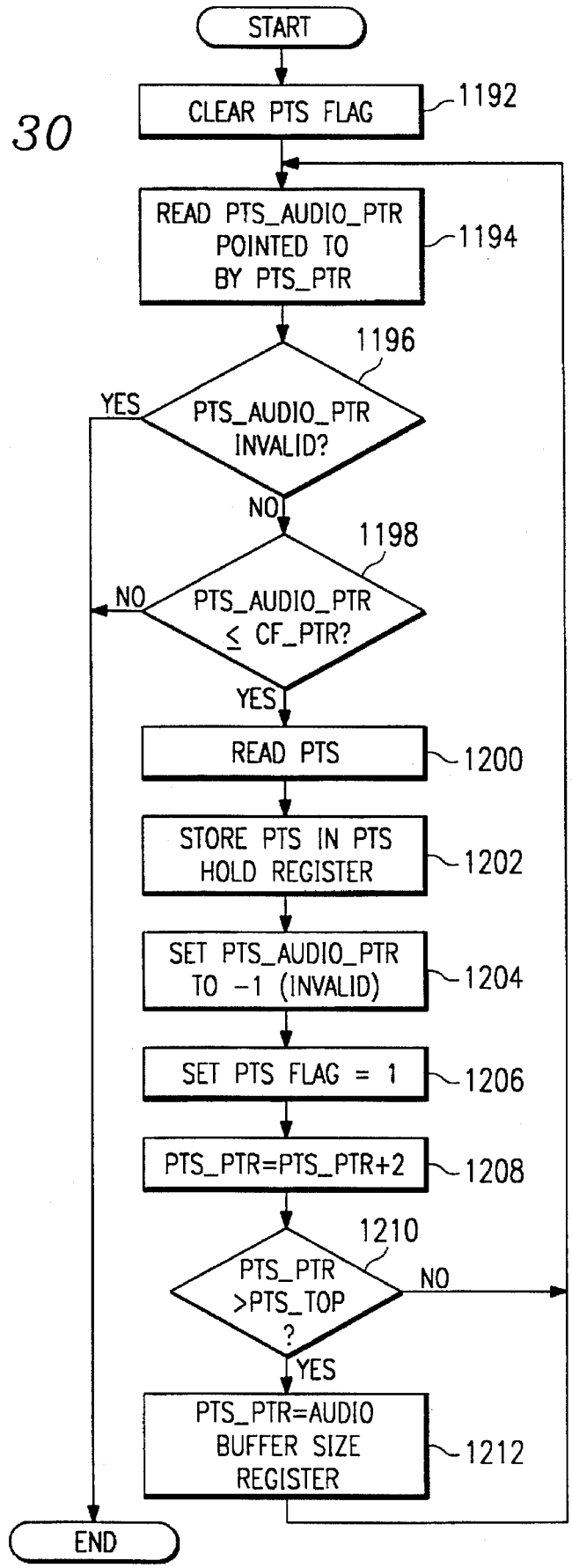

FIG. 30 illustrates the method used by the audio decoder block 28 to process presentation time stamps. The method begins at step 1192 where the PTS flag is cleared. The method proceeds to step 1194 where a value is read from an address pointed to by the PTS_PTR variable and is stored as the presentation time stamp audio pointer (PTS_AUDIO_PTR). The method proceeds from step 1194 to step 1196 where the PTS_AUDIO_PTR value is checked to see if it is invalid which is indicated by a 1 in the most significant bit position. If the PTS_AUDIO_PTR is invalid, the method concludes. If the PTS_AUDIO_PTR is a valid address, the method proceeds to step 1198 where the PTS_AUDIO_PTR is compared to the value of the CF_PTR. If the PTS_AUDIO_PTR is greater than the CF_PTR, the audio decoder block 28 has not yet reached the PTS and so the method concludes. If the PTS_AUDIO_PTR is less than or equal to the CF_PTR, the audio decoder block 28 has reached or has passed the relevant data associated with the PTS and therefore the PTS is read in step 1200. The method proceeds from step 1200 to step 1202 where the PTS is stored in the PTS hold register within the special registers associated with audio decoder block 28. The PTS will remain in the PTS hold register until the frame associated with the PTS reaches the PCM output block 36 at which time the PTS will be transferred from the PTS hold register to the PTS register within control status register block 22. The method proceeds from step 1202 to step 1204 where the PTS audio pointer is set to a −1 which has a 1 in the most significant bit position. This value is an invalid value and will cause the method to conclude at step 1196. The method proceeds to step 1206 where the PTS flag is set to 1. The method proceeds to step 1208 where the PTS_PTR is incremented by 2. The method then proceeds to step 1210 where the new PTS_PTR value is compared to the value for the PTS top. If the PTS_PTR has not yet reached the top value for the PTS, the method returns to step 1194 directly. If the PTS_PTR is greater than the PTS top, at step 1212 the PTS_PTR is reset to be equal to the value stored in the AUDIO_BUFFER_SIZE register. The method returns from step 1212 to step 1194.

Ancillary Data Handling Process

Figure 31:
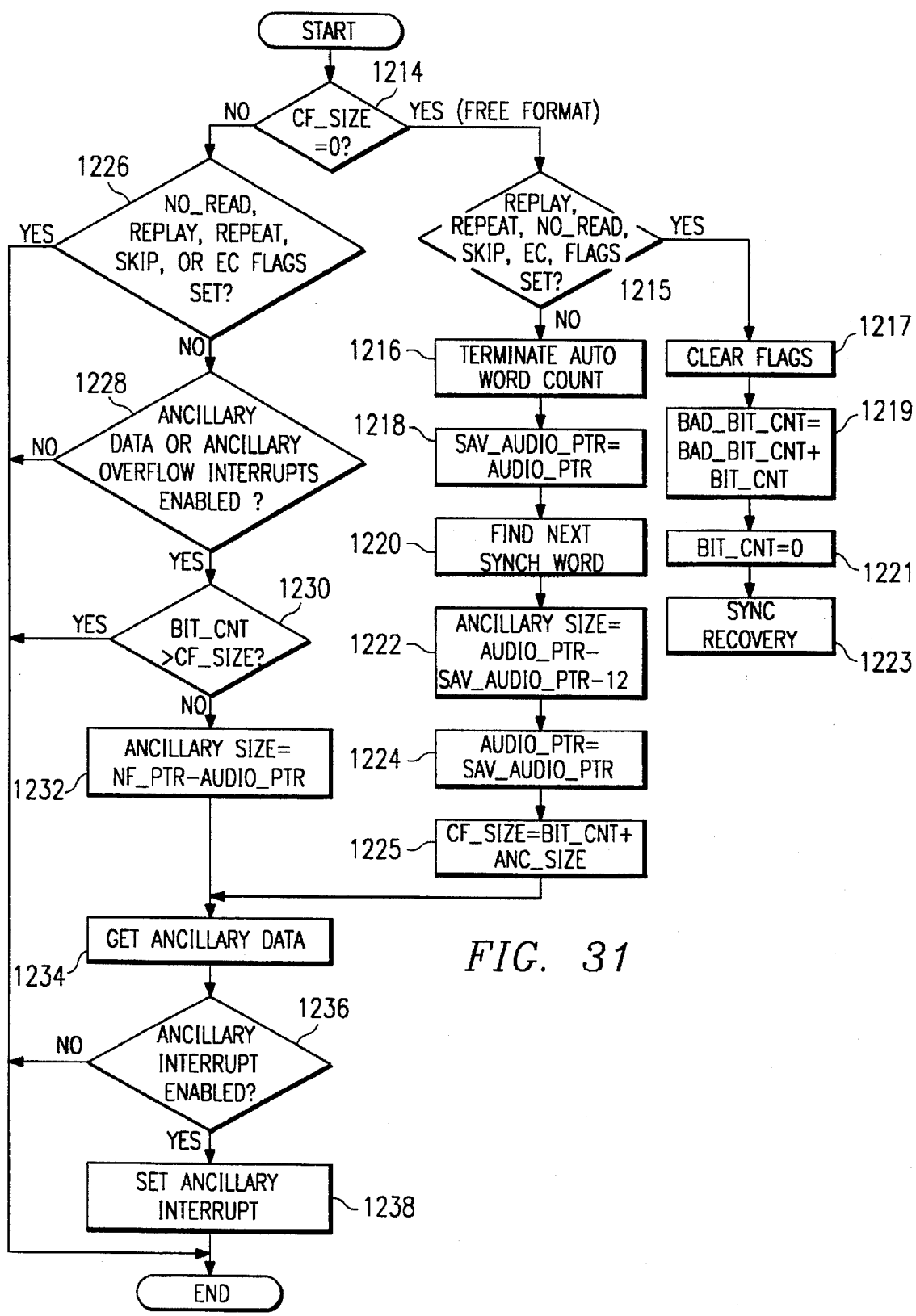

FIG. 31 illustrates the methods used by audio decoder block 28 to decode and process ancillary data that may be present in the bit stream. The method begins at step 1214 where the CF_SIZE is compared to 0. If the CF_SIZE is equal to 0, it indicates that the bit stream is in free format and the method proceeds to step 1215 where the REPLAY, REPEAT, NO_READ, SKIP, and EC flags are checked. If none of these flags is set, the method proceeds to step 1216 where the auto word count feature is terminated. The method then proceeds to step 1218 where the AUDIO_PTR is saved in a variable identified as SAVED AUDIO_PTR. The method then proceeds to step 1220 where a GSYN instruction is executed until the next synchronization word is located. The method then proceeds to step 1222 where an ANC_SIZE variable is set equal to 12 less than the difference between the AUDIO_PTR and the SAVED AUDIO_PTR. The method then proceeds to step 1224 where the AUDIO_PTR is reset to the value stored in the SAVED AUDIO_PTR. At step 1225, the CF_SIZE is set equal to the BIT_COUNT plus the ANC_SIZE. The system is then ready to retrieve the ancillary data using a GET ANCILLARY instruction based on the ANC_SIZE variable.

If any of the REPEAT, REPLAY, NO_READ, SKIP or EC flags was set in step 1215, the method proceeds to step 1217 where the flags are cleared. The method then proceeds to step 1219 where BAD_BIT_CNT is incremented by BIT_COUNT. The method proceeds to step 1221 where BIT_COUNT is set equal to 0. The method then proceeds to the synchrohization recovery process described previously with reference to FIGS. 14a and 14b.

If at step 1214 the CF_SIZE was not equal to 0, the method proceeds to step 1226 where the NO_READ, REPLAY, REPEAT, SKIP and EC flags are tested. If any of these flags is set, the method terminates. If none of these flags are set, the method proceeds to step 1228 where the method checks the ancillary data and the ancillary overflow interrupts. If neither of these interrupts are enabled, the method terminates. If either of the interrupts are enabled, the method proceeds to step 1230 where the bit count is compared to the CF_SIZE. If the bit count is greater than the CF_SIZE, the method terminates. If the bit count is less than or equal to the CF_SIZE, the method proceeds to step 1232 where the ANC_SIZE variable is set equal to the NF_PTR minus the AUDIO_PTR. The method then proceeds to step 1234 where a GET ANCILLARY (GANC) data instruction is used to retrieve the ancillary data from the bit stream based on the ANC_SIZE variable. The method also proceeds to step 1234 from step 1224 discussed previously. The method proceeds from step 1234 to step 1236 where the ancillary interrupt is tested. If the ancillary interrupt was not enabled, the method concludes. If the ancillary interrupt was enabled, the method proceeds to step 1238 where the ancillary interrupt is set.

The handling of ancillary data is controlled by the contents of the ancillary register and the ancillary available register and interrupt 6 and 7. If interrupt 6 or 7 is enabled, incoming ancillary data is placed in the ancillary register. As discussed previously, the ancillary register functions as a FIFO holding the last 32 bits of ancillary data. If interrupt 7 is masked, the oldest data is replaced with new data on a bit-by-bit basis. If interrupt 7 is enabled, an interrupt is generated by system 14 when the ancillary register is full. If the interrupt is generated, further processing of audio data is halted until the microprocessor host 12 either reads the data or masks the interrupt.

The ancillary available register always holds the number of bits available in the ancillary register. Interrupt 6 is generated when either 16 or 32 bits of ancillary data are available in the ancillary register or the end of a frame is reached. Before reading the ancillary register, the microprocessor host 12 reads the ancillary available register to determine the number of valid ancillary data bits available. When the microprocessor host 12 reads the ancillary available register, the contents of the ancillary register are transferred to a temporary register. The microprocessor host may read the ancillary data from the temporary register by accessing the ancillary register addresses. Accordingly, the ancillary data is made available to the microprocessor host 12 without conflict with any additional ancillary data that might be loaded into the ancillary register during the reading process.

Although the present invention has been described in detail, it should be understood that various changes, substitution and alterations may be made to the embodiments described herein without departing from the spirit and scope of the invention as solely defined by the appended claims.

What is claimed is:

1. A data processing system for receiving and processing a bit sequence, comprising:

first in first out (FIFO) register circuitry operable to receive and store the data bits of the received bit sequence in words each comprising a plurality of data bits of the received bit sequence;

shifter circuitry coupled to said FIFO register circuitry and operable to receive said words and to serially output bits within said received words;

detector circuitry coupled to said shifter circuitry and operable to receive said bits output from said shifter circuitry and operable to detect predetermined bit patterns encoded in the bit sequence, said detector circuitry further operable to output in parallel selected groups of bits detected within the bit sequence;

control logic circuitry coupled to said shifter circuitry and said detector circuitry and operable to direct the operation of said shifter and detector circuitries; and buffer interface circuitry coupled to said detector circuitry and operable to receive said selected groups of bits output by said detector circuitry.

2. The data processing system of claim 1 and further comprising shift counter circuitry coupled to said shifter and said control logic circuitries and operable to store a shift count value and operable to alter said shift count value as said shifter circuitry serially outputs bits to said detector circuitry.

3. The data processing system of claim 2 wherein said control logic circuitry is operable to load a predetermined shift count value into said shift counter circuitry and wherein said shift counter circuitry is operable to decrement said shift count value as each bit is output to said detector circuitry such that said control logic circuitry is able to specify a length of a particular bit sequence to be loaded into said detector circuitry using said predetermined shift count value.

4. The data processing system of claim 1 wherein the bit sequence received by the system comprises a bit sequence encoded using MPEG standard syntax and wherein said control logic is operable to receive information indicating the encoding layer of the bit sequence being received by the system.

5. The data processing system of claim 1 wherein said control logic circuitry and said detector circuitry are operable to detect a start code within the bit sequence indicating the beginning of a packet of encoded data.

6. The data processing system of claim 1 wherein the bit sequence comprises a time multiplexed serial bit stream containing a plurality of different bit streams divided into bit packets and time multiplexed together to form the bit sequence, said control logic circuitry operable to receive information indicating which of the plurality of bit streams is to be decoded, said control logic circuitry and said detector circuitry operable to detect and retrieve the packets comprising the indicated bit stream from the time multiplexed serial bit stream.

7. The data processing system of claim 1 wherein said control logic circuitry and said detector circuitry are operable to detect presentation time stamps within the bit sequence.

8. The data processing system of claim 1 wherein said control logic circuitry and said detector circuitry are operable to detect end of stream codes within the bit sequence indicating the end of a portion of the bit stream to be decoded, the system further comprising temporary bit storage circuitry coupled to said detector circuitry and operable to receive and store incomplete groups of bits from the bit stream interrupted by one of said end of stream codes until the remainder of said incomplete group of bits can be retrieved from the bit sequence and concatenated with said incomplete group of bits.

9. The data processing system of claim 1 and further comprising:

an end of stream register coupled to said control logic circuitry and said detector circuitry and operable to receive information indicating the end of a portion of the bit stream to be decoded; and temporary bit storage circuitry coupled to said detector circuitry and operable to receive and store incomplete groups of bits from the bit stream interrupted by said information indicating the end of a portion of the bit stream to be decoded until the remainder of said incomplete group of bits can be retrieved from the bit sequence and concatenated with said incomplete group of bits.

10. The data processing system of claim 1 and further comprising:

buffer circuitry coupled to said buffer interface circuitry and operable to store bits received from the buffer interface circuitry;

first address counter circuitry operable to generate a first address value indicating where in said buffer circuitry the bits output to said buffer circuitry from said buffer interface circuitry are to be stored.

11. The data processing system of claim 10 wherein the bit sequence contains presentation time stamp codes and wherein said control logic circuitry and said detector circuitry are operable to detect said presentation time stamp codes associated with the portion of the bit sequence being retrieved from the bit sequence, the system further comprising presentation time stamp address circuitry operable to generate a presentation time stamp address value indicating where in said buffer circuitry a detected and retrieved presentation time stamp code to be output to said buffer circuitry from said buffer interface circuitry is to be stored.

12. The data processing system of claim 1 wherein the processing system is operable to identify and process bit sequences encoded using any encoding syntax selected from the group consisting of a full MPEG syntax multiplexed system stream, a stream consisting of MPEG syntax audio packets, a stream consisting of MPEG syntax audio frames and a stream consisting of uncompressed pulse code modulated audio data.

13. The data processing system of claim 1 wherein the processing system is operable to identify and process at least two bit sequence syntaxes of the group of possible bit sequence syntaxes consisting of a full MPEG syntax multiplexed system stream, a stream consisting of MPEG syntax audio packets, a stream consisting of MPEG syntax audio frames and a stream consisting of uncompressed pulse code modulated audio data.

14. A data processing system for receiving and processing a bit sequence encoded using MPEG standard syntax, comprising:

first in first out (FIFO) register circuitry operable to receive and store the data bits of the received bit sequence in words each comprising a plurality of data bits of the received bit sequence;

shifter circuitry coupled to said FIFO register circuitry and operable to receive said words and to serially output bits within said received words;

detector circuitry coupled to said shifter circuitry and operable to receive said bits output from said shifter circuitry and operable to detect predetermined bit patterns encoded in the bit sequence, said detector circuitry further operable to output in parallel selected groups of bits detected within the bit sequence;

control logic circuitry coupled to said shifter circuitry and said detector circuitry and operable to direct the operation of said shifter and detector circuitries;

buffer interface circuitry coupled to said detector circuitry and operable to receive said selected groups of bits output by said detector circuitry;

shift counter circuitry coupled to said shifter and said control logic circuitries and operable to store a shift count value and operable to decrement said shift count value as said shifter circuitry serially outputs bits to said detector circuitry, said control logic circuitry operable to load a predetermined shift count value into said shift counter circuitry such that said control logic circuitry is able to specify a length of a particular bit sequence to be loaded into said detector circuitry using said predetermined shift count value;

said control logic operable to receive information indicating the encoding layer of the bit sequence being received by the system; and said control logic circuitry and said detector circuitry operable to detect a start code within the bit sequence indicating the beginning of a packet of encoded data, said control logic circuitry and said detector circuitry further operable to detect presentation time stamps within the bit sequence.

15. The data processing system of claim 14 wherein the bit sequence comprises a time multiplexed serial bit stream containing a plurality of different bit streams divided into bit packets and time multiplexed together to form the bit sequence, said control logic circuitry operable to receive information indicating which of the plurality of bit streams is to be decoded, said control logic circuitry and said detector circuitry operable to detect and retrieve the packets comprising the indicated bit stream from the time multiplexed serial bit stream.

16. The data processing system of claim 14 wherein said control logic circuitry and said detector circuitry are operable to detect end of stream codes within the bit sequence indicating the end of a portion of the bit stream to be decoded, the system further comprising temporary bit storage circuitry coupled to said detector circuitry and operable to receive and store incomplete groups of bits from the bit stream interrupted by one of said end of stream codes until the remainder of said incomplete group of bits can be retrieved from the bit sequence and concatenated with said incomplete group of bits.

17. The data processing system of claim 14 and further comprising:

buffer circuitry coupled to said buffer interface circuitry and operable to store bits received from the buffer interface circuitry;

first address counter circuitry operable to generate a first address value indicating where in said buffer circuitry the bits output to said buffer circuitry from said buffer interface circuitry are to be stored.

18. The data processing system of claim 17 wherein the bit sequence contains presentation time stamp codes and wherein said control logic circuitry and said detector circuitry are operable to detect said presentation time stamp codes associated with the portion of the bit sequence being retrieved from the bit sequence, the system further comprising presentation time stamp address circuitry operable to generate a presentation time stamp address value indicating where in said buffer circuitry a detected and retrieved presentation time stamp code to be output to said buffer circuitry from said buffer interface circuitry is to be stored.

19. A method for receiving and processing a bit sequence, comprising:

receiving and storing the data bits of the received bit sequence in words in a first in first out (FIFO) register circuitry, each of the words comprising a plurality of data bits of the received bit sequence;

receiving the words in shifter circuitry coupled to the FIFO register circuitry and serially outputting the bits within the received words from the shifter circuitry;

receiving the bits output from the shifter circuitry into detector circuitry coupled to the shifter circuitry and detecting predetermined bit patterns encoded in the bit sequence, and outputting in parallel selected groups of bits detected within the bit sequence;

directing the operation of the shifter and detector circuitries using control logic circuitry coupled to the shifter circuitry and the detector circuitry; and receiving and storing the selected groups of bits output by the detector circuitry in buffer interface circuitry coupled to the detector circuitry.

20. The method of claim 19 and further the steps of storing a shift count value in shift counter circuitry coupled to the shifter and the control logic circuitries and altering the shift count value as the shifter circuitry serially outputs bits to the detector circuitry.

* * * * *